United States Patent [19]

Spanjersberg

[11] 3,858,180

[45] Dec. 31, 1974

[54] SYSTEM FOR AUTOMATICALLY READING SYMBOLS

[75] Inventor: Arie Adriaan Spanjersberg, Leiderdorp, Netherlands

[73] Assignee: De Staat der Nederlanden, Ten Deze Vertegenwoordigd Door de Directeur-Generaal der Posterijen, Telegrafie en Telefonie, Korternaerkade, The Hague, Netherlands

[22] Filed: Feb. 14, 1972

[21] Appl. No.: 225,839

[30] Foreign Application Priority Data

Feb. 19, 1971 Netherlands........................ 7102210

[52] U.S. Cl...................... 340/146.3 F, 340/146.3 Y

[51] Int. Cl. ............................................ G06k 9/12

[58] Field of Search............................... 340/146.3 F

[56] References Cited

UNITED STATES PATENTS

| | | | |
|---|---|---|---|
| 3,123,804 | 3/1964 | Kamentsky | 340/146.3 R |
| 3,184,732 | 5/1965 | Haynes | 340/146.3 F |
| 3,225,329 | 12/1965 | Rabinow | 340/146.3 F |
| 3,346,845 | 10/1967 | Fomenko | 340/146.3 Y |
| 3,611,267 | 10/1971 | Edling | 340/146.3 Y |

*Primary Examiner*—Paul J. Henon
*Assistant Examiner*—Robert F. Gnuse
*Attorney, Agent, or Firm*—Hugh Adam Kirk

[57] ABSTRACT

A system for automatically reading symbols, preferably figures, which are hand-written on an information carrier in an arrangement of squares provided on the information carrier. The images of these symbols are converted by an image convertor of glass fiber bundles to fit a camera tube screen where they are scanned vertically, quantized, and encoded to determine the size and numerical locations of intersections of the scanning beam with the lines in each symbol in each rectangle. This information is then processed by being stored and first roughly classified according to the maximum number of these intersections per symbol, each of which classes are then more specifically classified by being further processed as to the location of the mergings of the intersections, if any, in the upper, lower, right, and/or left part of the symbols, as well as determining the shape, length and/or width of the lines in certain of the symbols for their specific recognition, or identification. This recognized information then may be used for punching a code into the information carrier. If desired, the processor of this information can be located remote from the viewer and punching apparatus.

35 Claims, 55 Drawing Figures

PATENTED DEC 31 1974 3,858,180

SHEET 02 OF 35

FRAMES WITH THE ADDRESS INDICATION OF THE FIRST WORD OF EACH FIRST COLUMN OF EACH FRAME

TABLE

| SYMBOL | SIGNIFICANT LARGEST NUMBER OF INTERSECTIONS | GROUP |
|---|---|---|
| BLANK SQUARE | 0 | w |
| / \| 1 7 4 | 1 | x |
| 0 4 4 6 7 9 C | 2 | y |
| 2 3 5 (S) 6 8 9 | 3 | z |

fig. 28 fig. 31b

1 DIMENSIONS CORRECT ?
2 MERGING ON LEFT-HAND SIDE ?
3 OPENING ON LEFT-HAND SIDE ?
4 MERGING ON RIGHT-HAND SIDE ?
5 MERGING POINT AT PROPER LEVEL ?
6 MERGING ON RIGHT-HAND SIDE ?
7 OPENING ON RIGHT-HAND SIDE ?
8 ONE REGION WITH 2 INTERSECTIONS PER COLUMN ?
9 MERGING POINT ON LEFT-HAND SIDE AT PROPER LEVEL ?
10 OPENING ON LEFT-HAND SIDE REGION 2 ?
11 OBLIQUE TAIL ?
12 UPWARD STROKE ON RIGHT-HAND SIDE ?
13 VERTICAL EXTENSIONS ON RIGHT-HAND SIDE ?
14 CURVE ON LEFT-HAND SIDE ?
15 2nd INTERSECTIONS ON HORIZONTAL LINE ?
16 VERTICAL UPWARD STROKE ON LEFT-HAND SIDE ?
17 VERTICAL DOWNWARD STROKE ON RIGHT-HAND SIDE ?
18 CURVE ON LEFT-HAND SIDE ?
19 2nd INTERSECTIONS ON HORIZONTAL LINE ?
20 VERTICAL DOWNWARD STROKE ON RIGHT-HAND SIDE ?

fig. 32b

1 DIMENSION CORRECT ?
2 MERGING ON UPPER RIGHT-HAND SIDE ?
3 MERGING ON LOWER RIGHT-HAND SIDE ?
4 MERGING ON LOWER LEFT-HAND SIDE ?
5 UPPER LEFT-HAND SIDE CONNECTED WITH LOWER PART
6 UPPER LEFT-HAND SIDE CONNECTED WITH LOWER LEFT-HAND SIDE ?
7 COLUMNS WITH 4 INTERSECTIONS ?
8 MERGING ON UPPER LEFT-HAND SIDE ?
9 MERGING ON LOWER LEFT-HAND SIDE ?
10 MERGING ON LOWER RIGHT-HAND SIDE ?
11 MERGING ON LOWER RIGHT-HAND SIDE ?
12 MERGING ON LOWER LEFT-HAND SIDE ?
13 UPPER RIGHT-HAND SIDE CONNECTED WITH LOWER RIGHT-HAND SIDE ?
14 MERGING ON LOWER RIGHT-HAND SIDE ?

PROGRAM SECTION P1
DETERMINATION OF THE EXTRACT

PROGRAM SECTION P4

SYSTEM FOR AUTOMATICALLY READING SYMBOLS

The invention relates to a system for automatically reading symbols, preferably figures, which may be hand-written on an information carrier (form). An arrangement of squares is provided on the information carrier, one square for each symbol to be entered.

BACKGROUND OF THE INVENTION

The automatic reading (recognition) of symbols can be divided into the reading of printed and of written symbols.

In the development of systems for reading printed symbols in many cases stylized symbols are used. This leads to economically justifiable solutions but restricts the applicability.

The development of systems for automatically reading manuscripts meets with great difficulties, as handwriting is highly individual.

This leads to very costly solutions. Moreover, a distinction should be made between the reading of prose and the reading of encoded information, such as information in the form of series of figures. A reading error percentage that is still allowable for the former may be completely unallowable for the latter.

SUMMARY OF THE INVENTION

It is an object of the system according to the invention to provide a possible solution for the above problems, which solution at the same time leads to an economically justifiable device. In illustration thereof an example will be described for handwritten figures.

The system according to the invention is arranged such that the width-to-height ratio per square is equal to the width-to-height ratio of the photosensitive surface of a camera tube used for scamming. This width-to-height ratio of the total surface area to be read on the carrier is converted to the width-to-height ratio of the photosensitive surface of a camera tube by means of an image convertor comprising a plurality of glass fibre bundles. The number and shape of these bundles correspond with the number and shape of the squares to be read on the carrier, and the glass fibre bundles are bent together such that the end face of each bundle has a width-to-height ratio corresponding with the width-to-height ratio of the photosensitive surface of the camera tube.

The rectangle photo-sensitive surface or screen of the camera is then scanned by an electron beam in such a manner that each of the squares or rectangles corresponding to each figure are vertically scanned by successive parallel lines, either by the odd numbered lines or the even numbered lines making up the field scanned. The resulting series of impulses obtained from the beam when it detects the presence of an image or line of the symbol, such as black on white or the presence or absence of a line of the image, is then quantized so that the information can be processed by logical circuitry. This quantization of the series signal from the beam is effected by amplitude and time thus reducing the amount of information offered in the beam and selecting only the parts thereof important for the identification or recognition of the symbol being scanned.

This quantized information is then encoded by assigning numbers in the binary system to successive portions of each column or parallel vertical scan line as well as to the columns themselves so that each column is divided into a substantially equal number of identifable time divisions as there are odd or even columns or vertical lines across the square or rectangle for each symbol. Thus the number and the location of both the beginnings and the endings each intersected image line can be determined, as well as its direction, length, thickness, and/or curvature, as may be required for a given symbol's identification or recognition. The encoded binary numbers of the number of the intersections and their locations are formed into "words" of not more than twelve bits each and stored; five bits being given for the numbers of the beginning and ending of each intersection and two bits for the number of intersections. These stored "words" are then transferred by a transfer device to a processor as parallel signals for each word of twelve bits.

The processor comprises memory circuits in which these words are stored while being processed for recognition of the symbols corresponding to them. The first processing step comprises determining the size of the symbol image and then classifying the images according to the number of intersections of their middle or central scanned lines; at least four successive central vertical scan lines of which must detect the same number of intersections. Next each of these classes of symbols are further examined or processed to determine whether or not the intersections merge and in what quadrant of the symbol such merger or mergers occur, namely upper, lower, right, and/or left parts. For certain symbols there is also determined whether the lines are straight, curved, and of a certain minimum length, and/or vertical or horizontal. It should be noted that the images which do not pass the processing tests, their information carriers are automatically discharged from the system for visual processing and/or manual correcting of the shape of the symbols for reprocessing.

Once the decisions have been made about this information for a symbol, that symbol has been identified or recognized and this recognition information then may be used directly for punching holes in the carrier upon which the symbols were originally written. Furthermore if desired the processing equipment for automatically recognizing or determining the symbols may be at a remote location from the machine which reads and punches the information carriers or cards.

BRIEF DESCRIPTION OF THE VIEWS

The above mentioned and other features, objects and advantages, and a manner of attaining them are described more specifically below by reference to an embodiment of this invention shown in the accompanying drawings, wherein.

Figure 10A:
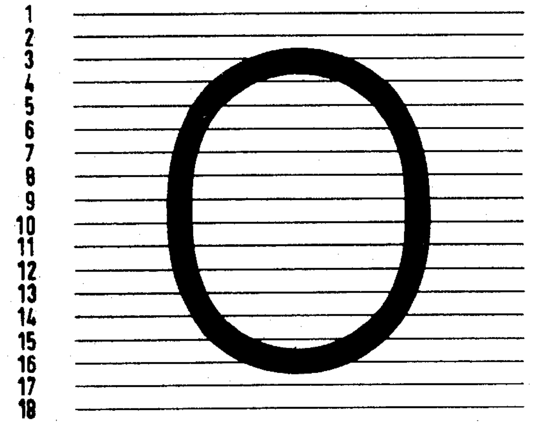
Figure 10B:
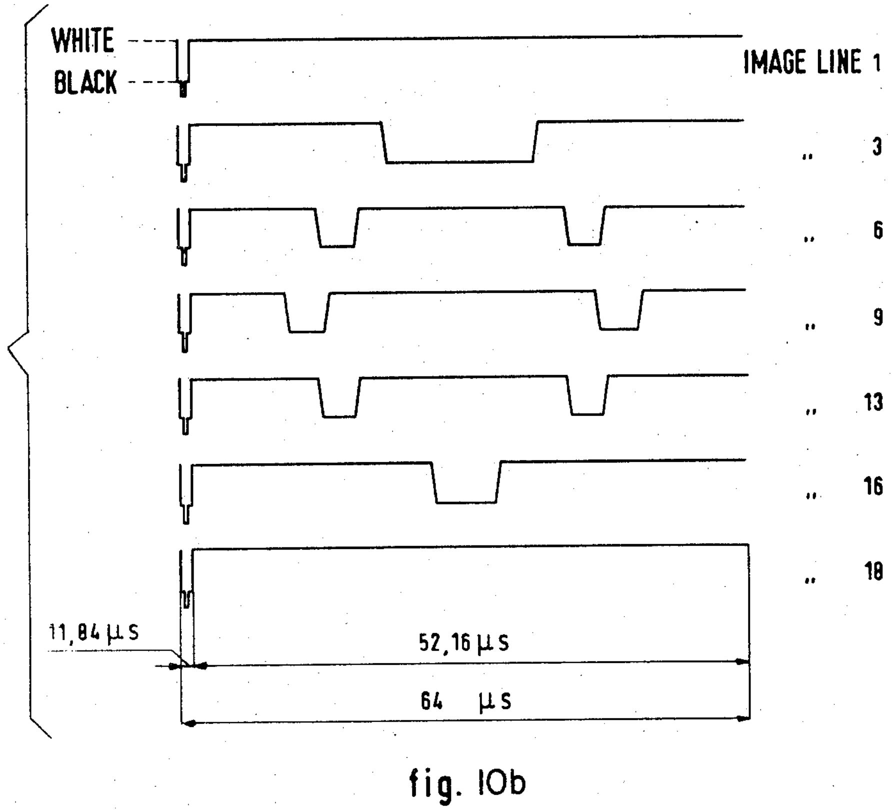

FIG. 10*a* is a schematic diagram of how horizontal image lines can scan a figure, namely as 0;

FIG. 10*b* is a group of wave forms produced by scanning along correspondingly marked lines in FIG. 10*a;*

Figure 4:
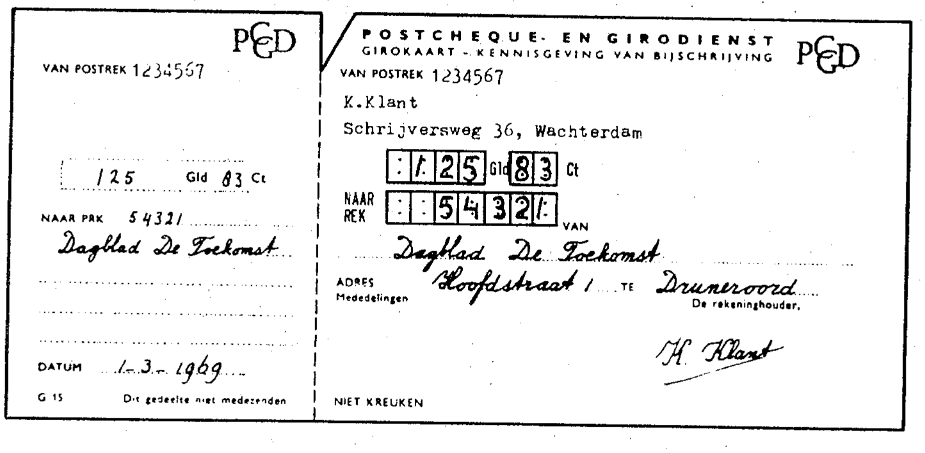
FIG. 4 is a specimen of a filled-in post check form as shown in FIG. 3 with digits written in some of the rectangles or squares.
Figure 11A:
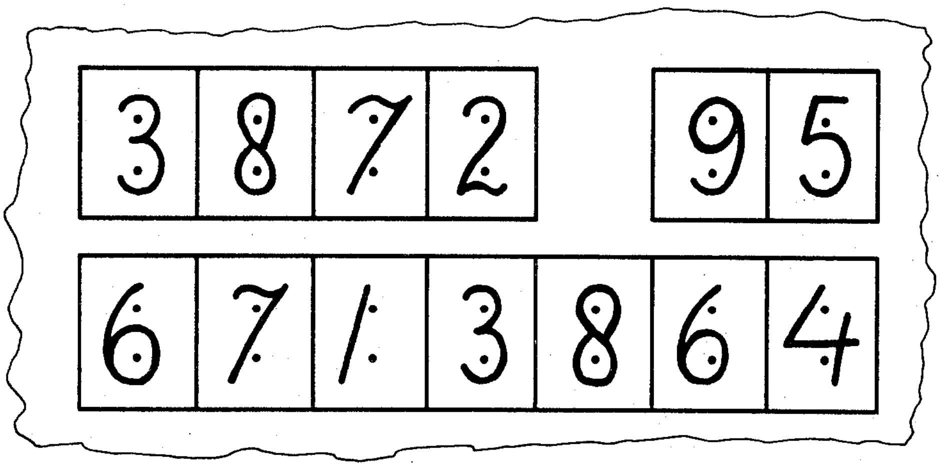
Figure 11B:
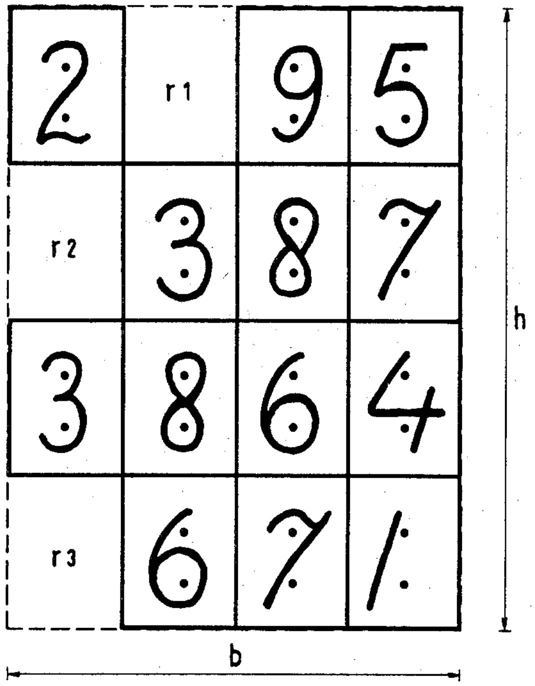
Figure 12A:
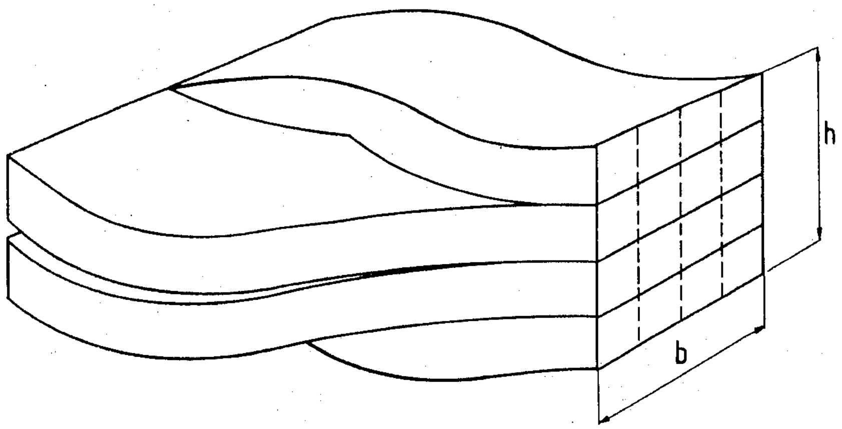

FIG. 11*a* shows an enlarged portion of the rectangles on the post check shown in FIG. 4 with written digits therein;

FIG. 11*b* shows the same rectangles shown in FIG. 11*a* rearranged into a rectangular form corresponding to a camera screen for scanning;

FIG. 12*a* is a perspective view of the rectangular bundles of glass fibers of the convertor for optically converting the rectangles shown in FIG. 11*a* on the post check to the form of the camera screen shown in FIG. 11*b;*

Figure 12B:
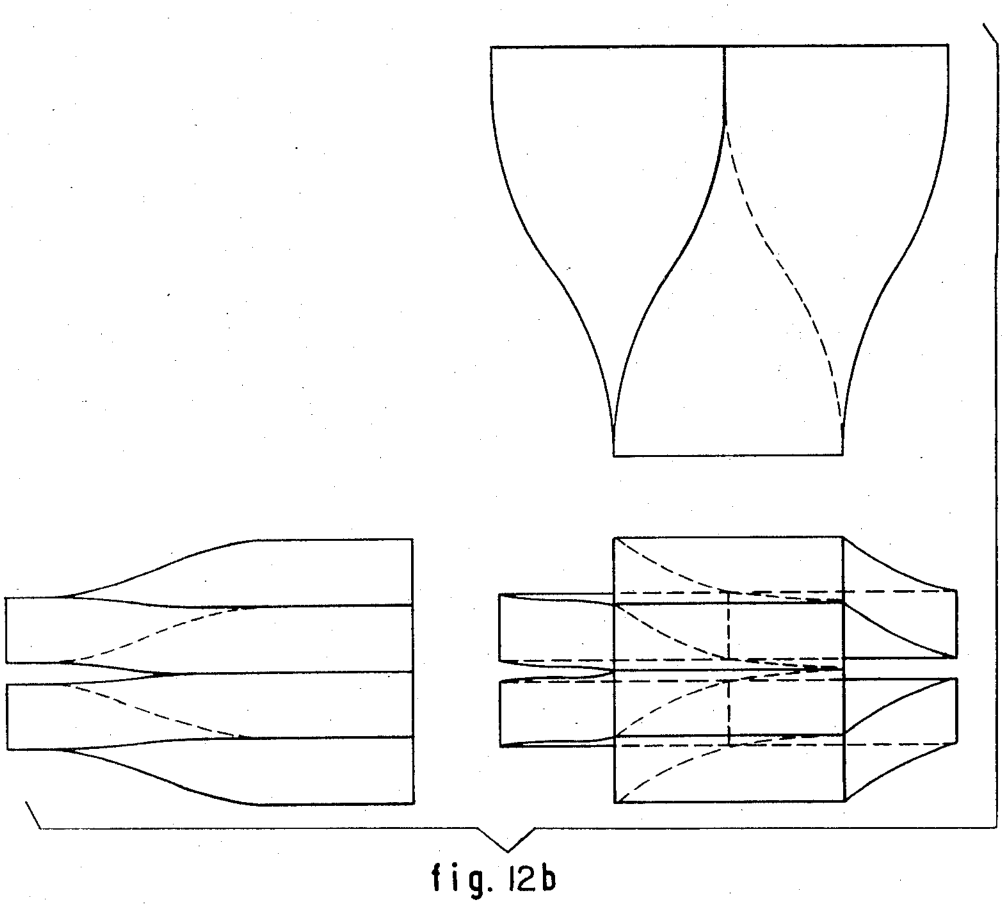

FIG. 12*b* are the front, side, and top views of the glass fiber bundles of the convertor shown in FIG. 12*a;*

Figure 13:
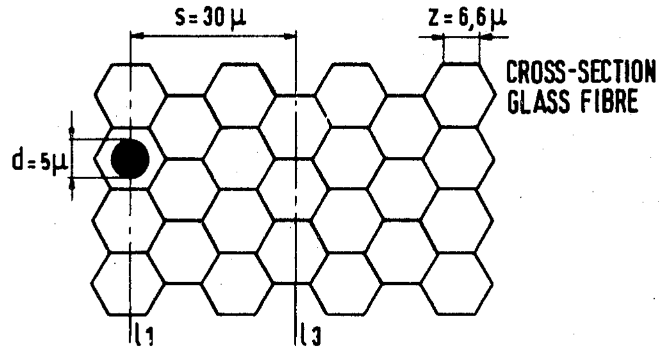
Figure 14:
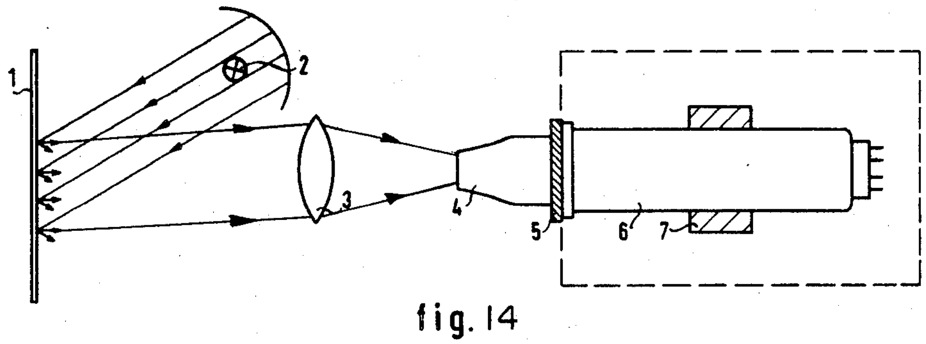
Figure 15:
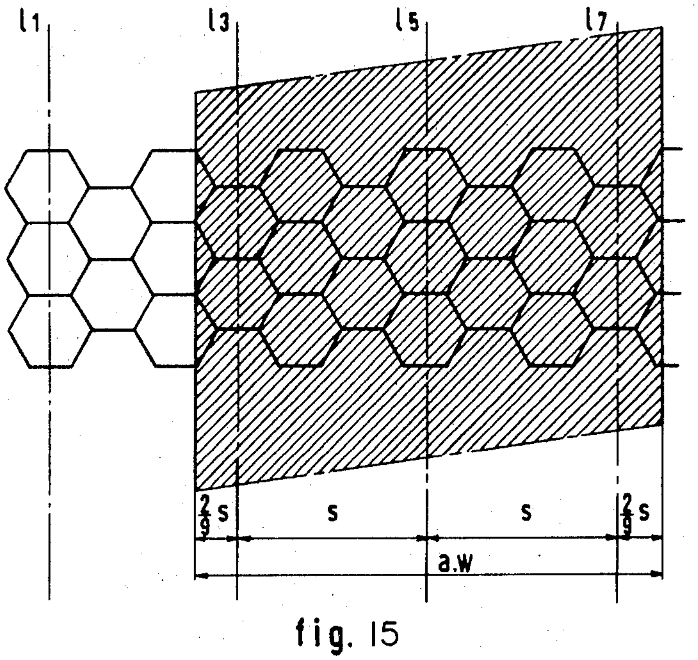
Figure 16A:
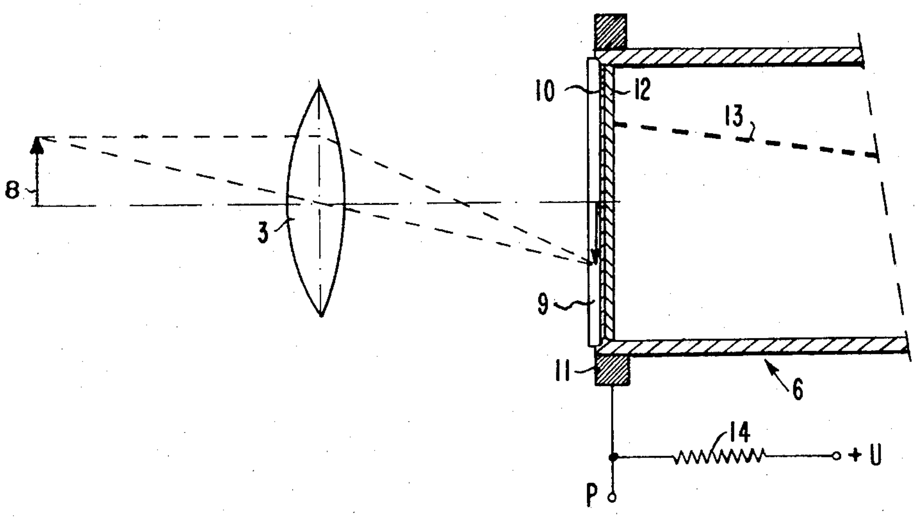
Figure 16B:
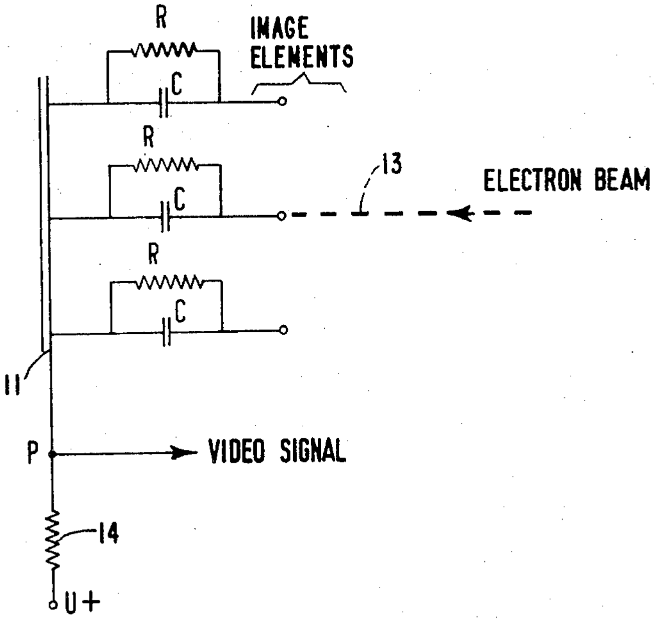

FIG. 13 is an enlarged cross-sectional view of part of a bundle of hexagonal glass fibers with a dot showing the relative size of the cross-section of the scanning beam, and two adjacent odd-numbered lines along which the beam travels in scanning a field of the camera screen;

FIG. 14 is a schematic view of the detecting device showing an information carrier being lighted with rays which reflect and pass through a lens and convertor to the camera tube;

FIG. 15 is an enlarged diagram of the minimum thickness of an image line of a figure or symbol relative to the cross-section of a glass fiber, and the distance between scanning lines in one field;

FIG. 16*a* is an enlarged vertical sectional view of the screen end of a camera tube, with dotted lines depicting the focusing of an image on this screen;

FIG. 16*b* is a schematic electrical diagram of the function of the camera tube shown in FIG. 16*a;*

Figure 17:
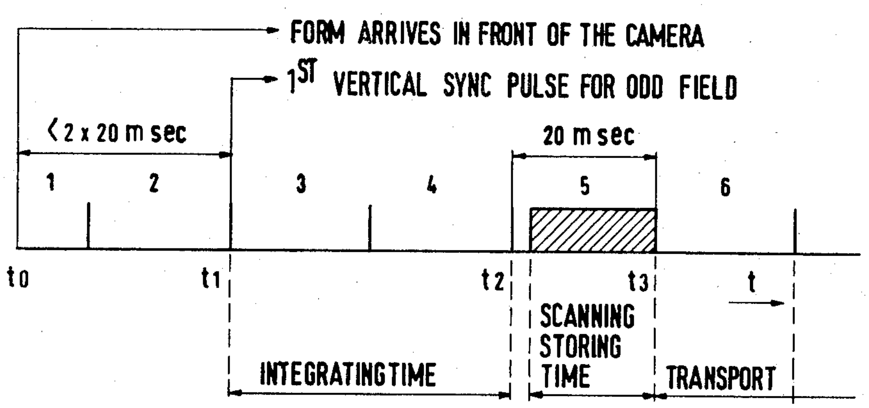
Figure 18:
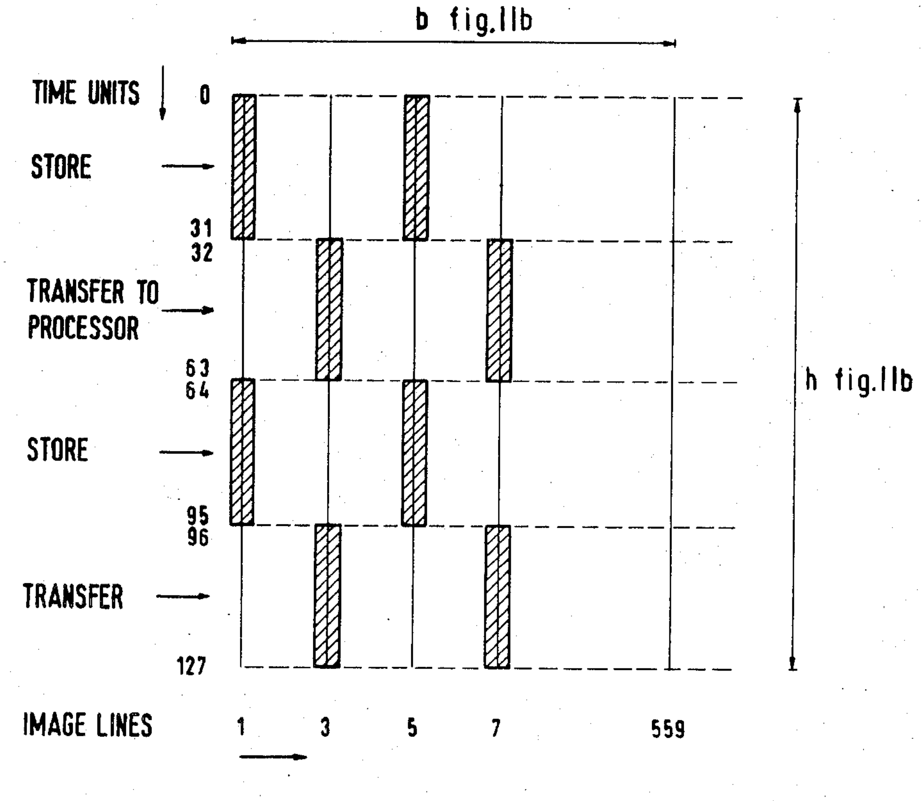

FIG. 17 is a schematic time diagram of a complete scanning cycle by the camera of the device of this invention;

FIG. 18 is a schematic time diagram of operations during vertical scanning of the image form shown in FIG. 11*b;*

Figure 19:
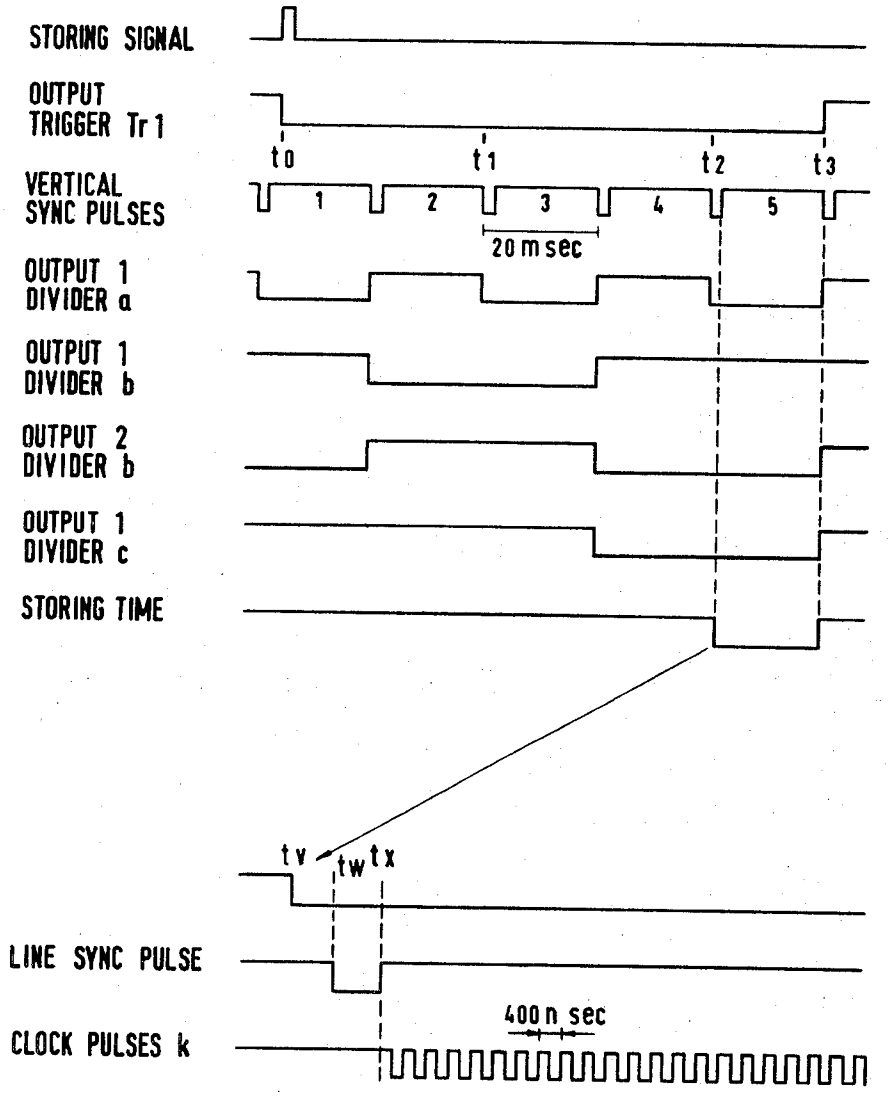
Figure 20:
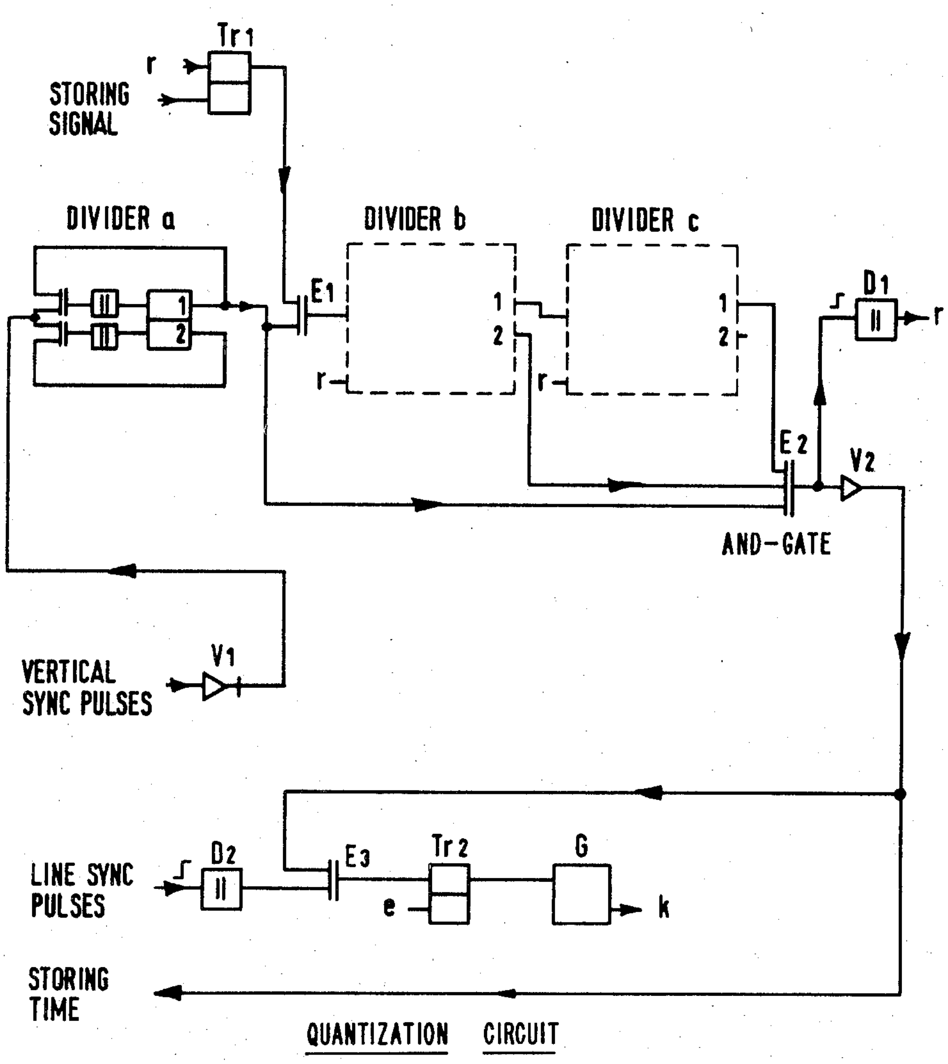
Figure 21A:
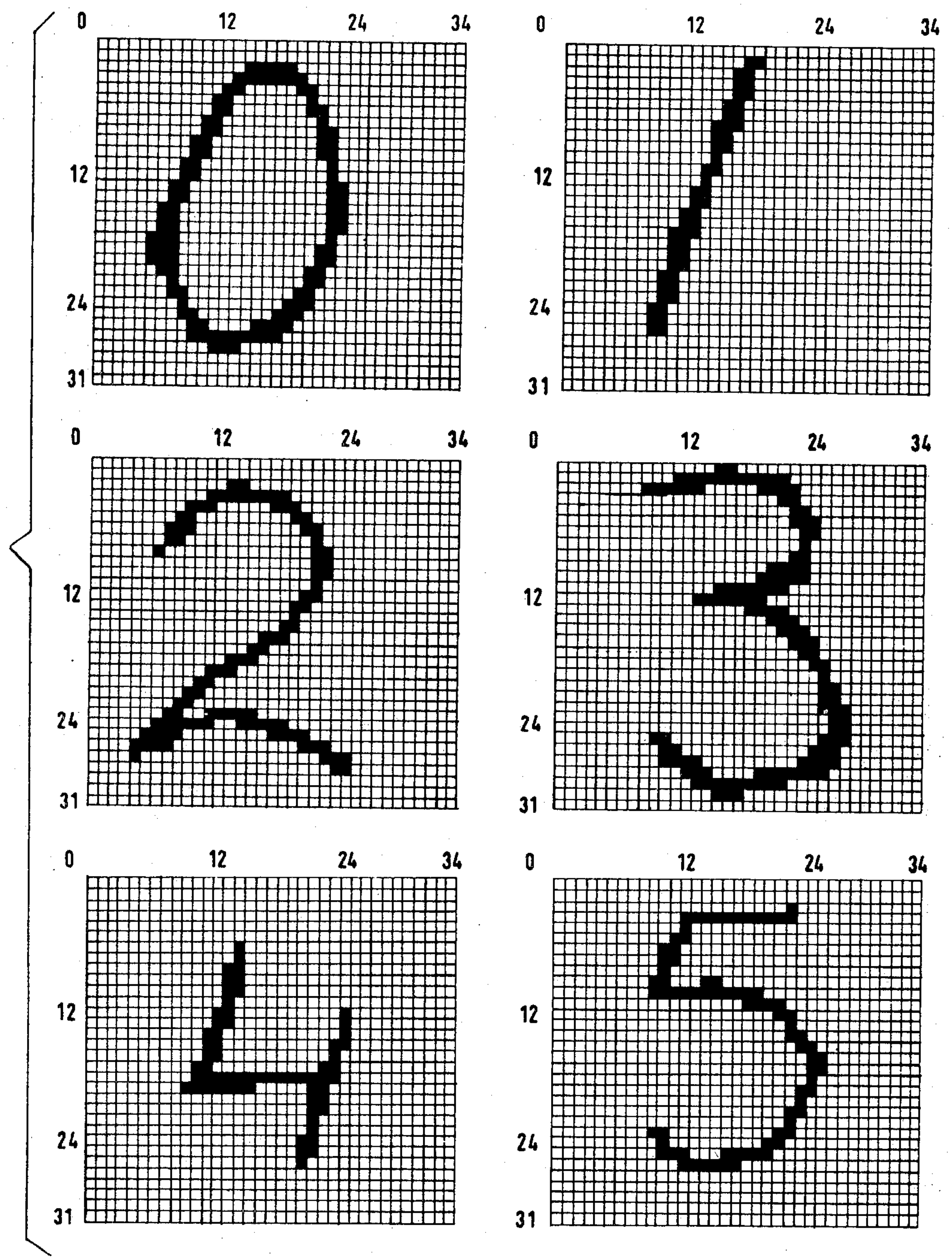
Figure 21B:
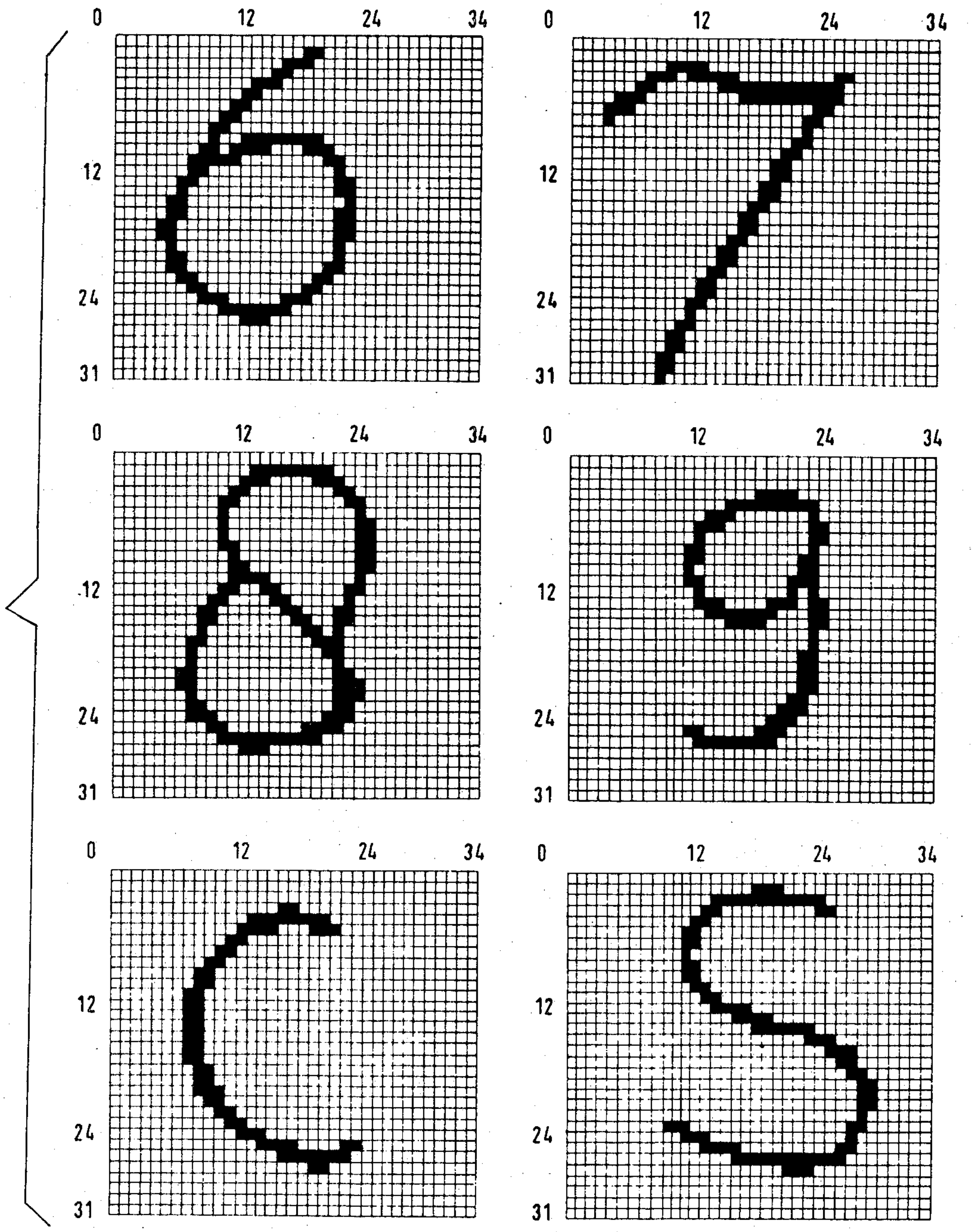
Figure 22:
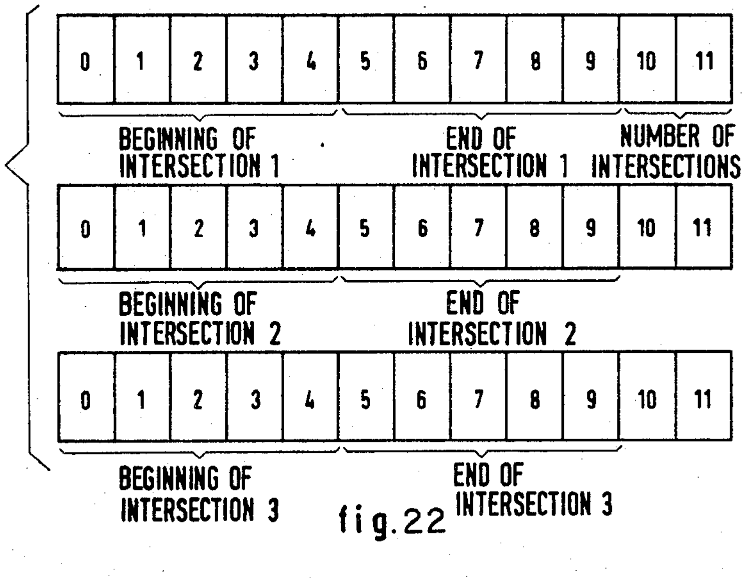
Figure 26:
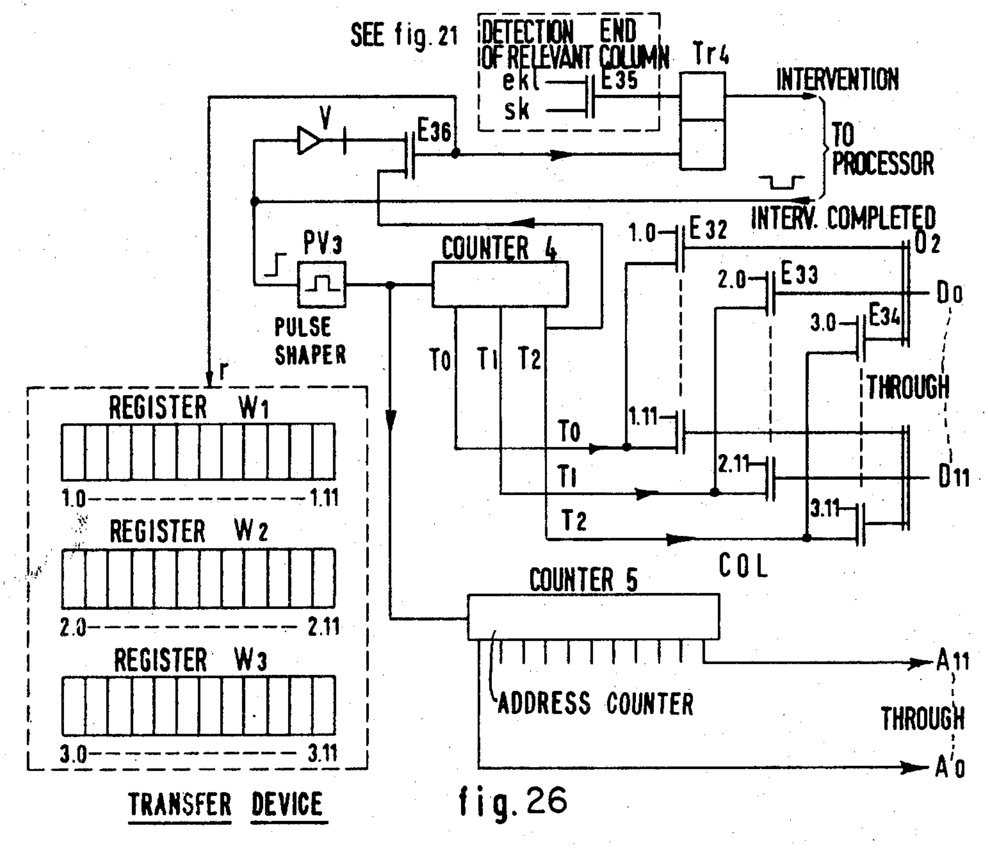
Figure 23:
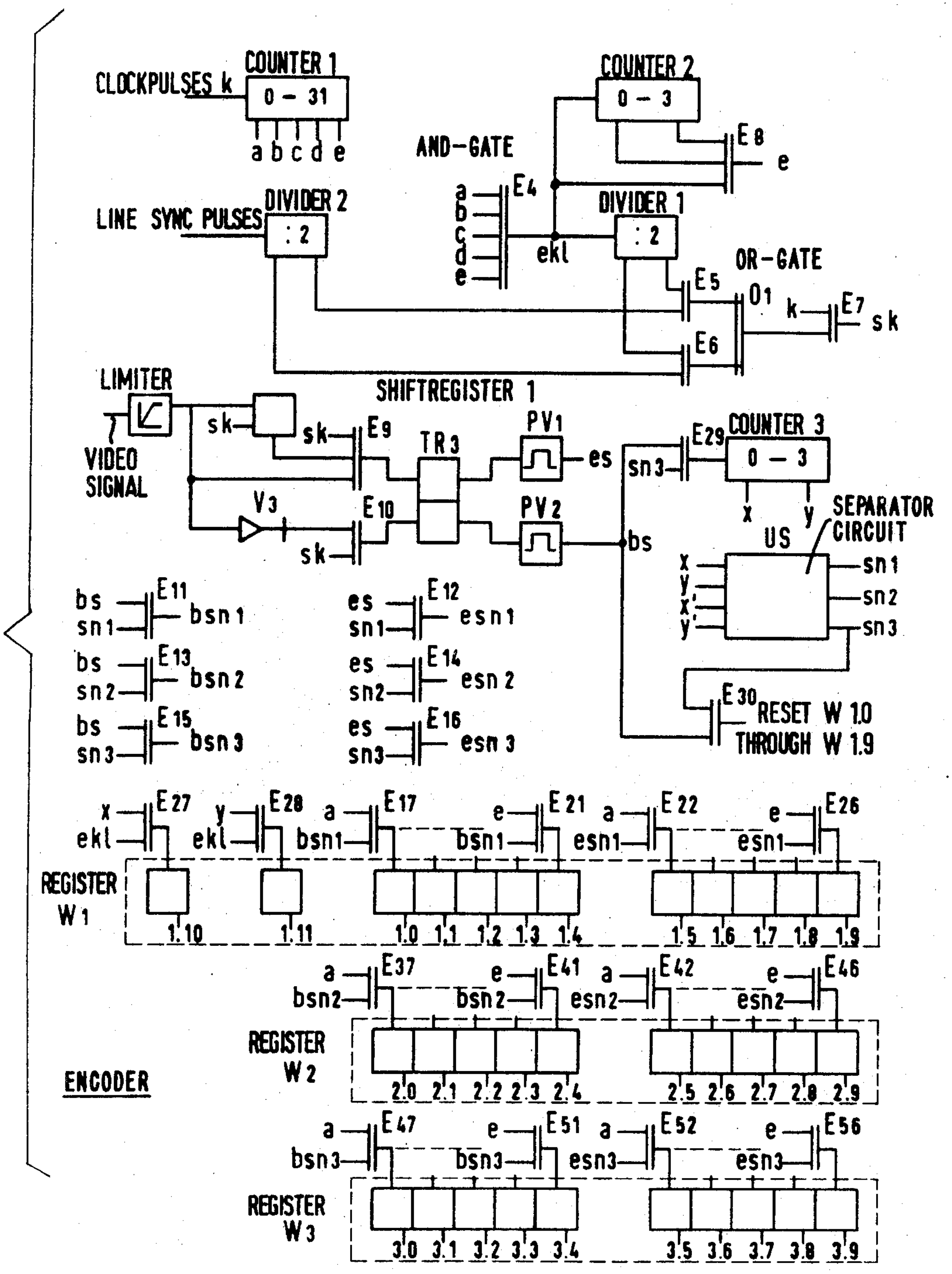
Figure 24:
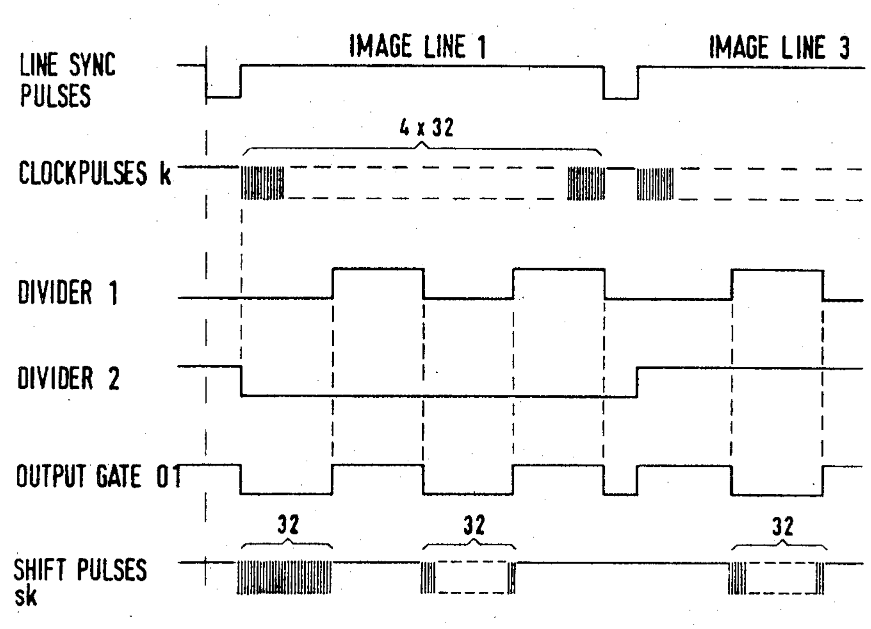
Figure 25:
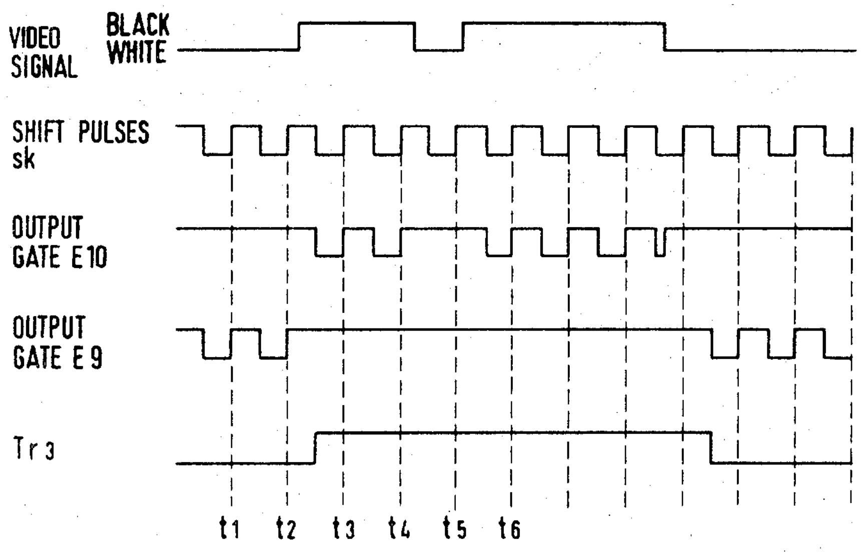
Figure 27:
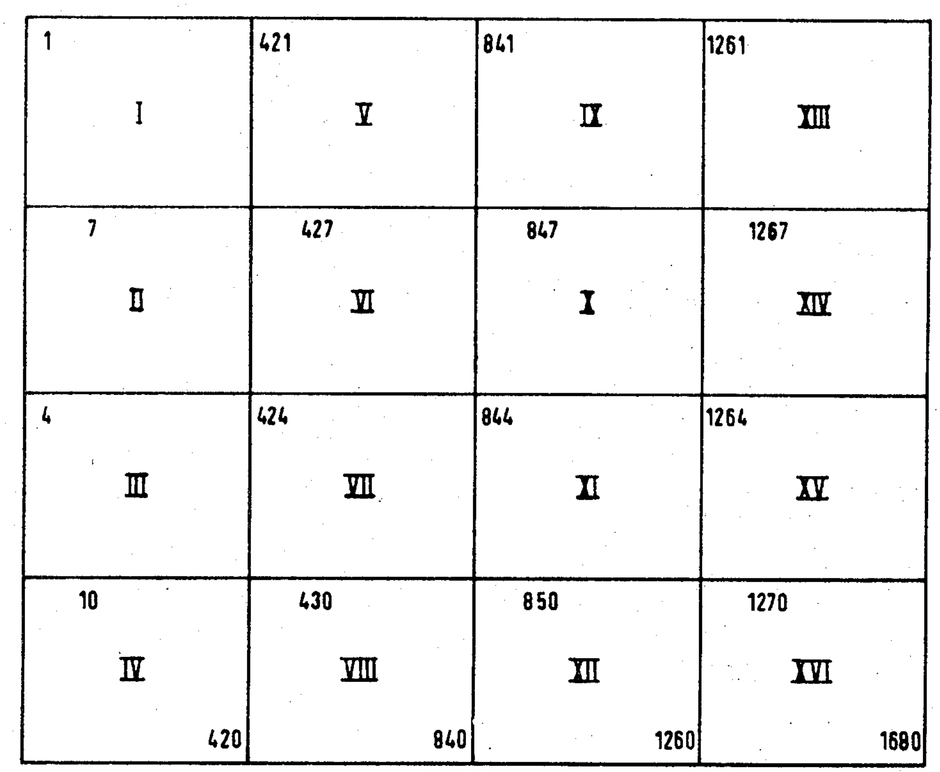
Figure 29:
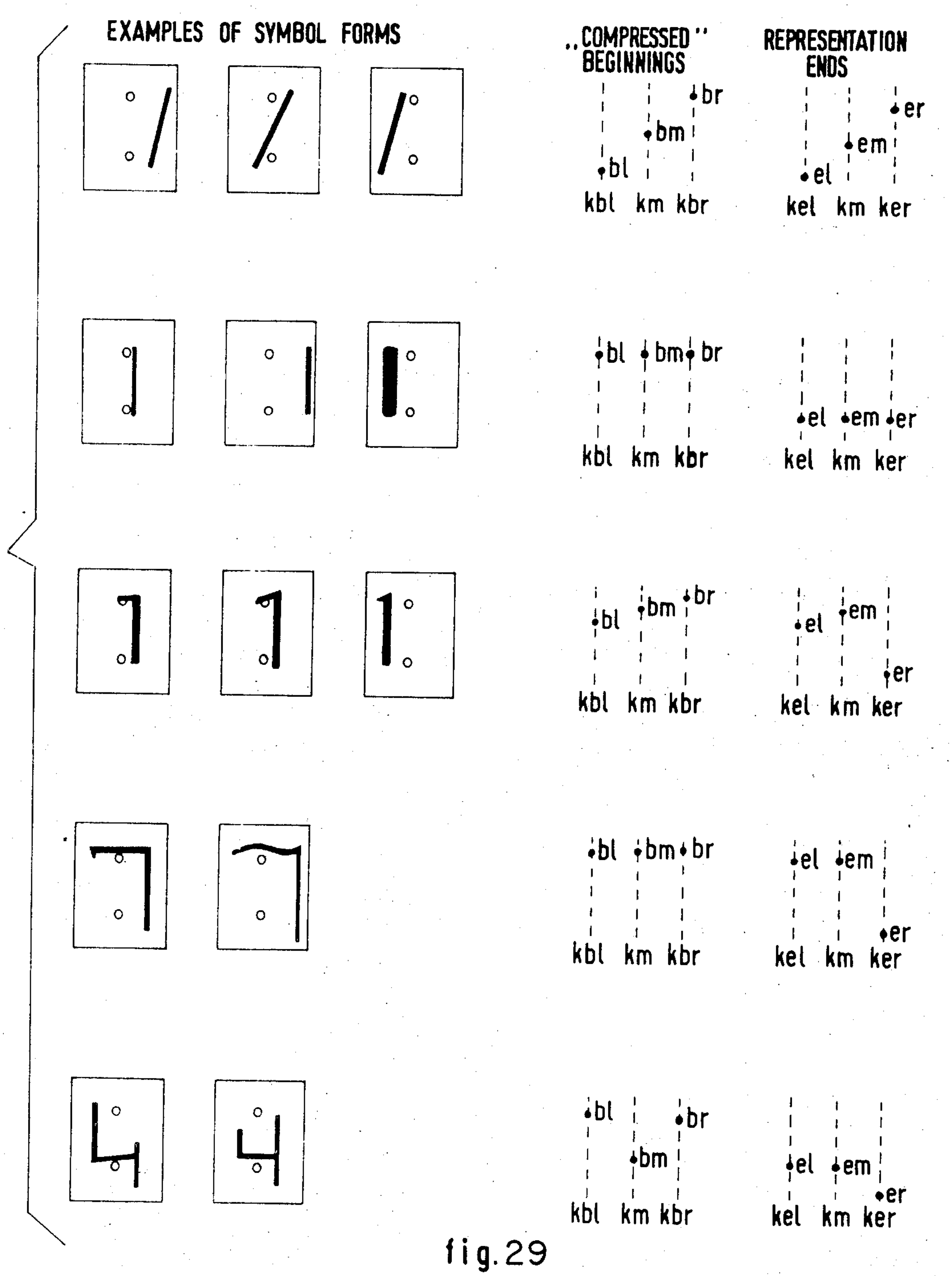
Figure 30:
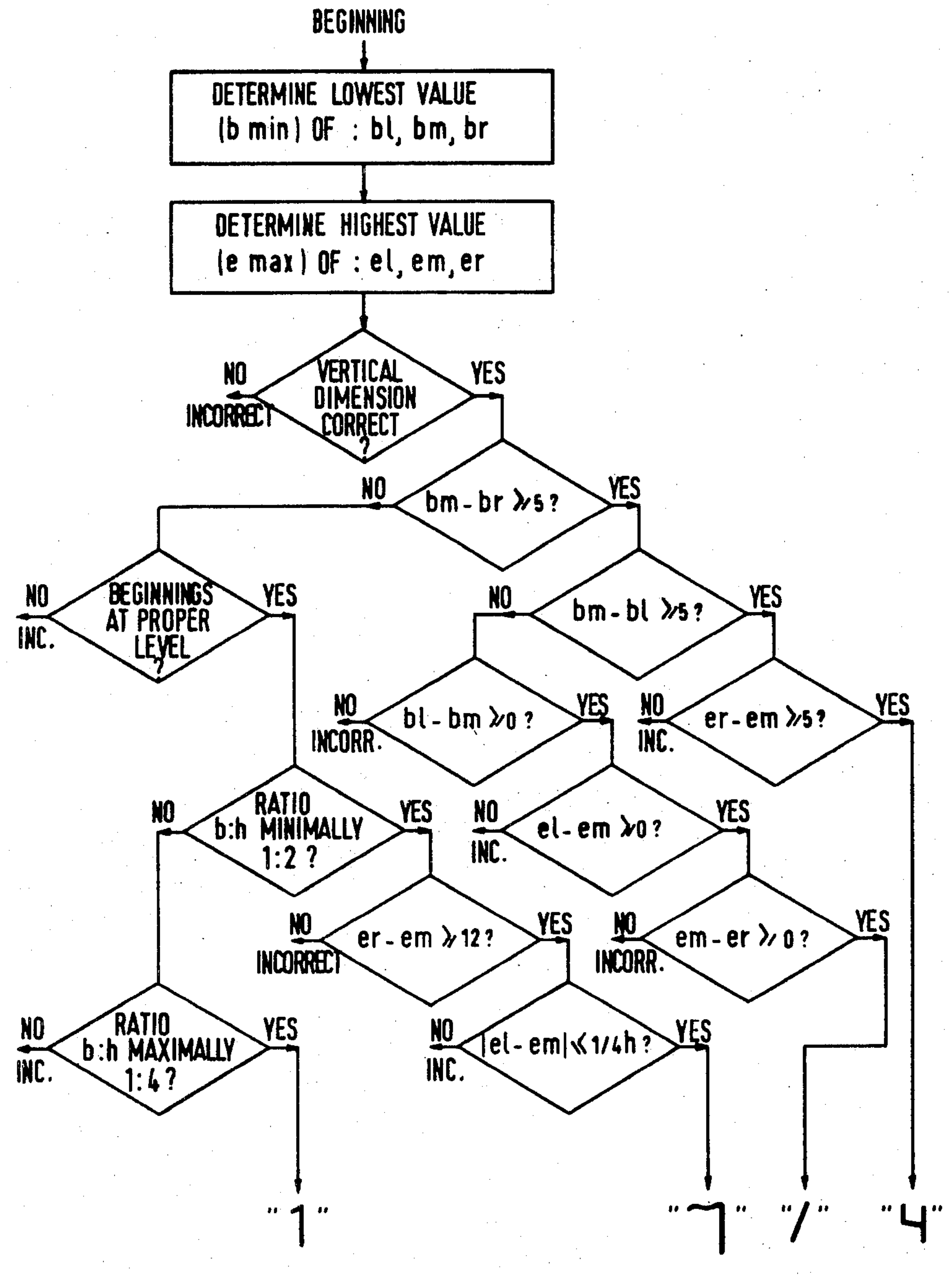
Figure 31A:
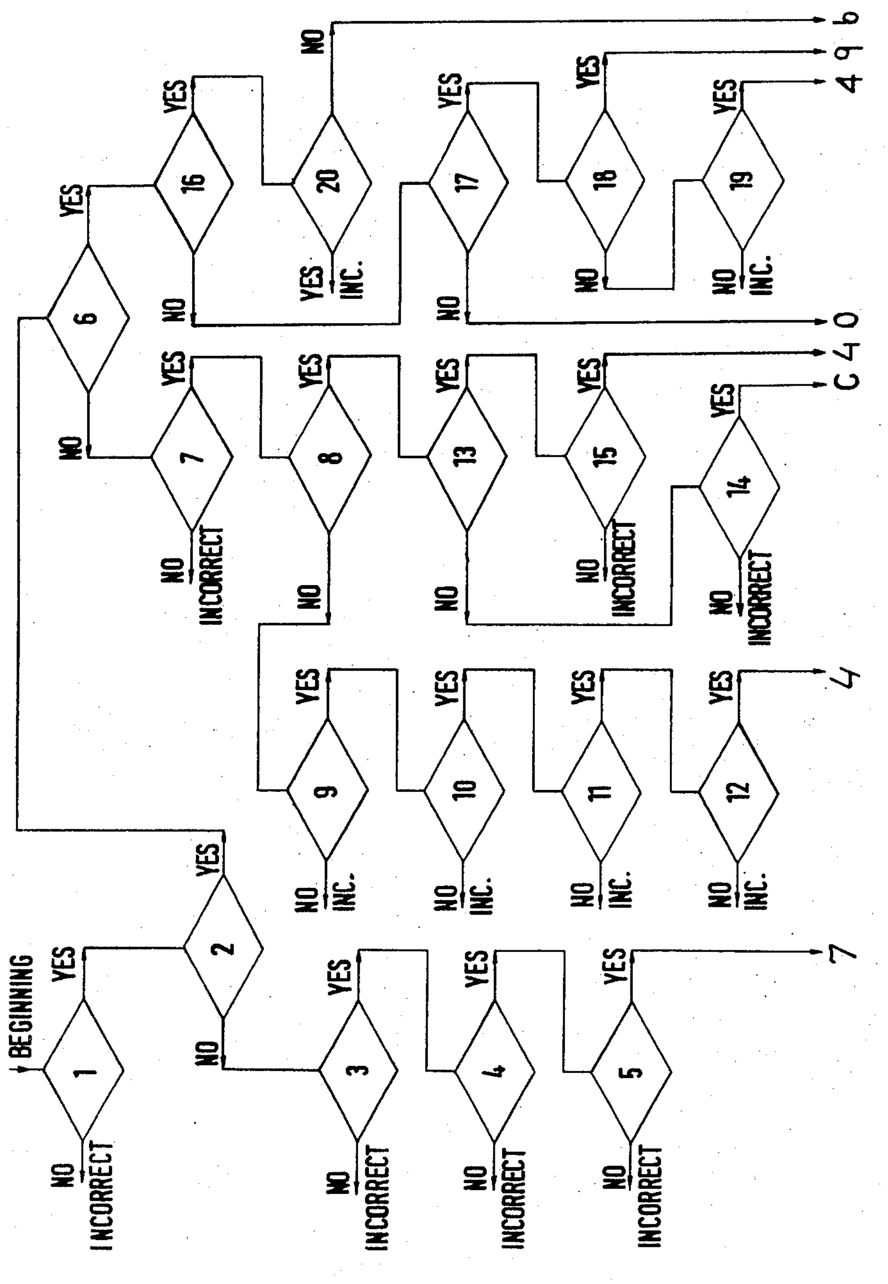
Figure 32A:
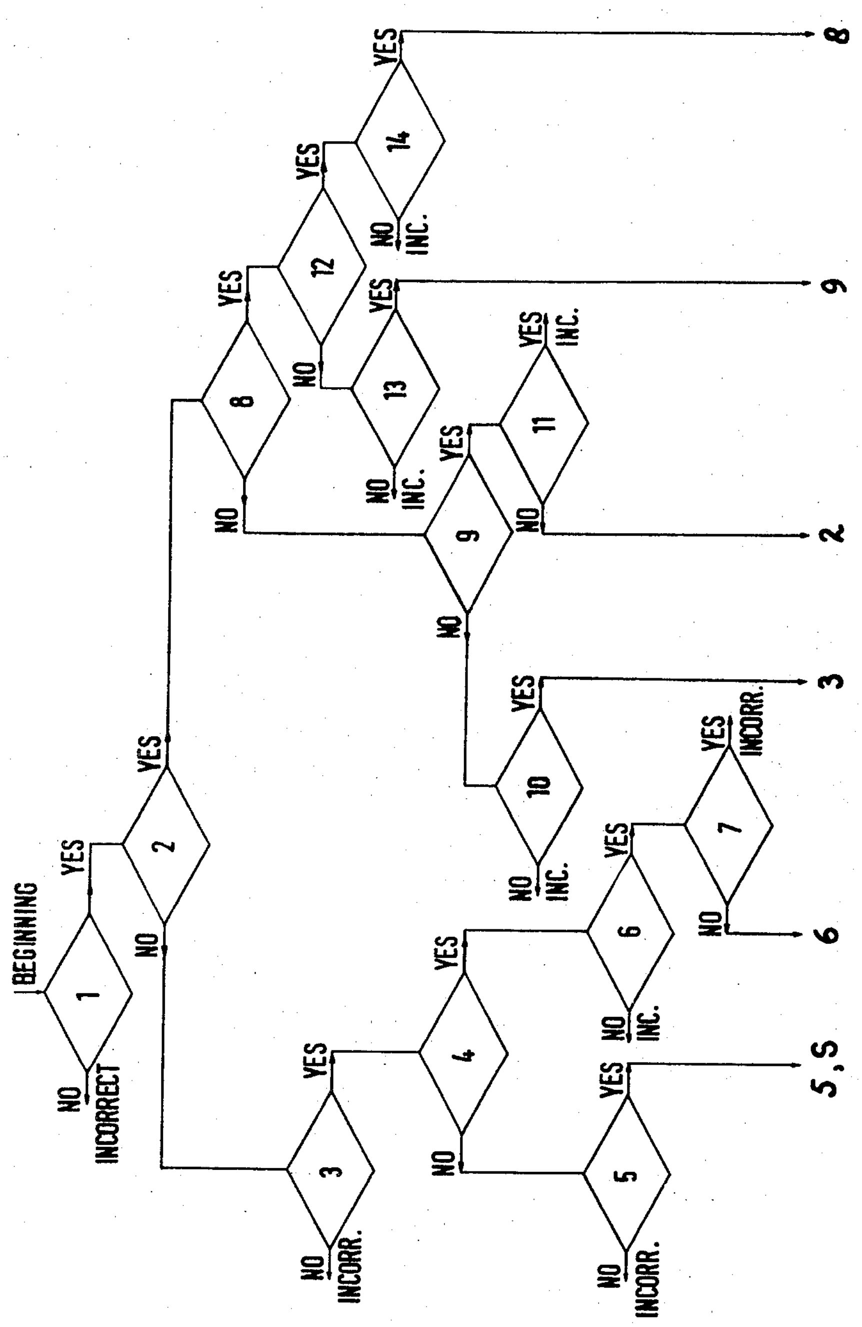
Figure 33:
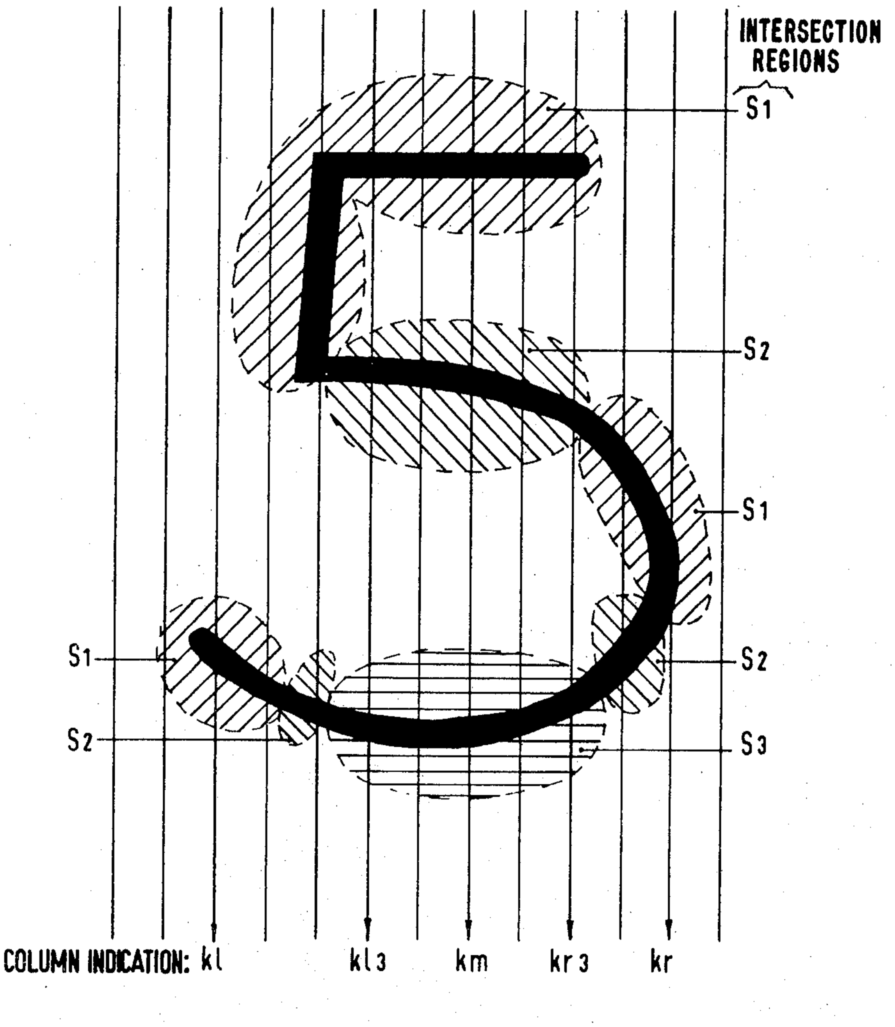
Figure 34:
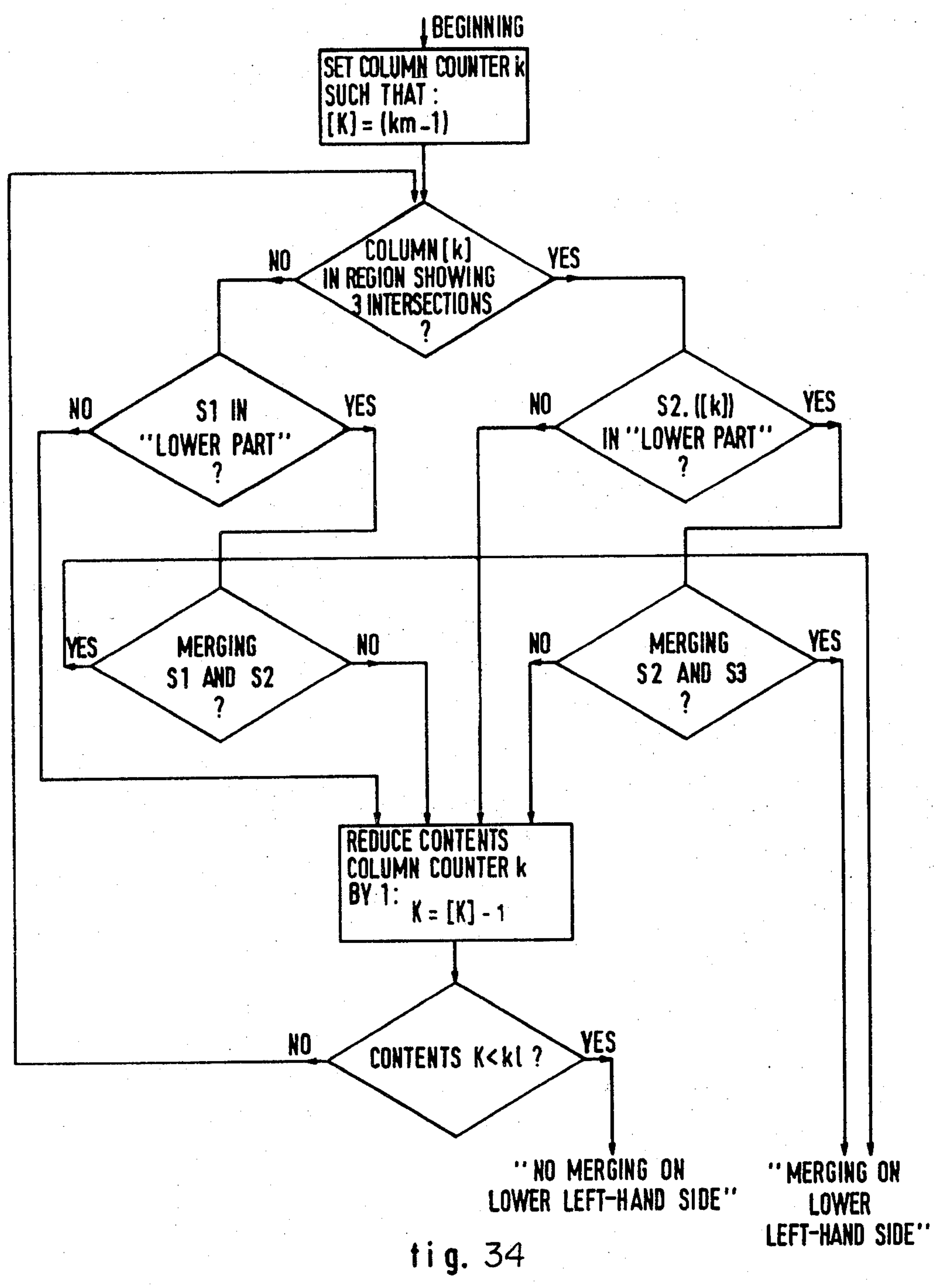

FIG. 19 is a wave form diagram of the signals for quantization of the camera field according to FIG. 17 and at different parts of the circuit therefore shown in FIG. 20;

FIG. 20 is a schematic block diagram of the circuit for quantization of the camera field;

FIGS. 21*a* and 21*b* show how each rectangle or square for each of the twelve different symbols to be detected by the system of this invention, is divided up for quantization;

FIG. 22 schematically represents the encoded information in a binary numerical form for three words corresponding to one column or vertical scan line beam of a square or symbol having at least three intersections of the image lines of the symbol;

FIG. 23 is a schematic block wiring diagram of an encoding circuit for a word represented in FIG. 22;

FIG. 24 is a time diagram of the signal waves from correspondingly indicated parts of the upper third of the circuit shown in FIG. 23;

FIG. 25 is a time diagram of the signal waves from correspondingly indicated parts of the shift register shown in FIG. 23;

FIG. 26 is a schematic wiring diagram of a circuit for transferring the information from the encoder to the processor;

FIG. 27 is a diagram similar to FIG. 11*b* showing the number addresses of the words in each symbol rectangle or square;

FIG. 28 is a table of which written digits are classified into the four main groups according to the number of image intersections detected when being centrally vertically scanned;

FIG. 29 is a table of examples of different written symbols in squares and their processed forms;

FIG. 30 is a schematic block decision diagram of the flow in processing the symbols having one intersection as shown in FIG. 29;

FIGS. 31*a* and 31*b* is a block decision diagram of the flow in processing the symbols having two intersections;

FIGS. 32*a* and 32*b* is a block decision diagram of the flow in processing symbols having three intersections;

FIG. 33 is an enlarged digit 5 showing vertical scan lines and shaded regions of first, second, and third intersections;

FIG. 34 is a schematic block decision diagram detailing the merging of intersected lines on lower left hand side of a symbol image, i.e., block 4 in FIG. 32*a;*

Figure 35:
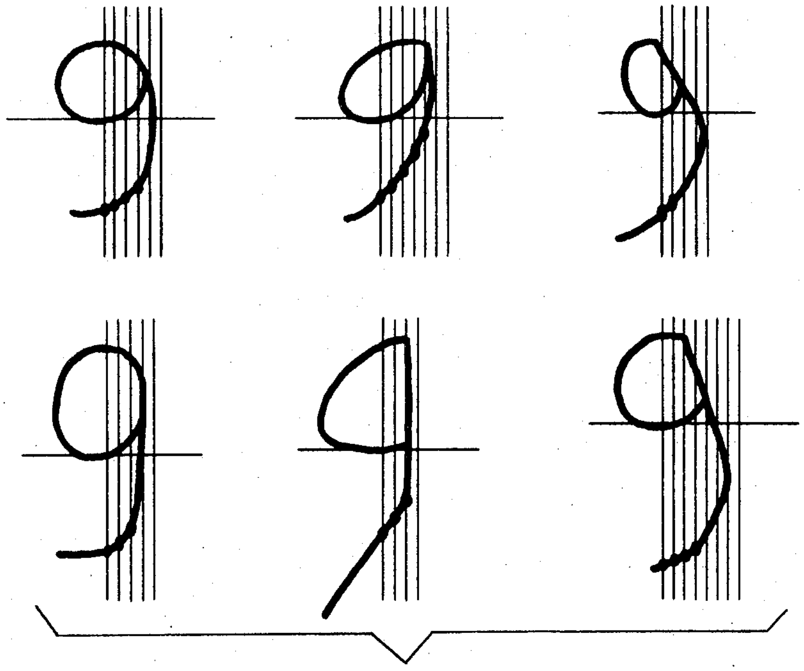
Figure 36:
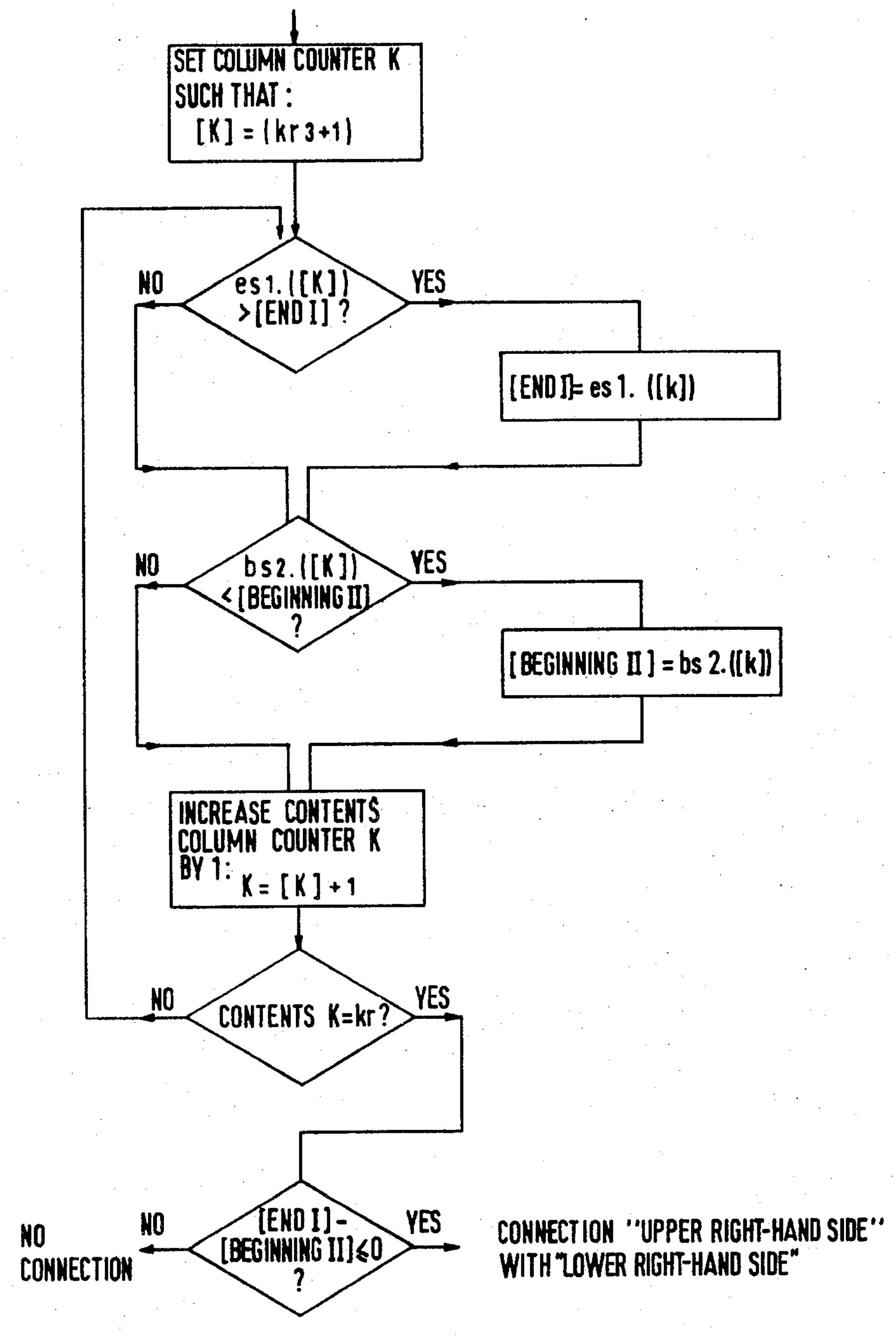

FIG. 35 shows six different ways of writing 9 with vertical scan lines over their left halves;

FIG. 36 is a schematic block decision diagram detailing the connection between the upper and lower right side of a symbol image, i.e., block 13 in FIG. 32*a;*

Figure 37A:
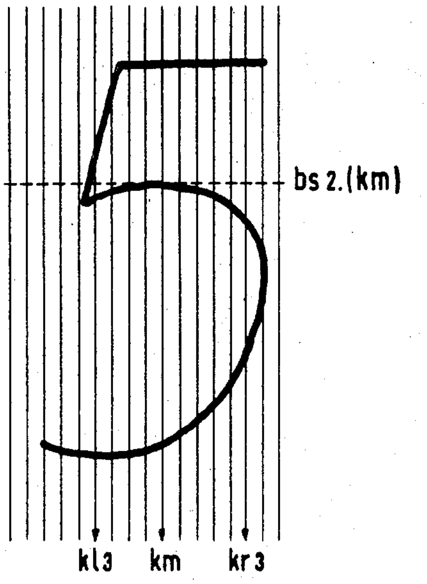
Figure 37B:
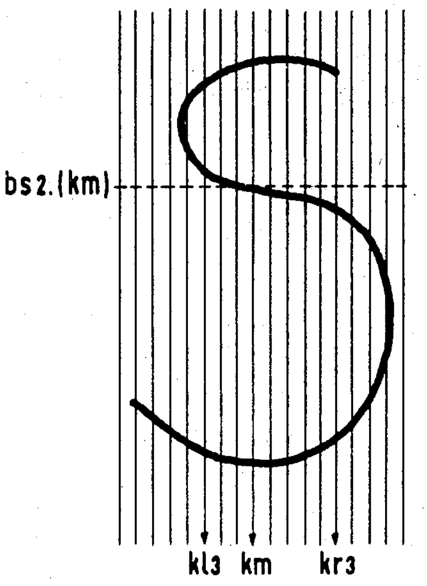
Figure 38:
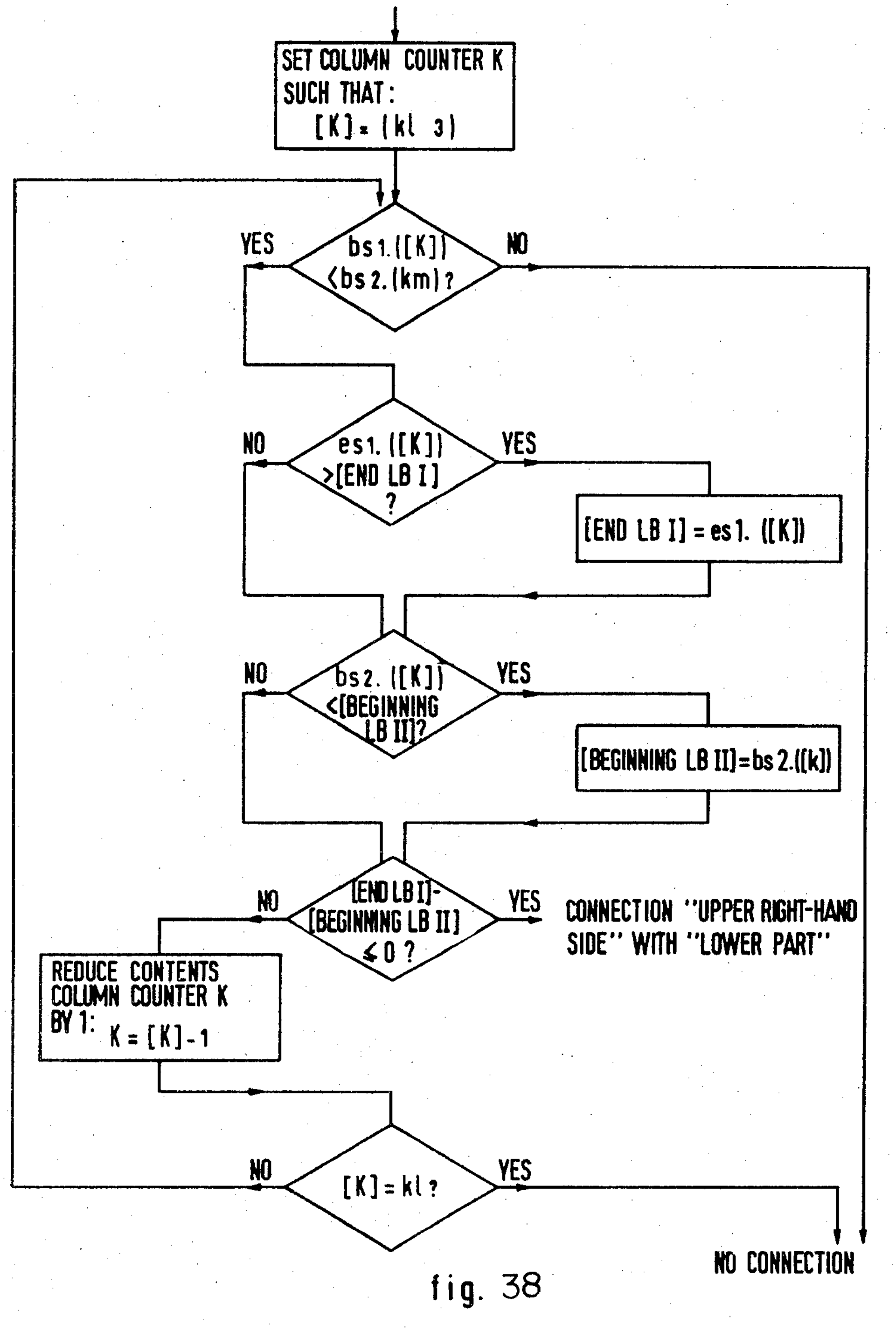

FIGS. 37*a* and 37*b* show enlarged written symbols of 5 and S, respectively, with vertical scan lines over them and their dotted upper-lower decision lines;

FIG. 38 is a schematic block decision diagram detailing the connection between the upper and lower left side of a symbol image, i.e., block 5 in FIG. 32*a;*

Figure 9:
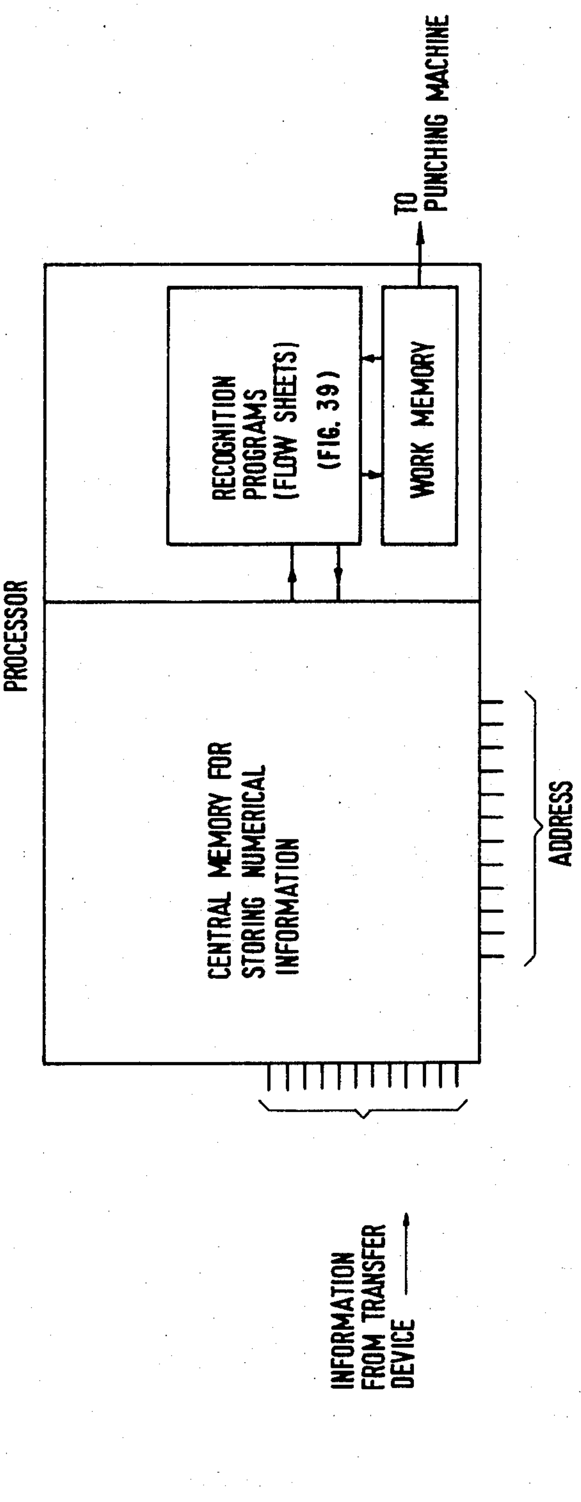
FIG. 9 is a more detailed general schematic block diagram of the processor portion of the diagram shown in FIG. 8.
Figure 39:
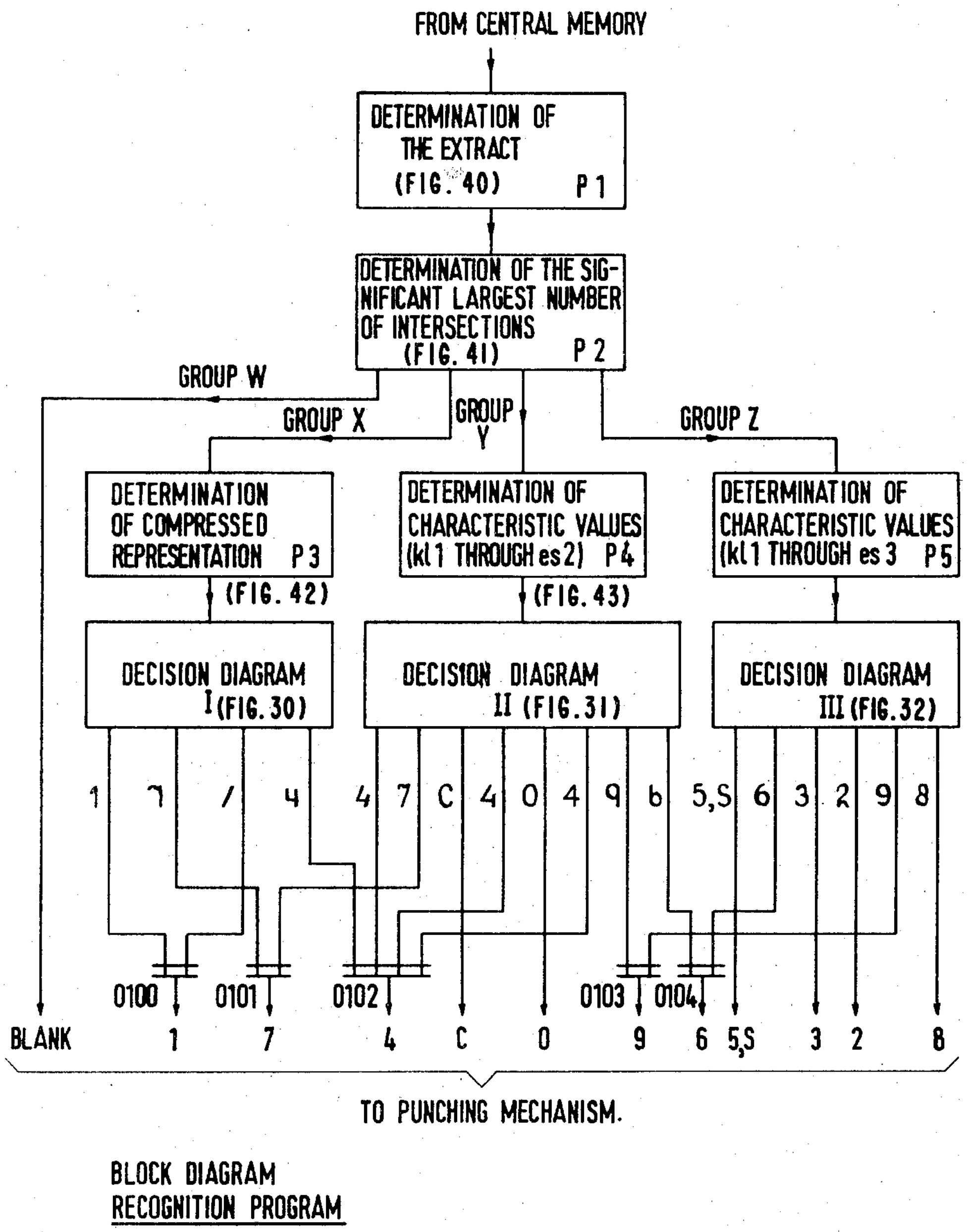
Figure 40:
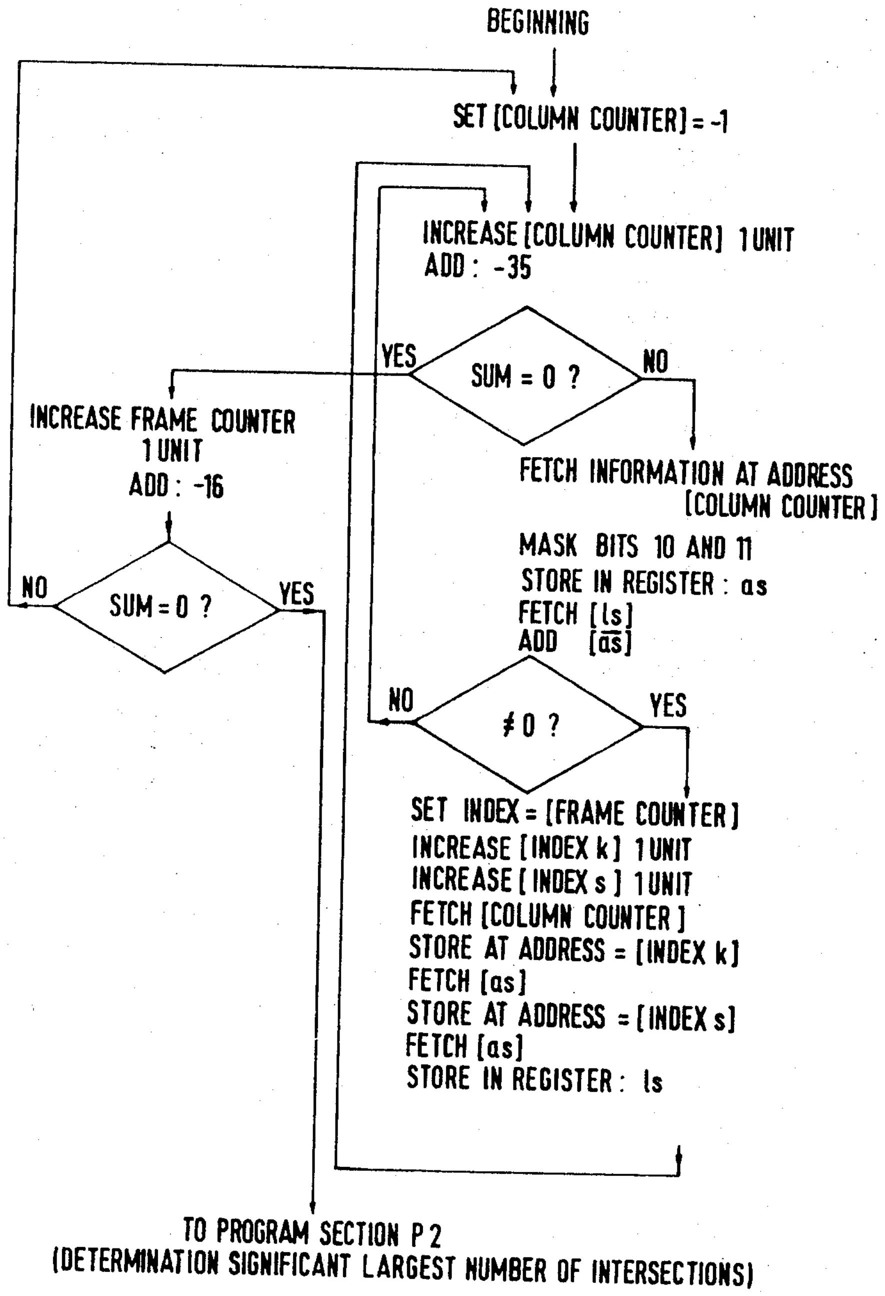
Figure 41:
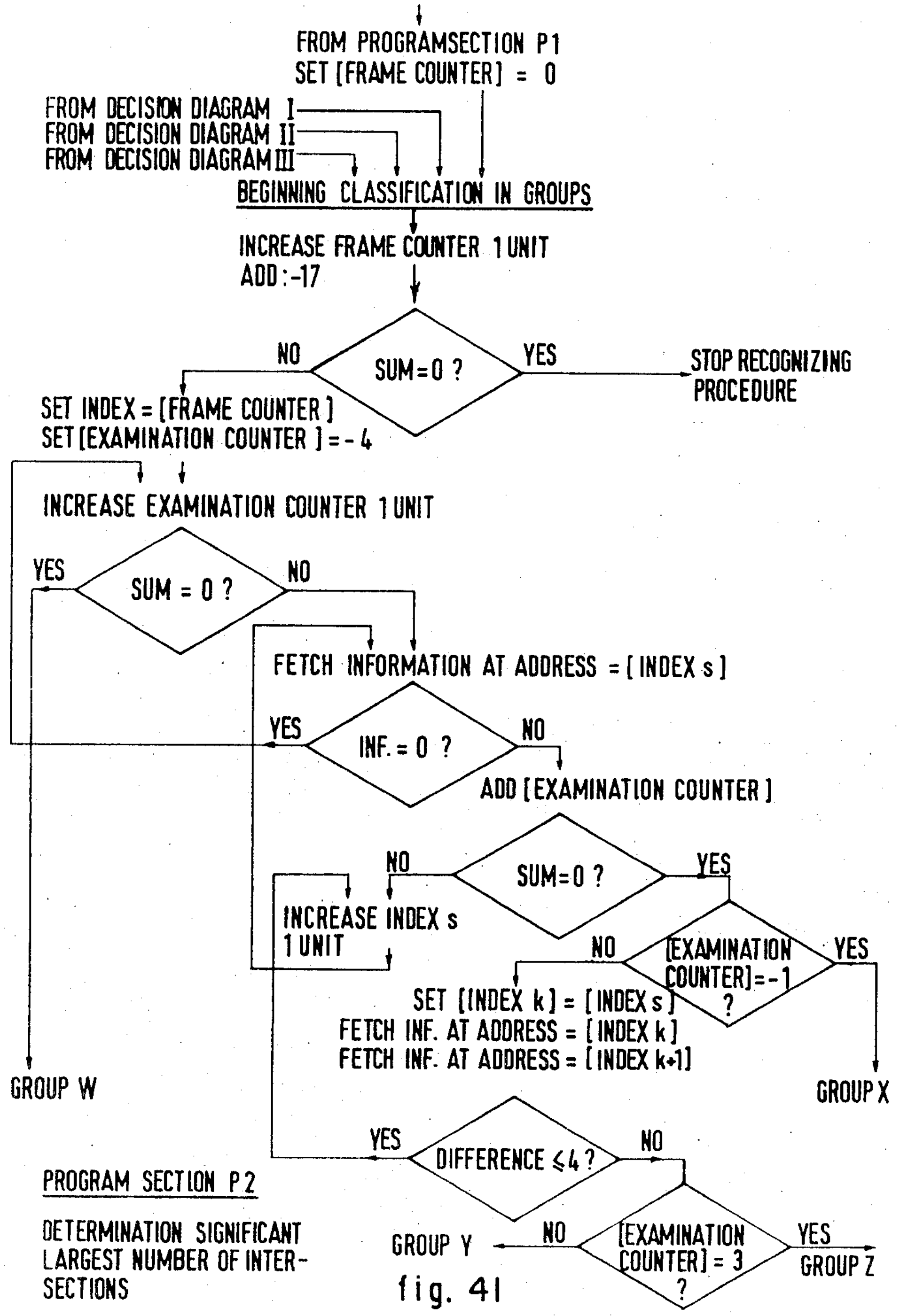
Figure 42:
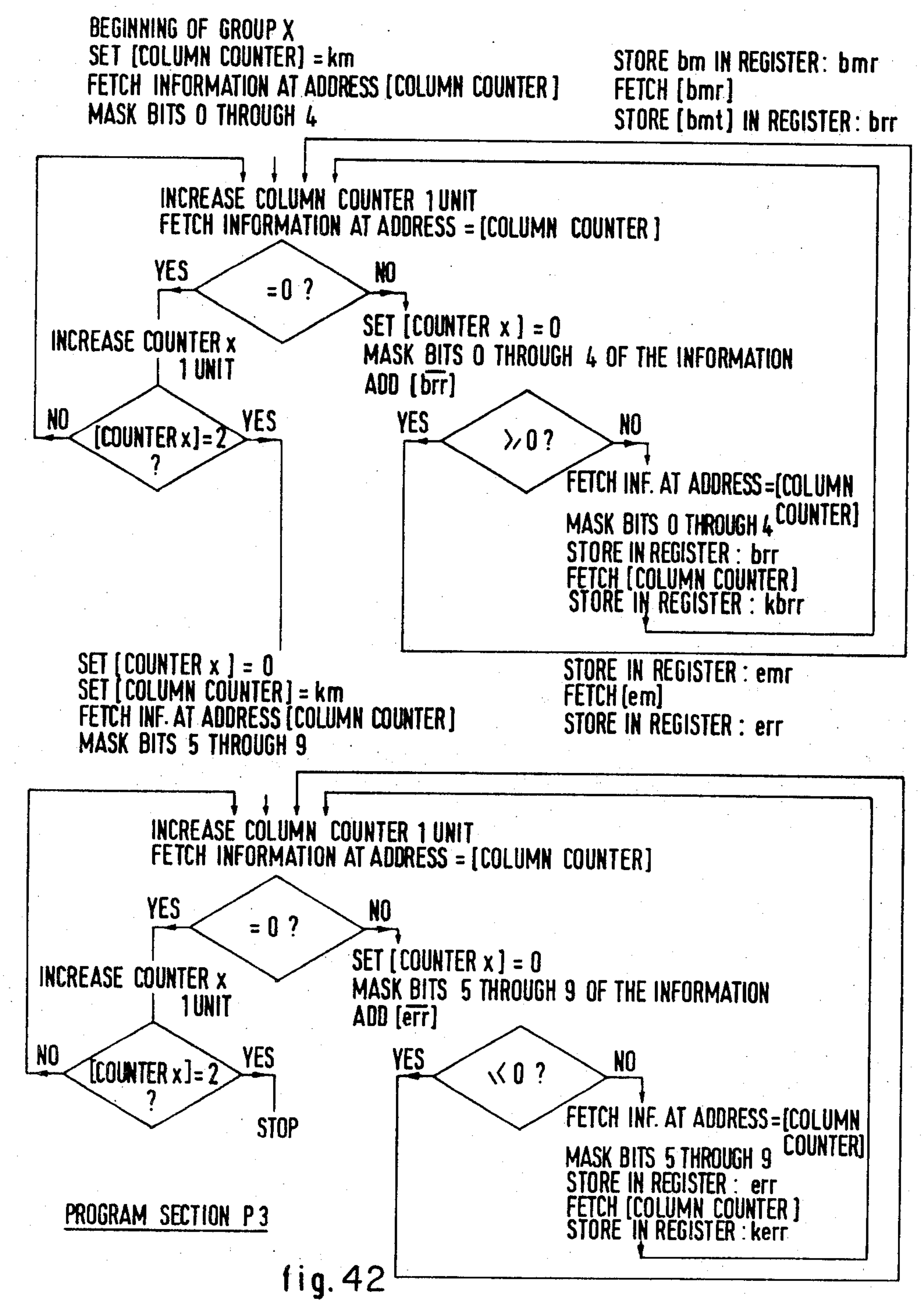
Figure 43:
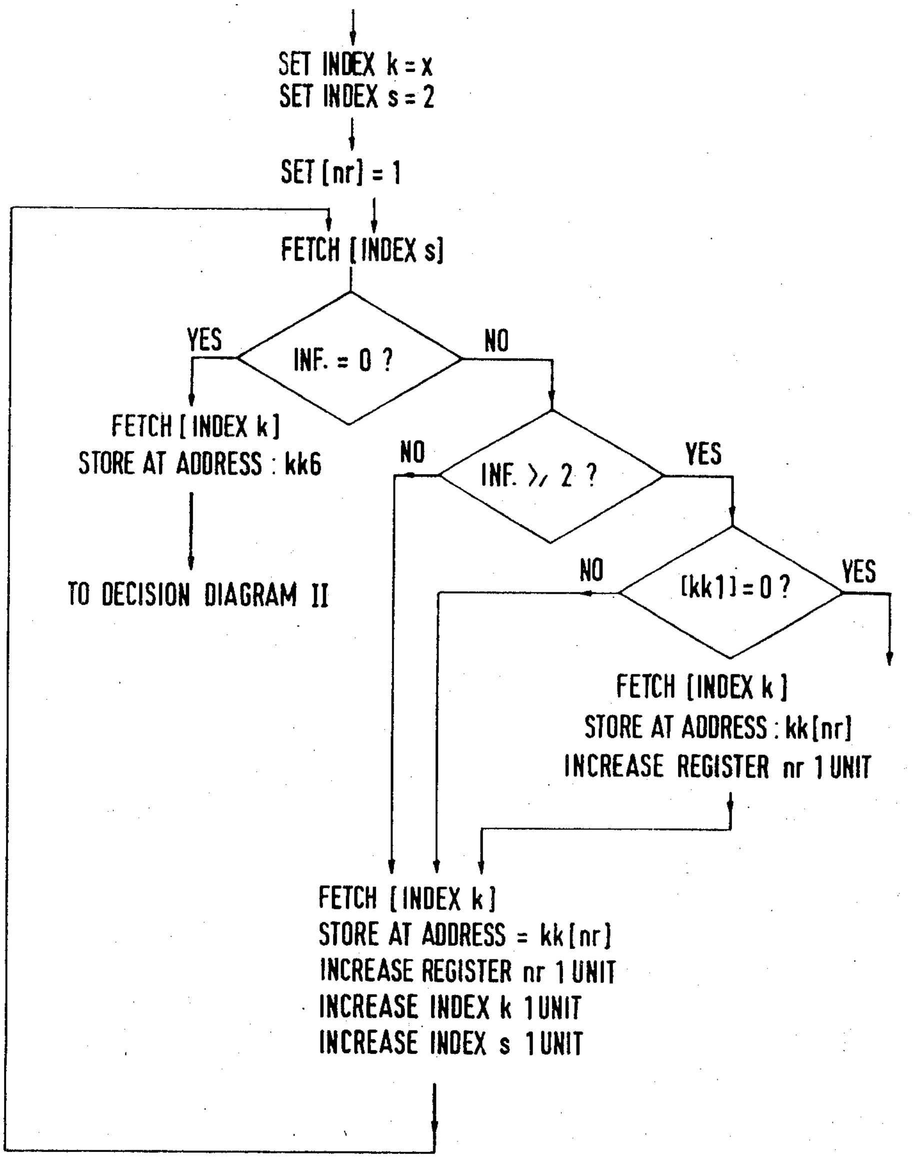
Figure 44:
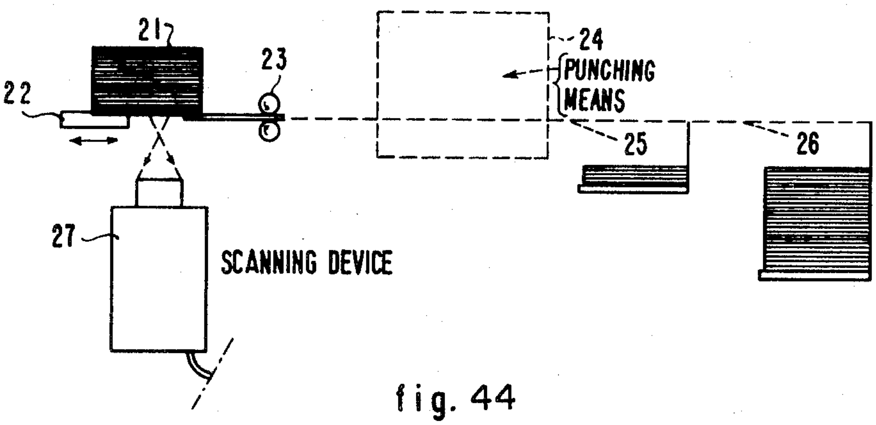
Figure 45A:
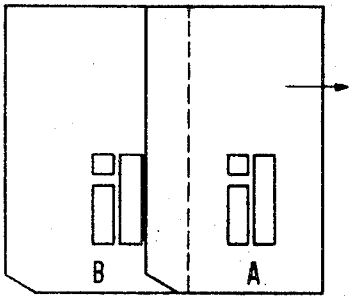
Figure 45B:
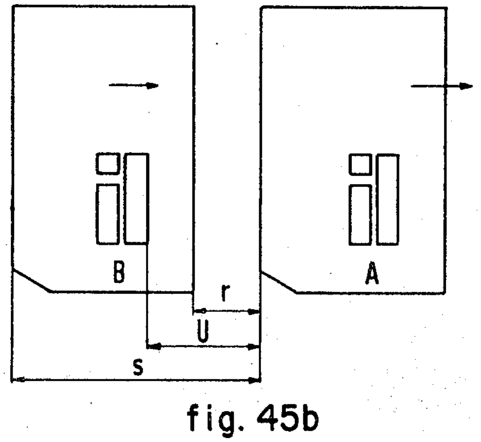
Figure 46:
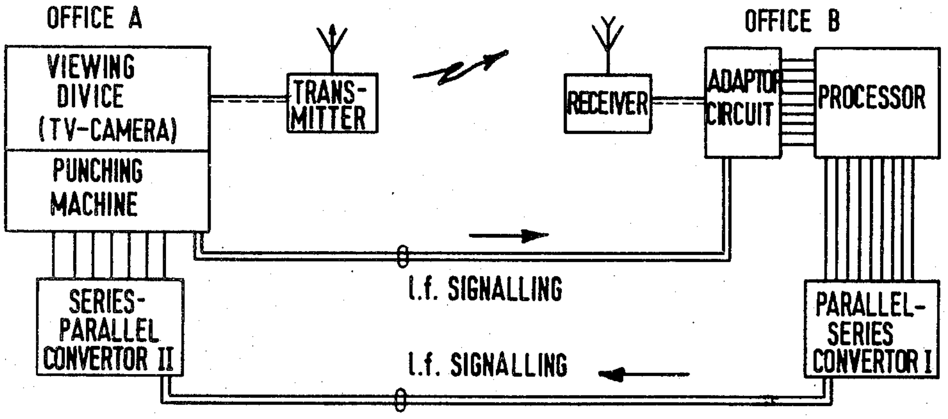

FIG. 39 is a more detailed schematic block wiring diagram of the recognition programs block shown in FIG. 9;

FIG. 40 is a schematic block decision diagram of the extract block P 1 shown in FIG. 39;

FIG. 41 is a schematic block decision diagram of the intersection number determining block P 2 shown in FIG. 39;

FIG. 42 is a schematic block decision diagram of the compression representation determining block P 3 shown in FIG. 39;

FIG. 43 is a schematic block decision diagram of the characteristic values determining block P 4 shown in FIG. 39;

FIG. 44 is a schematic flow of a document from a scanner through a punching machine into stacks;

FIGS. 45*a* and 45*b* show two successive cards or information carriers in two relative positions between which scanning occurs; and FIG. 46 is a general schematic block wiring diagram of a system in which the processor of this invention is remote from the document viewing and punching apparatus.

DETAILED DESCRIPTION OF PREFERRED EMBODIMENT

Figure 1:
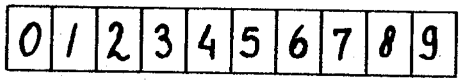
FIG. 1 is an example of the ten Arabic digits written in 10 equal rectangles or squares.
Figure 2:
FIG. 2 is an example of digits similar to FIG. 1 but with two dots printed in each of the rectangles to guide where the lines of the digits or figures should be written in each rectangle.
Figure 6:
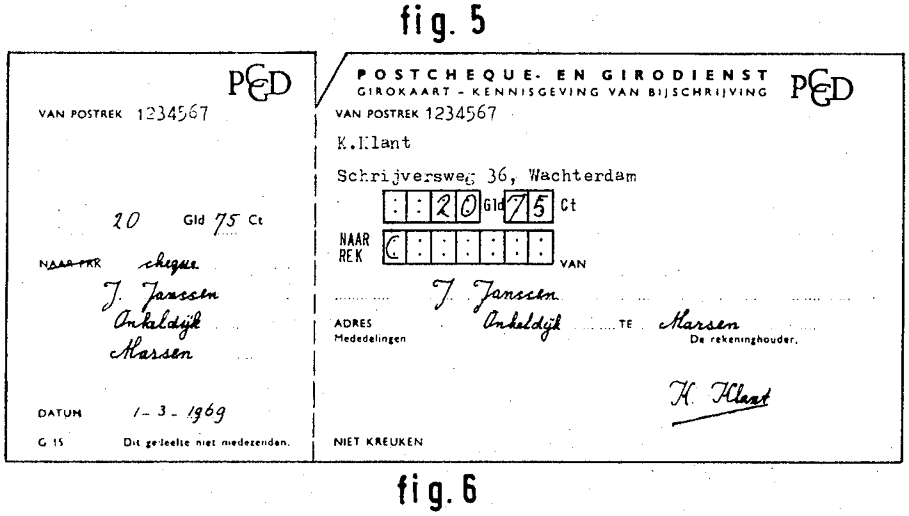
FIG. 6 is a specimen of a filled-in post check form similar to FIG. 4 used as a check.
Figure 7:
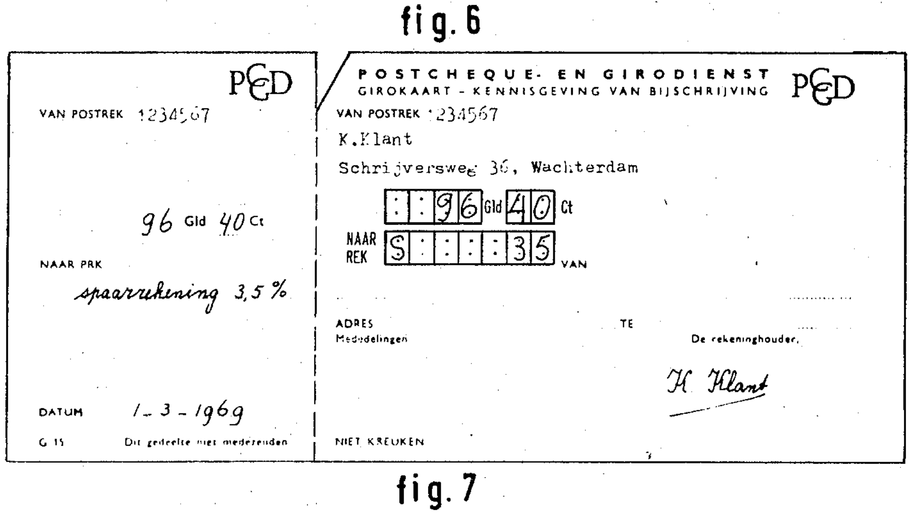
FIG. 7 is a specimen of a filled-in post check form used for a savings account.
Figure 8:
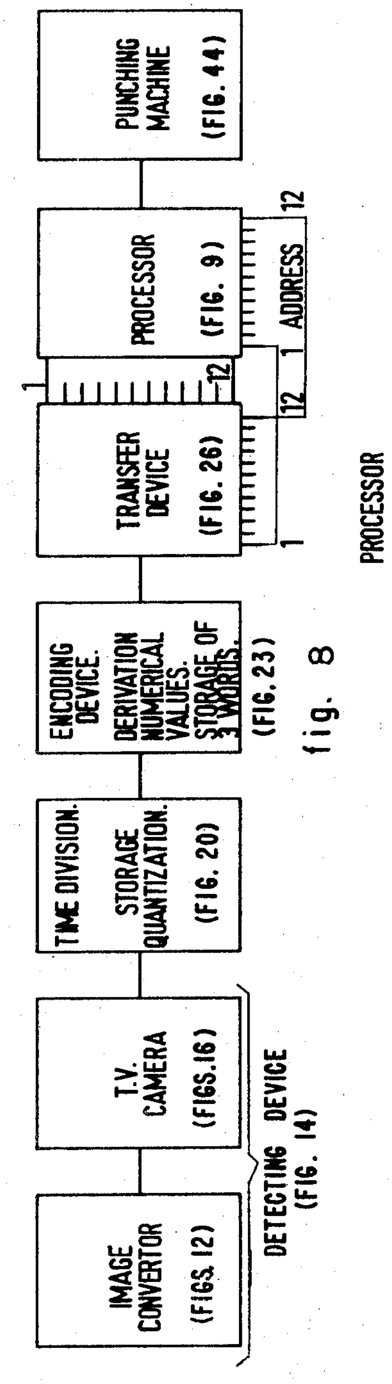
FIG. 8 is a general schematic block diagram of the system according to a preferred embodiment of this invention.

Outline:

| | | |
|---|---|---|
| 1. | Problem Analysis | FIGS. 1 – 2 |
| 2. | The Form | FIGS. 3 – 7 |
| 3. | The Principal of the Reading Device | FIGS. 8 – 9 |
| 4. | The Mechanical Detection | FIGS. 10 – 17 |
| 4.1 | General | |
| 4.2 | TV Scanning | FIG. 10 |
| 4.3 | Image Convertor | FIGS. 11 – 13 |
| 4.4 | The Detecting Device | FIGS. 14 – 15 |
| 4.5 | Time for Scanning | FIGS. 16 – 17 |
| 5. | The Quantization of the Video Signal | FIGS. 18 – 20 |
| 6. | The Encoding | FIGS. 21 – 25 |
| 6.1 | The Principle of the Encoding | FIGS. 21 – 22 |
| 6.2 | The Realization of the Encoding | FIGS. 23 – 25 |
| 7. | The Transfer of Information to the Processor | FIGS. 26 – 27 |
| 8. | The Recognizing Procedure | FIGS. 28 – 38 |
| 8.1 | Summary | |
| 8.2 | The Principle Involved | FIG. 28 |
| | Group W, No Intersections | |
| | Group X, One Intersection | FIGS. 29 – 30 |
| | Group Y, Two Intersections | FIG. 31 |
| | Group Z, Three Intersections | FIGS. 32 – 38 |
| 9. | The Recognition Apparatus | FIGS. 39 – 43 |
| 10. | Operating Speeds | FIGS. 44 – 45 |
| 11. | Other Application of the Arrangement | FIG. 46 — |

1. PROBLEM ANALYSIS

The basic problem is the automatic reading of written symbols, such as figures, i.e., the classification thereof. Usually the figures to be read are hand-written and originate from a large number of people. Consequently, the class limits of the figures to be read are undetermined. If a reading device is designed for reading handwritten figures without laying down any writing rules for the people writing these figures, it is impossible to define the specifications for such a reading device. Moreover, in that case the chance of an incorrect mechanical interpretation of the data is large, which is unallowable in a financial administration. On the other hand, the writing rules should leave as much freedom as possible in the shapes of the figures to be written.

Consequently, if the object is to design an automatic reading device, the first step will have to be the formulation of writing rules. A basic requirement can be that each figure should be written within one square and that the dimensions of the written figures are in accordance with the dimensions of the squares.

FIG. 1 is an example of figures written in rectangles or squares. It is to be expected that many people will have regard to the desired height of the figures, but that the figures will be too slim, for example the figure "eight" in FIG. 1. Too slim figures will produce problems in a mechanical recognition. A solution may be to print two dots in each rectangle or square as shown in FIG. 2. Without verbal instructions the writer is forced to write clearly, while still many variations in the shapes of the figures are possible.

In the case of a preprinted pattern as shown in FIG. 2, the writing rule may be: write each figure in one square.

The automatic reading device should comply with the condition that it must be able to read unambiguous, handwritten figures that are written within a square, the preprinted dots being enclosed by the written figures. The possibility of reading symbols other than figures is not excluded in this respect.

2. THE FORM

Figure 3:
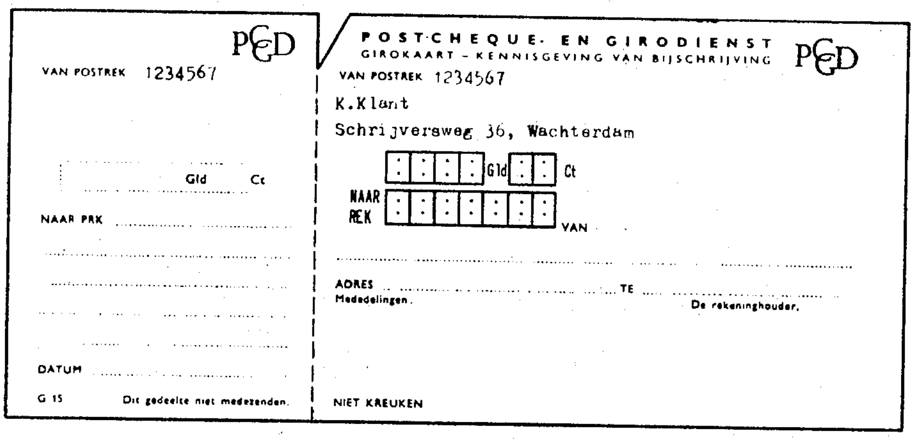
FIG. 3 is a specimen of a blank post check form or information carrier with rectangles thereon as shown in FIG. 2.

FIG. 3 shows a specimen of a giro (post check) form to be used. It differs from the presently used giro card in only a few respects. The texts and the lay-out can be substantially fully maintained, which would imply only a slight change for the holders of an account when this type of form would be introduced.

Only the numerical information written in the squares is of interest in the automatic reading procedure of the forms (FIG. 4).

For payments from holders of an account to non-holders of an account the forms can also be used as checks. Of course in that case no account number can be entered in the respective squares, i.e., second row of squares.

For an efficient processing of the giro forms it is imperative that these checks can be recognized by the automatic reading device.

FIG. 6 shows a specimen of a giro form used as a check. A character C is written in the leftmost square for the account number, while the remaining squares for the account number should remain blank.

Nowadays it is possible for holders of an account at the Postcheque- en Girodienst (Postal Check and Clearing Service) to open an interest-bearing or so-called savings account. Depending upon the notice of withdrawal, the interest amounts to 3.5, 4.5, 5.0 or 5.5 percent. The normal giro forms can be used for entering deposits in these savings accounts.

To obtain a maximally efficient input of all forms into the administrative system, it should be possible to process fully automatically also the forms for enterings on savings accounts.

FIG. 7 shows an example of a form used for depositing in a savings account with a rate of interest of 3.5 percent. In the leftmost square for the account number a character S is written to indicate that the amount is intended for a savings account. The right-hand squares are used to specify in which kind of savings account the indicated amount should be deposited or entered.

As regards the lay-out of the giro form also the following observations can be mad:

The squares are printed in a red colour. By means of filters it is ensured that the device reading the forms can detect only the written figures, while the squares in which the figures are written cannot be detected by the reading device. Of course it will be unallowable to use red ink for writing the figures.

Figure 5:
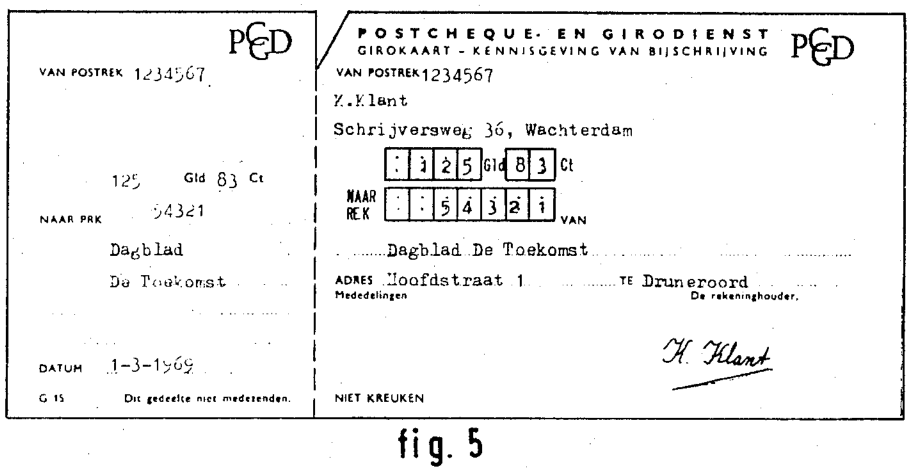
FIG. 5 is a specimen of a typed-in post check form similar to FIG. 4.

The horizontal dimensions of the squares are selected such that the numerical data can be readily provided also by means of the most current typewriters, namely by using an extra spacing (see the example shown in FIG. 5). In most typewriters the pitch between the symbols is 1/10 inch (2.54 mm). The width of the squares on the forms is two times 2.54 mm, consequently 5.08 mm (some tolerance is allowable).

For reasons to be given hereinafter, the ratio between the width and the height of the squares is set a 3 : 4. Consequently, the height of the squares is 4/3· 5.08 mm ≈ 6.77 mm.

The specimen shown comprises the required minimal number of squares. The lay-out of the form is such that the number of squares can be increased.

The preprinted dots in the squares are not essential for the reading device. They have a psychological effect, as a result of which it may be expected that one will be apt to write more clearly than when the dots would not be present.

3. THE PRINCIPLE OF THE READING DEVICE

The principle of the device is outlined in the block diagrams shown in FIGS. 8 and 9.

The automatic reading device, the design of which will be described in detail in the following chapters, comprises a number of components, viz:

The detecting device, which serves to convert the information written in the squares of a form into electrical signals, for which an image convertor and a television camera are used (FIG. 8).

The entire surface area of a form to be scanned is scanned in one cycle by means of the television camera. The camera produces an electrical series signal, i.e., a signal in which a plurality of pulses is available as a function of the time.

The information obtained from a form is first encoded in an encoding device. This is followed by the recognizing procedure. For this procedure an electronic computer is used, which is connected "on-line" with the encoding device.

The electronic computer may be a device of restricted capacity and will be indicated as "processor" (FIGS. 8, 9). Such a processor comprises a plurality of input channels for parallel receiving information offered from the outside. By means of the encoding device the television signal, which is a series signal, can be converted into a signal that is applied in parallel to the desired number of channels.

The recognizing procedure, which is programmatically carried out by the processor, is a new approach towards the problem of symbol recognition.

High tolerancies are possible in so far as the positioning, size and shape of the written symbols is concerned.

Briefly put, each square or vertical rectangle is scanned by a plurality of vertical image lines since the television camera is rotated 90° from its normal position. In the encoding device the information obtained during scanning is transformed to numerical values such that the further operations in the processor may be rather simple and require relatively little time. Depending upon the number of intersections of the scanning image lines with the symbols, the symbols to be recognized can be classed into three groups, viz. one having maximally one intersection, one having maximally two intersections and one having maximally three intersections. A further classification within each group is realized by means of characteristic features.

During the recognizing procedure in the processor, the obtained numerical values are subjected to certain operations. The characteristic features are present in the memory of the processor and are incorporated in so-called decision diagrams. In a number of cases the characteristic features are also determined by the dimensions of the symbol to be recognized. This is one of the reasons why high tolerances in the shapes of the written symbols are allowable.

4. THE MECHANICAL DETECTION 4.1

A rather seldom used but obvious method is to use a television camera as the scanning device. In the U.S. technical literature this method is indicated by: "videoscan."

As advantages can be mentioned:

- low costs, since a television camera is a normal article of commerce;
- good optical resolving power, so that also fine details of the image can be converted into an electrical signal substantially without deformation.

The photosensitive layer is scanned by a focussed electron beam. In such tubes the electron rate is relatively low, so that under normal circumstances no excessive screen dissipation occurs, which guarantees a reliable operation during a long period of time.

4.2

The scanning by means of a television-camera (this invention uses a television camera).

For the above reasons it is attractive to use a television camera. Moreover, no complicated scanning device has to be developed.

It is assumed that the camera produces the so-called European 625-lines standard signal. Most Western European countries have accepted this CCITT standard for their national television broadcasting systems.

The standard signal is fully specified.

Some important aspects are: each complete image consists of two time-successive fields of 312½ image lines each. One field comprises the even image lines while the other field comprises the odd image lines. Consequently, a complete image consists of 625 image lines. The frame frequency is 50 Hz, the line frequency is 15.625 Hz. Each image line comprises a sync pulse during which the image informaion is suppressed. At the same time each field comprises a sync pulse, which, however, is of far longer duration than the line sync pulse. Also during the vertical sync pulse the image information is suppressed.

The image ratio (width : height) is 4 : 3.

FIG. **10*a*** shows in which manner the scanning of a black ring on a white background can be effected within a field of image lines.

FIG. **10*b*** shows a plurality of image lines of the resultant television signal as a function of the time. The sync pulse is drawn at the beginning of each image line. It is sometimes said that this pulse reaches the "blacker than black" level. The image information during the remaining part of each line is in this case on the white or on the black level, since no grays are present in the optical image.

In FIG. 10 only a limited number of image lines of a field is drawn.

The duration of one full field is 1/50 sec. = 20 millisec. (msec.). The vertical sync pulse is present during 20 image lines and lasts 20 × 64 microsec. = 1280$\mu$usec. Consequently, 312½ - 20 image lines = 292½ image lines per field remain for the optical scanning. In this connection it should be observed that an optical image is projected onto the photosensitive surface of the camera tube, which has an image ratio of 4 : 3. In accordance with the above method, this entire surface area should be scanned by means of the electron beam. It is not possible to scan only a portion of this surface (so-called underscanning), in connection with the danger of damaging the photosensitive layer of the camera tube due to too high a local dissipation.

When the written numerical information of a giro form shown in FIG. 3 is to be scanned by means of a television camera, this is not readily possible in an efficient manner due to the image ratio of the surface area on the giro forms to be scanned. The dimensions of this surface area are: width: 35.56 mm, height: 15.04 mm. This results in an image ratio of 35.56 : 15.04 ≈ 2.3 : 1. To be able to utilize the entire photosensitive surface of the camera tube for the optical scanning of the giro form, the following image convertor can be used.

4.3 The image convertor.

The image convertor is used to form an image having a different image ratio of the surface area of a giro form to be scanned.

FIG. 11*a* shows the portion of a giro form to be scanned. An optical image thereof is projected onto one side of the image convertor. FIG. 11*b* shows in which manner the optical information is arranged after the conversion. The above description of the giro form stated that each square has an image ratio of 3 : 4. The converted image will have the same image ratio (FIG. 11*b*).

It is most effective to have the photosensitive window of the camera tube precisely covered by the image of the surface area to be scanned, and the optical magnification than can be adapted thereto once and for all. When the image is in the position shown in FIG. 11*b*, the photosensitive window of the camera tube must be scanned with vertical image lines.

The image conversion can be effected by means of an optical system composed of glass fibres. By means of glass fibre optics optical images can be transported. In glass fibre optics very thin glass fibres are used that are combined into bundles and are optically insulated from each other as the core of each glass fibre comprises a sheath consisting of a glass having a refractive index other than that of the core. Glass fibres can be manufactured up to a minimal diameter of 2 $\mu$ (0.002 mm). The cross-section of a glass fibre may have any desired shape, for example rectangular, hexagonal, oval, etc. Glass fibres can also be manufactured as composite bundles (multiple fibres).

Since the dimensions of the cross-section are in general very small relative to the length, glass fibres can be bent in accordance with a given curvature radius. Fibres having a diameter of 5 – 10 $\mu$ can be bent in accordance with a radius of 1 mm.

FIGS. 12*a* and 12*b* shows in which manner the desired image conversion can be realized by means of glass fibre optics.

In FIG. 12*a* the convertor is drawn in perspective, while in FIG. 10*b* the projections are drawn in accordance with the so-called U.S. projection method. In order to obtain a homogeneous filling in the image convertor, glass fibres of hexagonal cross-section must be used. Due to the application of glass fibre optics a certain distorsion occurs in the optical image to be transported, since the optical image is decompsoed into a number of image points that is equal to the total number of glass fibres. One may say that to a certain extent an optical quantization occurs. The image at the output of the image convertor is scanned by the television camera. Also the signal produced by the television camera will be quantized. The latter quantization is a time and amplitude quantization. One possibility would be to have the pattern of the time quantization of the television signal correspond with the optical quantization pattern of the image convertor. It will be clear that in that case great demands should be made on the deflection linearity of the television camera.

However, in accordance with the invention another possibility is to choose a much finer structure for the optical quantization pattern of the image convertor than for the time quantization pattern of the television signal. In the choice of a favourable optical quantization pattern the following considerations apply:

- a field in the television signal contains 292½ image lines with image information. When an industrial television camera is used, the photosensitive surface area of the camera tube is 9 × 12 mm². Consequently, the centre distance $s$ (FIG. 13) of two successive image lines is: $s$ = 9/292½ mm ≈ 0.030 mm (30 $\mu$).
- at the photosensitive layer the electron beam in the camera tube has a circular cross-section. A resolving power of 900 image lines can be easily obtained by a proper focussing of the electron beam. This implies that 1800 image elements, which are alternately black and white and lie on a straight line, can be distinguished as separate image elements. The shortest side of the image window is 9 mm, so that the diameter $d$ of the electron beam at the window should be:

$$d = 9/\mathbf{1800}\ \text{mm} = 0.005\ \text{mm}\ (5\ \mu).$$

FIG. 13 shows the situation when the image convertor is scanned by an electron beam having a diameter $d$;

the length of the side $z$ of the hexagonal glass fibres is chosen 6.6 $\mu$.

The electron beam moves in vertical direction along the image lines, of which only portions of the image lines $l_1$ and $l_3$ are shown in the drawing. The image lines $l_1$ en $l_3$ are successive image lines of the odd field.

In FIG. 13 the electron beam each time coincides with the centre of a column of glass fibres. This is the case over the entire frame only when there are no deviations in the deflection linearity. However, even without this the scanning device will be able to function properly.

4.4 The detecting device.

FIG. 14 shows the arrangement of the entire detecting device. The document 1 to be scanned is illuminated by the lamp 2. By means of the lense 3 the optical image of the portion carrying the written numerical information is reduced and projected onto the input side of the image convertor 4.

The output side of the image convertor 4 is placed in front of the photosensitive window of the camera tube 6, with an optical filter 5 being interposed. The optical filter is a plano-parallel glass sheet, which is a high transmission coefficient to red light while the transmission coefficient to other colours should be low. Consequently, the red print on a giro form does not cause a variation in the television signal when scanning the form. In other words: the camera 6 does not "see" the colour red. An optical image having the configuration shown in FIG. 11*b* is projected onto the photosensitive window of the camera tube in such a manner that the entire window is covered. Now the required optical magnification obtained by means of the lens 3 can be determined.

As mentioned in section 4.3 above, the dimensions of the photosensitive window of the camera tube are $9 \times 12\ mm^2$. Consequently, the dimensions of the frame at the output side of the image convertor should also be $9 \times 12\ mm^2$.

From the drawing shown in FIG. 11b, in which the image at the output side of the image convertor is shown, and from the dimensions of the squares it can be concluded that the optical magnification *a* should be: $a = 9/\mathbf{20.32} = 0.44$.

Now the minimal line thickness of the symbols to be detected by the reading device can be determined. Suppose that a vertical line having a (minimal) line thickness *w* is present on the giro form. At the output of the image convertor the line thickness of the image is $a{\cdot}w$ (FIG. 15), *a* being the optical magnification.

In FIG. 15 a portion of the projected vertical line is shaded. The width of the image is $a{\cdot}w$. The image is scanned by the image lines of an odd field. It appears from FIG. 15 that a vertical line can always be detected by at least two adjacent image lines, when:

a.w. ⩾ 2 4/9 s, in which *s* is the centre distance between two successive image lines of a field.

The minimal line thickness is:

$$w_{min} = 2\text{-}4/9\ s/a$$

Epressed in numerical values:

$$w_{min} = 2\text{-}4/9 \times 0.030/(0.44)\ \text{mm}$$

$$w_{min} \approx 0.16\ \text{mm}.$$

As regards the detecting device schematically shown in FIG. 14 it is further observed that the deflection and focussing coils 7 are rotated through 90° relative to the position in which they are used for normal television purposes, so as to perform the scanning by means of vertical image lines.

4.5 The time required for the scanning process.

In order to obtain an insight in the problems arising when a television camera is used for scanning successive, different forms, first the operation of the camera tube will be described briefly. It is assumed that the television camera comprises a so-called vidicon. A vidicon is a type of camera tube that is frequently used in industrial television equipment.

Of course it is also possible to use other types of tubes.

FIG. 16*a* shows that by means of a lens 3 an image of the object 8 can be projected onto the front of the vidicon 6. This front is covered with an optically flat glass plate 9. A transparent electrically conducting layer 10 is placed behind this plate and is electrically connected to the annular signal electrode 11. The transparent layer 10 comprises a thin layer 12 of a photoconductive material. This material has a high electrical resistance in darkness; when it is exposed to light, the electrical resistance decreases depending upon the amount of light. The electron beam 13 is formed by means of other electrodes (not shown in the drawing) and a magnetic focussing field 7 (see FIG. 14). The electric replacement diagram of the front of the vidicon is shown in FIG. 16. The entire photosensitive window of the tube can be considered to be composed of a large number of elements consisting of a capacitor C and a resistor R connected in parallel therewith. All these elements are electrically interconnected at one end by the conductive layer 10 (FIG. 16*a*), while the parallel resistor R is formed by the local resistance of the photoconductive layer 12. The value of this resistance depends upon the local illumination.

FIGS. 16a and 16b schematically show that the signal electrode 11 is connected through a resistor 14 to the potential +U. The television signal is collected at point P.

When an element, as shown in FIG. 16*b*, is hit by the electron beam, one end of the capacitor is brought to a low potential (cathode potential). The end connected to the signal electrode has a much higher potential.

If an element remains dark, the parallel resistor R has a high value. In that case only little charge will flow away from the capacitor C through this resistor. The electron beam periodically hits each image element. When some charge has flown away, this charge will be replenished at the moment that the image element is hit by the electron beam. This out-of-balance current also flows through the signal electrode to the external load resistor 14. When an image element is exposed to light, the parallel resistor R has a smaller value and in that case the change of the charge of this image element at the moment it is hit by the electron beam is much larger.

All the image elements are successively scanned by the electron beam, so that the out-of-balance current of all image elements flows via the signal electrode 11 through the load resistor 7 and form at the point P an electrical signal that, as a function of the time, is representative of the local illumination of the image elements. The signal at the point P is the output signal of the camera tube and is called the video-signal.

The camera tube has a high sensitivity, since the changes of the charge as a result of the illumination are integrated over the time between two successive scannings by the electron beam. The time between two successive scannings is twice the duration of the field (since one field is not used). This property should be taken into account when using the camera tube in the above scanning device.

If a form is to be scanned by the television camera, the following requirements should be complied with:

the form should not move relative to the camera;

if the image information of a specific field is to be stored, the optical image of the form must have been projected onto the photo-sensitive window of the camera tube during at least twice the duration of the field, in connection with the integrating function of the photosensitive layer in the camera tube.

FIG. 17 shows in which manner the time diagram of a complete scanning cycle is composed. It should be taken into account that only the even or the odd image lines are to be used optionally. Suppose that a field with the odd image lines is used. At an arbitrary moment $t_0$ a form is placed in front of the camera. A vertical sync pulse for an odd field appears for the first time at $t_1$. In the most unfavourable case the time from $t_0$ to $t_1$ is slightly less than twice the duration of the field, i.e., $t_1 - t_0 < 2 \times 20$ msec. The interval between $t_1$ and $t_2$ is the required integrating time during which the optical image should be projected onto the camera tube. In the time 3 (FIG. 17) all information stored prior to $t_1$ is erased by the electron beam and an odd field scan is selected (see FIG. 19 described later. An odd field reappears at $t_2$ and the information obtained during this field can be stored. An even field appears at $t_3$ and from this moment the form can be transported.

Consequently, the time during which the form should lie still and the written numerical information should be visible to the camera amounts to at least 5 × 20 msec = 100 msec.

When this method is used, no optical shutter has to be mounted on the television camera.

5. THE QUANTIZED VIDEO SIGNAL

As stated above, the video signal produced by the television camera should be quantisized both in amplitude and in time. The quantization in amplitude can be realized by means of a limiter circuit, at the output of which the signal can have only two values, indicated by "white" and "black." Such circuits are known. For the quantization in time a choice should be made as regards the number of units into which each image line of the television image should be subdivided. It should be born in mind that each image line is used to successively scan four different squares (see also FIG. 11*b*).

porarily stored. encoded and transferred to the processor. These operations are realized during time units 32–63 of image line 1 (FIG. 18), consequently, during the scanning of the next square. The information obtained during the next time units 64–95 can again be applied to the circuit. The processing of this information takes place during time units 96–127. The shaded portions in FIG. 18 schematically show during which time units the information is stored by the circuit; during the other time units no information is stored. After the first image line the next odd image line is 3 and then the information is stored by the circuit during time units 32–63 and 96–127. When considering image lines 1 and 3 together, it appears that vertically contiguous scanning times are obtained.

Taking into account the minimal line thickness of the written information (see section 4.4 and FIG. 13), it can be stated that the above procedure has the same result as when only half the number of image lines of a field is used. Each square is scanned by 70 image lines; the information of 35 image lines is used effectively.

The total number of information bits used per square, consequently, is 35 × 32 bits = 1120 bits. This implies that per field and, consequently, per giro form, an amount of information of 16 × 1120 bits = 17,920 bits is obtained.

It will be clear that this amount of information, although already a considerable reduction is applied thereto, is a consequence of the optical resolving power of the detecting device.

The following considerations have served in determining the numerical value of the time units into which an image line should be divided:

| | | |
|---|---|---|
| line frequency | 15,625 | Hz |
| the duration is, consequently, | 64 | μ sec |
| duration of the line sync pulse | 11.84 | μ sec − |
| nett available time per image line | 52.16 | μ sec |
| possible duration of a time unit: 52.16/128 μsec | 0.407 | μ sec |
| chosen is: one time unit = | 0.400 | μ sec |
| frequency of the generator | $1/0.4 \times 10^{-6}$ | Hz = 2.5 MHz |

Consequently, each image line should be initially subdivided into four identical portions. Each fourth portion of an image line corresponds with the height of a square. Suppose that each square is to be vertically subdivided into 32 units. Then each image line should be subdivided into 4 × 32 units = 128 units. This can be realized by means of a generator that sets off 128 equal time units on each image line. The number of 32 is chosen to render the resolving power in the horizontal direction substantially equal to that in the vertical direction.

It was stated in section 4.2 that per field 312½ − 20 = 292½ image lines are available. Taking into account some tolerance for the positioning of the giro form relative to the television camera, it can be assumed that 280 image lines can be used for the scanning.

Also in the horizontal direction the image to be scanned comprises four squares (see FIG. 11*b*). Consequently, each square is scanned by 280/4 image lines = 70 image lines.

The procedure described hereinafter can be followed in order to process the information obtained by means of relatively few devices. Suppose that the field having the odd lines is used for scanning. During time units 0–31 a portion of the upper square is scanned by the first image line. The thus-obtained information is temporarily stored.

The manner in which the desired television field is obtained and in which the quantization is realized will be explained with reference to FIGS. 15, 17 and 18.

FIG. 19 shows a number of signals as function of the time; FIG. 18 shows the required basic circuit. The points of time $t_0$ through $t_3$ of FIG. 19 correspond with the points of time $t_0$ through $t_3$, respectively, of FIG. 17.

First it will be ascertained in which manner the storing time shown in FIG. 17 can be obtained by means of the circuit shown in FIG. 20. The time diagram of FIG. 19 indicates that at $t_0$ the polarity of the storing signal is reversed. This indicates that a giro card lies still in front of the camera. It is assumed that the giro forms to be processed are taken one by one from a stack by means of a mechanism. This mechanism commands, for example, a switch or a photoelectric cell, by means of which the storing signal is obtained. When a form is in the proper position for scanning, the storing signal is of reversed polarity during a short period of time. When this occurs at $t_0$, also the trigger Tr 1 (FIG. 20) is switched at this point of time. Ther vertical sync pulses are inverted by means of the inverting amplifier V1 and are applied to a divider-by-two (divider *a*). The polarity of the signal at the output of this divider indicates whether there is an even or an odd field.

When the trigger Tr 1 has been switched, at the beginning of the next even field the divider *b* will be switched via the AND gate E 1. The output 1 of divider *b* is connected to the input of divider c.

The outputs 1 of dividers *a* and *c* and the output 2 of the divider *b* are connected to the AND gate E 2.

It appears from the time diagram shown in FIG. 19 that during the fifth field all the inputs of the AND gate E 2 have the same polarity. A pulse appears at the output of the amplifier V 2, which pulse is present during the field in which the form is scanned. The pulse is indicated by "storing time."

At the end of the storing time a reset pulse *r* is formed by means of the pulse shaping network D 1. The circuit is reset to the initial positon by means of this reset pulse.

128 pulses having a duration of 400 nsec. must be formed by means of a generator during each image line within the storing time. These pulses will be called the clock pulses *k*.

The bottom thru waves forms in FIG. 19 show the beginning of the storing time at an enlarged fime scale. It is assumed that the storing time commences at $t_v$. At $t_w$ starts the first line sync pulse within the storing time. After termination of the line sync pulse, consequently at $t_x$, the generator producing the clock pulses *k* can be actuated.

The circuit shown in FIG. 20 schematically indicates that the generator G producing the clock pulses k can be actuated and de-actuated under the control of the trigger Tr 2.

The trigger Tr 2 is actuated from the AND gate E 3.

During the storing time the AND gate E 3 is deblocked.

At the output of the pulse shaping network D 2 a pulse is produced at the trailing edge of each line sync pulse ($t_x$), by means of which the trigger Tr 2 is switched at that point of time. When the generator has produced the required number of clock pulses, the trigger Tr 2 is reset by means of a signal e to be described hereinafter, and the generator G is blocked. This is repeated for each image line within the storing time.

6. THE ENCODING 6.1 The principle of the encoding.

As mentioned in chapter 5, total number of 17,920 information bits are obtained during the scanning of a giro form.

Since a processor is used for the recognizing procedure, all the information obtained could be directly stored in the processor. In that case, however, all the information bits must be processed one at the time so as to be able to determine the interrelationship in the bit pattern obtained. This would require rather a large part of the available capacity of the machine. The following encoding method provides a solution for this problem. This method is based on the fact that the television signal is a series signal, which implies that there are points in the circuit where all the information bits are offered in series as a function of the time.

The quantisized information per square, which information is obtained during scanning, can be represented as a rectangle which is subdivided into 35 × 32 units. Each unit corresponds with an information bit of the quantisized information. FIGS. 21*a* and 21*b* show these representations of the quantisized information per square.

In each rectangle one of the possible symbols is shown. In accordance with this representation the properties as to the shape of each symbol are laid down in 35 columns, each containing 32 units (image elements).

By means of the encoding method to be described it is expressed per column:

a. whether the column contains significant black image elements (The number of image elements per column that has to be detected in order to be indicated as being significant may be one or more depending upon the requirements set);
b. the number of times that an image line intersects the written symbol;
c. the numbers of the elements representing the beginnings and the ends of the intersections.

The information obtained remains substantially unchanged during this pre-encoding; only the representation thereof is brought into a form such that the information can be readily processed by a processor. Therefore the choice of the representation will partly depend upon the choice of the processor to be used. In the following it is assumed that a processor is used in which the word length is 12 bits.

If the maximal number of significant intersections is supposed to be three (see also the symbols shown in FIGS. 21*a* and 21*b*), the information of each column can be incorporated in three processor words.

FIG. 22 shows the representation of the information of a column in encoded form. The bits of each processor word are numbered 0 through 11. The number of intersections in the column is expressed in bits 10 and 11 of the first word in the following manner:

00 → blanc column
01 → one intersection
10 → two intersections
11 → three intersections Each possible position of beginning or end of an intersection can be indicated by the numbers of the elements relating thereto.

Since each column contains 32 elements, each position can be encoded by means of 5 bits. The beginning of an intersection is expressed in bits 0 through 4 of the word relating thereto.

The end of an intersection is expressed in bits 5–9.

Situations may occur in which more than three intersections per column are present. For the recognizing procedure it is desirable that these situations are detected. As will appear from the description of the recognizing procedure, the storing is desirable only when the number of intersections is more than three. This situation is encoded by giving bits 10 and 11 of the first word the value 1 (three intersections), while bits 0 through 9 are given the value 0.

It can be determined in a rather simple manner how many words are required for storing the information contained in the squares of a giro form. 35 columns are available for the information of each square. Consequently 34 × 3 words = 105 words are required for each square.

The converted image to be scanned contains 16 squares (see FIG. 11*b*), so that a total number of 16 × 105 words = 1680 words are required for storing. This number partly determines the choice of the processor to be used, in connection with the available memory space of the processor. 6.2 The realization of the encoding The encoding method described can be realized by means of the circuit shown in FIG. 23.

This circuit comprises a provision by means of which the storing of the information can be realized in accordance with the configuration shown in FIG. 18.

As described in chapter 5, during the storing time the generator G (FIG. 20) is actuated at the beginning of each image line, which generator produces the clock pulses *k*. These pulses are applied to the counter 1 (FIG. 23). This is a binary counter comprising five outputs *a* through *e*, respectively. The counter has 32 different positions (0–31).

When the counter is in the position 31 at the beginning, this state will be reached again after 32 clock pulses *k* have been applied to the input. The outputs *a* through *e* are connected to the AND gate E 4, at the output *ekl* of which a potential reversal will occur when reaching the position 31. The position of the counter 1 constantly corresponds with the number of an image element in a column, as shown in FIG. 21. Each time that 32 clock pulses have appeared, consequently at the end of a column (one-fourth image line), the polarity at the output *ekl* of gate E 4 is reversed. The output of E 4 is connected to the divider 1; this is a divider-by-two, which, consequently, is switched after 32 clock pulses.

The line sync pulses are applied to the divider 2, which is also a divider-by-two. It appears from the time diagram shown in FIG. 24 that there is succession of potentials at the output of the OR gate O 1, which is in accordance with the desired storing pattern (see FIG. 18). Consequently, series of clock pulses sk appears at the output of the AND gate E 7.

The number of intersections per series of clock pulses, consequently per column, is determined by means of the counter 3 in the following manner.

The video signal is applied to a limiter circuit (FIG. 23). At the output thereof the potential can have only two values, viz. one corresponding with the "black" level and the other with the "white" level, on the form to be scanned. Upon each change from the "white" to the "black" level of the limited video signal, the contents of counter 3 should be encreased one unit.

An interruption in the "black" level during one image element of one image line is considered non-significant. The end of an intersection is determined only after two successive elements have "white" level, which is ascertained by applying the output signal of the limiter to the information input of the shift register 1. This shift register operates under the control of the pulses *s k* and contains one section. The information as regards the penultimate unit stored is always present at the output of shift register 1.

FIG. 25 shows the situation in which the video signal initially has the "white" level; after this during some image elements the "black" level appears. There is an interruption of one image element (If an interruption of more than one image element is to be neglected, the shift register 1 (FIG. 23) should comprise a number of sections equal to the number of intermediate white image lines which are not to be detected as interruptions).

The storage of information in the shift register 1 is realized at the trailing edge of the pulses *s k*, consequently at $t_1$, $t_2$, $t_3$ etc. During the pulse *s k* following $t_2$ the two inputs of the AND gate E 10 have the same polarity. By means of the first pulse at the output of E 10 it is indicated that the beginning of an intersection is detected. The end of an intersection can be detected by means of the AND gate E 9, provided that during a pulse s k the video signal is on the "white" level and that also at the output of shift register 1 the information "white" is present to indicate that also the penutimate unit was "white."

The trigger Tr 3 is controlled by means of the output pulses of E 9 and E 10. The use of a trigger is imperative, since in the case of a larger number of contiguous black or white elements appear in a series of pulses at the outputs of gates E 10 and E 9, respectively.

The inputs of the pulse shapers PV 1 and PV 2 are connected to the outputs of the trigger Tr 3. At the beginning of an intersection, a pulse appears at the output bs of pulse shaper PV 2, while at the end of an intersection a pulse appears at the output es of pulse shaper PV 1. The pulses bs are applied through the AND gate E 29 to the input of counter 3. When three pulses have been applied to the counter 3, and AND gate E 29 is blocked. At the beginning of each intersection, consequently, the contents of counter 3 are increased one unit, provided the counter is not in the position 3. By means of the method described, in which shift register 1 has the function of a store for the penultimate bit, it is achieved that the presence of short interruptions in an intersection has no consequences for the final result.

It is observed that the point of time at which the end of an intersection is detected is shifted one unit with respect to the quantisized information. The polarity at the outputs *x* and *y* of counter 3 indicates how many intersections are detected in the respective column. At the beginning of each column the counter 3 is set in the rest position. The outputs of counter 3 are connected to the separator circuit US. This is a composite gate circuit comprising three outputs, *sn* 1, *sn* 2 and *sn* 3, respectively.

In the position 1 of counter 3 the output sn 1 of the separator circuit has a potential different from that of the two other outputs, etc. By means of the gating circuits E 11 through E 16 pulses are formed marking the beginning and the end of each intersection.

At the beginning of intersection 1 a pulse appears at the output *bsn* 1 of the AND gate E 11. In the same manner, a pulse appears at the output *esn* 1 of the AND gate E 12 at the end of intersection 1. The circuits E 13 through E 16 for marking the other intersections are identical.

By means of the hitherto described part of the circuit the conditions are realized that are required for encoding the information stored. The encoded information is temporarily stored in the registers W 1, W 2 and W 3 in the order shown in FIG. 22.

At the beginning of intersection 1 in an image line the AND gates E 17 through E 21 are deblocked by means of the pulse bsn 1 (output gate E 11). The outputs *a* through *e* of counter 1 are connected to the other inputs of these gates, respectively. The position of the counter 1 is thus transferred to a section of register W 1 having outputs 1.0 through 1.4, respectively. It will be clear that the number is stored of the element representing the beginning of the first intersection. In the same manner the number is stored of the element representing the end of the first intersection, since then pulse *esn* 1 (output gate E 12) is formed, by means of which the AND gates E 22 through E 26 are deblocked. The position of the counter 1 at that moment is stored in the register section having outputs 1.5 through 1.9, respectively.

In the same manner the beginnings and ends of intersections 2 and 3 are stored in the registers W 2 and W 3.

When more than three intersections occur in one column the counter 3 will remain in the position 3. The AND gate E 30 is then deblocked as the output sn 3 of the separator circuit US is connected to E 30. Consequently, when in a column a pulse bs is produced by the pulse shaper PV 2 for the fourth time, a pulse appears at the output of gate E 30. By means of this pulse the register sections having outputs 1.0 through 1.9 of register W 1 are brought into the rest position.

The number of detected intersections are stored at the end of each column in a portion of register W 1, viz. the section having outputs 1.10 and 1.11, respectively. To this end the outputs *x* and *y* of counter 3 are connected to inputs of AND gates E 27 and E 28, respectively. At the end of each column the gates E 27 and E 28 are deblocked by the pulse ekl. This is the pulse appearing at the output of the AND gate E 4 and this pulse is present when counter 1 is in position 31. The output of gate E 4 is also connected to the input of counter 2. This is a binary counter which may have four possible states, viz. the positions 0 through 3. Each time that counter 1 reaches the position 31, the contents of counter 2 are increased one unit. This can be effected at the trailing edge of the applied pulses.

At the beginning of each image line the counter 2 is in the position 0. When counter 2 has reached the position 3 and counter 1 is in position 31, all inputs of the AND gate E 8 have the same polarity. Then the pulse *e* appears at the output of gate E 8 to indicate that the end of the quantisized information of an image line has been reached. Then the clock pulse generator producing the clock pulses *k* must be blocked, to which end the pulse *e* is applied to the correspondingly indicated input of the trigger Tr 2 in FIG. 20.

It will be clear from FIG. 18 that, after scanning the first column of image line 1, the encoded information is present in registers W 1, W 2 and W 3 of the circuit shown in FIG. 23. During the scanning of the next column in this image line, consequently during the scanning of element 32 through 63, no new information is stored and the encoded information is transferred to the processor. This process is repeated in the cycle shown in FIG. 18.

7. THE TRANSFER OF INFORMATION TO THE PROCESSOR

After a relevant column of 32 image elements has been scanned (for example the image elements 0–31 of image line 1, FIG. 18; the elements 32–63 are not relevant in that case), the information is available in encoded form at the outputs of registers W 1 through W 3 (FIG. 23). During the next period of time no new information is stored by the encoding device, so that the encoded information obtained can be transferred to the processor. When the relevant column of image elements is followed by a non-relevant column, the available transfer time is 32 times the scanning time of an image element, comsequently 32 × 0.4 μsec. = 12.8 μsec.

When the relevant column is at the end of an image line, such as in the case of image lines 3 and 7 in FIG. 18, the information transfer must take place during the line sync pulse, which has a duration of 11.84 μsec. It is assumed that a processor is used in which it is possible to intervene in a running program. In the embodiment according to the invention the intervention is performed directly after a relevant column of 32 image elements has been scanned. The intervention is effected by applying an external signal to the processor. When the intervention takes place, the instruction which the processor is carrying out is finished, after which it is possible to offer information from an external information source, which information is directly stored in the memory of the processor at addresses which are also externally offered. When the information transfer is realized in this manner, the required transfer time is 1.5–2 μsec. per word in current processors. In the system according to the invention three words must be successively transferred to the memory of the processor during each intervention, so that the time required therefor amounts to 4.5–6 μsec. To this should be added the time required by the processor to finish the instruction running at the moment of intervention. When this time is assumed to be 5 μsec., the required transfer time is 10 μsec. in the most unfavourable case, which is still amply within the range of possibilities.

FIG. 26 shows in which manner the transfer of information to the processor can be realized in principle. The starting point is, consequently, that an intervention is performed at the end of a relevant column. The end of a relevant column is detected by means of the AND gate E 35. The signals *ekl* and *s k* are applied to the inputs thereof. The signal *ekl* is produced at the output of gate E 4 (FIG. 23) when the last element of a column is reached. Series of clock pulses *s k* are present during the scanning of a relevant column. This implies that at the end of a relevant column a pulse will be produced at the output of the gate E 35 (FIG. 26). This pulse is used to switch trigger Tr 4. The output of Tr 4 is connected to the point of the processor at which it is signalled that an intervention is to be executed. After the transfer of a word (intersection information) has taken place, the processor produces a pulse signalling that the interference is completed. Three words should be transferred during each intervention; this is effected under the control of the counter 4. This counter has three positions, T 0 through T 2, respectively. After a pulse "Intervention completed" has been received, a pulse is formed by the pulse shaper PV 3, which pulse increases the contents of counter 4 one unit. When an intervention takes place, the counter 4 is in the position T 0. The words to be stored are present in the registers W 1, W 2 and W 3. These are the same registers that are also drawn in FIG. 23.

The outputs of registers W 1, W 2 and W 3 are successively connected to the information terminals D 0 through D 11 by means of a combination of AND and OR gates.

When the counter 4 is in the position T 0, the AND gate E 32 is deblocked and the output 1.0 of register W 1 is connected through the OR gate O 2 to the information terminal D 0. The other outputs 1.1 through 1.11 of register W 1 are connected through identical circuits to the information terminals D 1 through D 11, respectively.

In the position T 1 of counter 4 the outputs of register W 2 are connected to said information terminals and, similarly, in the position T 2 of the counter 4 the outputs of register W 3 are connected to the information terminals.

When the contents of register W 2 have been transferred, the counter 4 is in the position T 2, that means that the information of register W 3 is already available at the information terminals D 0 through D 11. When the pulse "Intervention completed" appears, the trigger Tr 4 is reset via the AND gate E 36, so that then the intervention is terminated.

For each word to be stored also the address must be specified as regards the place where the information is to be entered into the memory of the processor. Each address should be expressed in 12 bits. The counter 5 is the address counter; the outputs thereof are connected to the terminals A 0 through A 11, respectively, which indicate the address. After an instruction has been carried out, the contents of counter 5 are increased one unit. At the beginning of a field to be stored, the counter 5 is set in the desired initial position and then counts for each word to be stored.

The registers W 1, W 2 and W 3 are reset by means of the pulse produced at the output of the AND gate E 36. Depending upon the type of processor used, it may be necessary to have a time delay therebetween.

It is further observed that the process of information transfer only slightly delays the running program in the processor. A total number of 1680 words should be stored. Assuming that the required transfer time for each word is 2 $\mu$sec., the total transfer time is 1680 × 2 $\mu$sec. = 4.36 msec. The interventions take place intermittently during the scanning of a field; the duration of a field is 20 msec.

FIG. 27 shows the 16 frames for the 16 symbols (figures) with the address indication of the first word of each first column of each frame, the right-hand bottom corners of the lowermost frames showing th number of the last word.

The data of each column are stored in three successive addresses in the central memory of the processor. The information of each column, consequently, is contained in three processor words.

The first word of each group of three words also comprises information regarding the number of intersections in the respective column. There is a relationship between the address indication of a first word of each group of three words and the number of the column.

Assuming that the address counter (counter 5) in FIG. 26 is increased one unit upon each transfer of a word to the processor, the position of the counter 5 will each time contain the address where the respective word is stored in the central memory. 1680 words must be stored, so that the counter 5 successively takes the positions A1 . . . A1680. The column numbers can be assigned to the first word of each group of three words.

The following relationship exists between the successive column numbers pertaining to one of the frames I . . . XVI) and the address indication in the central memory of the processor: the first word concerning column number *kx* is at address *Ay* the first word concerning column number k (*x*+1) is at address A (*y*+12).

The first words of the column numbers 1 of the various frames, consequently *k*1I through *k*1XVI, are stored in the central memory at the following addresses:

| | | | |
|---|---|---|---|
| first word concerning column number | k1 | is at address | A1 |
| do. | k1 II | do. | A7 |
| do. | k1 III | do. | A4 |
| do. | k1 IV | do. | A10 |
| do. | k1 V | do. | A421 |
| do. | k1 VI | do. | A427 |
| do. | k1 VII | do. | A424 |
| do. | k1 VIII | do. | A430 |
| do. | k1 IX | do. | A841 |
| do. | k1 X | do. | A847 |
| do. | k1 XI | do. | A844 |
| do. | k1 XII | do. | A850 |
| do. | k1 XIII | do. | A1261 |
| first word concerning column number | k1 XIV | is at address | A1267 |
| do. | k1 XV | do. | A1264 |
| do. | k1 XVI | do. | A1270 |

8. THE RECOGNIZING PROCEDURE 8.1

This chapter describes a recognizing procedure used in accordance with the invention, in which an unknown symbol is first roughly analysed in its entirety, on the grounds of which a classification in groups takes place. Then the further classification is carried out, during which also details of the symbols are examined. By means of the recognizing procedure to be described hereinafter a very general but also a very brief description of all symbols to be recognized can be given. All other symbols that do not fail within the scope of this description cannot be classified by the device. In the beginning of the development the percentage of symbols that can be classified will not be optimal; the symbols that cannot be classified by the device must be processed visually. However, the error percentage of the classified symbols will be minimal. In actual practice optimization can be effected experimentally.

Since the classification device to be designed is to be used in the automatic entering procedure for giro transactions, a deterministic recognizing procedure has been chosen.

By the choice of the conditions and the number thereof, the recognition of new symbols can be effected with each desired degree of reliability. This chapter mentions the conditions and decision steps sufficient to recognize fairly clearly written figures. In the case of experiments on a larger scale it might appear that still other conditions should be added or that some amendments are necessary in the conditions given. However, in the proposed arrangement this is readily possible, since in the recognizing procedure the afore mentioned processor is used.

The preceding chapters dealt with the preliminary procedures preceding the actual recognition of the written figures.

The signal obtained during scanning is first quantisized so as to be able to process the information by means of logic circuitry.

The quantisation is effected in two ways, viz. in the signal amplitude and in the time. This quantisation can be regarded a first reduction of the amount of information offered. It necessarily involves a certain deformation. It is impossible to numerically express the degree of this deformation.

The quantisized information is subsequently encoded. This again results in a slight reduction of information, namely when there are more than three intersections per column.

Each square in which a figure may be written is divided into 32 × 35 elements, consequently 1120 elements. This is identical to the number of bits in which the encoded information of a square is stored in the memory of the processor. The number 35 is the number of scanning lines that is effectively used; the total number of lines per figure is 70 while only half a line is effectively used. The number 32 is the number of image elements per scanning line per figure and is chosen to equalize (or substantially equalize) the image definition in horizontal and vertical direction. The number 32 is determined by the clock pulse generator.

The symbols to be recognized must be classified in accordance with 12 possibilities, viz. 10 possibilities for the figures 0, 1, . . . 9 and two possibilities for the characters C and S. Since it will often be difficult to distinguish between the figure 5 and the character S, no difference will be made between these symbols in the mechanical recognizing procedure. It appears from the example shown in FIG. 7 that the character S is used for indicating a so-called savings account. Consequently, the character S should be entered into the leftmost square on the giro card, while the rate of interest should be entered into the squares on the right-hand side. This notation differs from a postal account number to such an extent that erroneous mechanical interpretation can be avoided easily.

A minimal number of four bits are necessary to encode each one of the eleven possible classification (figures 1–10 and the character C). By means of the recognizing procedure a reduction of the amount of information from 1120 bits to 4 bits should be realized.

8.2

The principle of the deterministic recognizing procedure.

As appears from the preceding chapters, it is determined for each column of image elements how many intersections are made with the symbol to be recognized, while it is known, moreover, which vertical positions constitute the beginnings and ends of each intersection. Of course the recognizing procedure to be applied is taken into account in the choice of this representation of a symbol.

The first phase in the recognizing procedure is the classification of the symbols to be recognized into groups.

In brief, the first phase comprises the following steps:

determination of the extract of the succession of intersections per square;

determination of the (significant) largest number of intersections per square.

This can be illustrated by means of an example of the symbol "three" shown in FIG. 21a. All columns 0–34 are successively examined as to the number of intersections present. No black image elements are present in columns 0–7. The information as regards the number of intersections in the other columns is shown in the following table:

| column no. | 8 | 9–12 | 13–21 | 22 | 23–24 | 25 | 26–27 |
|---|---|---|---|---|---|---|---|
| number of inter-sec-tions | 1 | 2 | 3 | >3 | 3 | 2 | 1 |

These data can be notated by indicating only the numbers of those columns showing a change of the number of intersections.

This is what is indicated by: extract of the succession of the intersections. In the subject example for the extract was found:

| column no. | 8 | 9 | 13 | 22 | 23 | 25 | 26 | 28 |
|---|---|---|---|---|---|---|---|---|
| number of intersections | 1 | 2 | 3 | >3 | 3 | 2 | 1 | 0 |

In this connection it is observed that as an additional security an interruption of one element in a series of successive black image elements is not relevant (see also 6.2).

After the extract has been determined, the significant largest number of intersections per square is determined. To this end use is made of the extract, in which the following rules are observed:

the significant largest number of intersections may be 0, 1, 2 or 3 a number of intersections ≠ 1 is significant if this number of intersections is present in at least 4 successive columns.

When the largest number of intersections is 1, the requirement that this number of intersections should be present in at least 4 successive columns cannot be used for determining the significant number. It is possible, for example that the symbol "one" is represented by a vertical line. By using the above rules it is achieved that certain defects in a symbol to be recognized, such as a locally interrupted line or an interference due to the presence of too much black image elements that are not part of the symbol, do not affect the mechanical recognition of the symbol. The procedure takes less time than most of the known "pre-processing operations."

Depending upon the significant largest number of intersections found, a symbol to be recognized is classified in one of the groups W, X, Y or Z, respectively. The table shown in FIG. 28 includes some examples of possible symbols together with the groups in which these symbols are classified in accordance with the above rules.

The second phase of the recognizing procedure depends upon the result of the first phase, consequently upon the classification in groups.

Before describing this second phase, it is observed that the representation of information as regards the binary numerical locations in each column of the beginnings and ends of the intersections (see FIG. 22) is such that one word comprises both the position of the beginning and that of the end. By means of the "masking" method known in the computer art it is possible to separaely obtain the positions of the beginnings and the ends, the numerical value of the five bit positions for the binary ends being shifted through five bit positions with respect to the first five bit positions for the binary numerical value of the beginnings. Thus by a programmatic shift the same binary numerical representation of information can be obtained for the ends. It is not necessary, however, to carry out this operation for all the intersections in advance. This operation would take considerable time. When only the positions of ends are compared to one another, or when an extreme value of an end is to be determined over a number of columns, it is not necessary to carry out the shift operation.

The second phase of the recognizing procedure will be described for each individual group.

NO INTERSECTIONS group W. The recognition thereof does not provide any problem. It will be directly clear that a blank square is concerned.

group X. In a case of a symbol of this group, the number is determined of the column constituting the middle of the series of columns showing one intersection. When the series consists of an even number of columns, this number is made odd by adding one.

As appears from the above, it is possible that in the respective series one or more columns occur in which the number of intersections is 0 (due to an interruption). When this applies to the column that is found to be the middle of the series, the adjacent left-hand column is chosen as the middle.

The next step in the procedure is that the information in the columns on either side of the middle, if present, is "compressed" in horizontal direction. This is effected in the following manner.

Suppose that the number of the middle column is *km*. First the position *b* of the beginning of the intersection and the position *e* of the end of the intersection in column (*km* + 1) is determined. The representation thereof consists of two numbers, which are each temporarily stored in a register together with the number of the column. Then the positions of beginning and end of the intersection in column (*km* + 2) are compared to the contents of said registers. When the intersection in column (*km* + 2) has a higher beginning, a smaller number is found for the beginning then in column (*km* + 1). In that case the contents of the register for the beginning is replaced by the value in column (*km* + 2); at the same time the initially stored column number is replaced by the number of column (*km* + 2). When the beginning of the intersection in column (*km* + 2) is lower than in column ( *km* + 1), the contents of the register are not changed. This procedure is executed for all columns having a number larger than *km* an showing and intersection. In this manner the highest position of the beginning of an intersection on the right-hand side of the middle column is determined, while at the same time the number of the respective column is known. It is possible that there are symbols in which two intersections per column are present (due to irregularities in writing or the like). The number of successive columns showing two intersections will in that case be less than 4, so that this number is not significant. Also in this case the highest position of the beginning of the first intersection is determined.

Then the lowest position at the end of an intersection is determined of all columns on the right-hand side of the middle column, also the number of the respective column being stored. The same "compression" is applied to each column on the left-hand side of the middle column which shows one intersection. In the case of two intersections in a column, the end of the second intersection is used. Consequently, the space between the intersections is imaginarily filled, so that it seems that only one intersection is present in each column.

After the "compression," the information of a symbol to be recognized can be symbolically represented as follows:

| | left | | middle | right | |
|---|---|---|---|---|---|
| highest position of a beginning | *bl* | | *bm* | *br* | |
| lowest position of an end | | *el* | *em* | | *er* |
| number column | *kbl* | *kel* | *km* | *kbr* | *ker* |

The number *bm* corresponds with the vertical position of the beginning of the intersection in the column *km*, which constitutes the middle of the symbol; the number em corresponds with the end of the intersection in column *km*.

The number *bl* corresponds with the highest vertical position of the beginning of the intersection in one of the columns on the left-hand side of the column *km*; the number of the respective column is *kbl*.

The lowest position of the end of the intersection in one of the columns on the left-hand side of column *km* is indicated by the number *el*; the number of the respective column is *kel*.

The other indications in the table apply to the right-hand side of the symbol.

The numerical values of the ends *el*, *em* and *er*, respectively, can be shifted through five positions so as to be able to perform the subsequent arithmetic operations. By means of the numbers found, a classification can be realized of a symbol of group X.

FIG. 29 shows some examples of written symbols, together with the representation thereof in "compressed" form. In the table of the "compressed" representation (FIG. 29) the beginnings and ends are drawn in positions that can be derived from the examples of the written symbols.

The decision diagram that may be used for the classification of the information obtained is shown in FIG. 30.

In this connection it is observed that it is first of all ascertained whether the information obtained as regards the vertical dimension of the symbol is relevant. The projection of the symbol on a vertical axis, which will be called the height *h* of the symbol hereinafter, must exceed a given minimal value. The projection on the vertical axis is determined by calculating the difference between the highest detected position of the beginning of an intersection ($b_{min}$) and the lowest detected position of the end of an intersection ($e_{max}$). The vertical dimension of a symbol is relevant when: $e_{max} - b_{min} \geq 16$.

This implies that a written symbol should have a minimal height equal to half the height of a square.

Subsequently it is ascertained whether there is a distinct difference in height between the beginnings of the intersections in the middle of the symbol (consequently in column *km*) and in the columns on the right-hand side. The value *br* is the highest detected position of the beginning of an intersection on the right-hand side. There is a distinct difference in height when the following conditon is complied with: $bm - br \geq 5$.

A similar operation is carried out for determining a difference in height, if any, between the beginnings of the intersections on the left-hand side of the symbol and the beginning of the intersection in the middle. The value *bl* is the highest detected position of the beginning of an intersection on the left-hand side.

There is a distinct difference in height when the following condition is complied with: $bm - bl \geq 5$.

When the above decision steps have produced a positive result, the symbol can be classified as being 4. In order to render the reading system insensitive to rather arbitrarily written symbols (e.g.U), however, for recognizing the 4 the checking condition should be complied with that the right-hand side of the symbol shows an end of an intersection which is distinctly lower than the end of the intersection in the middle. This checking condition reads: $er - em \geq 5$.

When the symbol is an oblique stroke, it can be classified as being 1, provided some checking conditons are complied with, namely that beginning and end of left column *bl* and *el* is greater than the beginning and end of center column *et* and *em*, respectively, and end of right column *er*.

As regards the classification of the symbols "7" and "7" it is observed that in some known reading systems it is often difficult to distinguish between these symbols. It is possible, however, to obtain an unambiguous classification. In accordance with the decision diagram shown in FIG. 30 it is first ascertained whether the beginnings of the intersections in the different columns are on a substantially equal level. This decision step should be considered a general checking condition for this group of symbols. The beginnings are on a substantially equal level if the variations in height do not exceed one-fourth part of the height *h* of the symbol. The extreme values of the beginnings can be indicated by $b_{max}$ and $b_{min.}$ Consequently, the checking condition reeds: $b_{max} - b_{min} \leq 1/4\ h$.

A symbol can be classified as being "7" if the ratio between the width *b* and the height *h* of the symbol complies with the following condition:

$$b \geq \tfrac{1}{2} h.$$

The width *b* can be determined by means of the "compressed" information, viz.:

$$b = ker - kel.$$

Another checking condition is, moreover, that an intersection should be present on the right-hand side of the symbol, the end of which should be distinctly lower than the end of the intersection in the middle column. Condition:

$$er - em \geq 12.$$

In order to exclude symbols having deviating shapes, still another condition should be complied with:

$$|el - em| \leq \tfrac{1}{2} h.$$

A symbol can be classified as being 1 (with upstroke) if the ratio between the width *b* and the height *h* of the symbol complies with:

$$b \leq \tfrac{1}{4} h.$$

All values $\tfrac{1}{4} h < b < \tfrac{1}{2} h$ lead to the qualification: Incorrect.

It will be clear that in this manner a reliable mechanical classification is possible, while the high tolerance for the dimensions and shapes of the written figures is maintained.

TWO INTERSECTIONS group Y.

The decision diagram shown in FIGS. 31*a* and 31*b* is used in the classification of symbols of this group. First it is checked whether the condition is complied with that more than a given minimal number of columns is occupied by the symbol to be recognized (the number of columns occupied should exceed a given minimal value). Symbols having too small a width are not accepted. Furthermore it is ascertained by means of the extract of the succession of the intersections whether there is one region showing the significant largest number of intersections (in this case two intersections). When there is a second region comprising a number of contiguous columns in which two intersections are present in a column, this may lead to the classification of a symbol 4. In the case of all other symbols there should be only one region showing two intersections per column. If this is the case, it is ascertained whether on the lefthand side in said region the two intersections merge to form one intersection, for example in the case of symbols "O" and "C". Then it is ascertained whether on the right-hand side in this region the two intersections merge to form one intersection, for example in the case of the symbols "0" and "7".

As appears from the diagram shown in FIG. 31*a*, a symbol is classified as being "7" when the intersections merge on the right-hand side but not on the left-hand side, while at the same time the condition as to the vertical position of the merging point should be complied with. This last-named condition is introduced to exclude particular symbols, such as the symbol "> ".

In the group of symbols in which the two intersections on the left-hand side merge to form one intersection, another examination should take place of some characteristic properties. Thus first the symbols "c" and "4" are distinguished, in which no merging of intersections on the right-hand side occurs. The symbol "c" is distinct from the symbol "4" in that there is not vertical stroke at the right-hand end, and in that the symbol "c" is curved on the left-hand side. The symbols "0", "4", "9" and "6" have in common that the intersections merge to form one intersection both on the left-hand side and on the right-hand side. The symbol "0" has no vertical strokes either on the left-hand side or on the right-hand side.

The symbols "4" and "9" are distinct in that the symbol "9" is curved on the left-hand side; for checking purposes the symbol "4" should comply with the condition that the second intersection should be substantially horizontal.

For a further specification of the decision steps of the diagram shown in FIGS. 31*a* and 31*b* it is desirable to first introduce the following notations:

*kl* 1 - number of the leftmost column of the symbol;
*kl* 2 - number of the leftmost column showing two intersections;
*kr* 2 - number of the rightmost column in the first region showing two intersections;
*km* 2 - number of the column in the middle of the region showing two intersections per column;
*kr* 1 - number of the rightmost column of the symbol;
*kl* 22 - number of the leftmost column in the second region showing two intersections;
*kr* 22 - number of the rightmost column in the second region showing two intersections;
*bs* 1 - number of the image element representing the beginning of intersection 1;
*es* 1 - number of the image element representing the end of intersection 1;
*bs* 2, *es* 2 } id. for beginning and end of second intersection Thus the position of the beginning of second intersection 1 in the leftmost column showing two intersections is notated as follows:

$$bs\ 2.\ (kl\ 2).$$

The end of first intersection 1 in the first column on the left-hand side thereof:

$$es\ \mathbf{1}.(kl\ \mathbf{2{-}1}).$$

A "compression" is carried out of the information in the columns showing one intersection. The "compression" is carried out separately for the columns having one intersection on the left-hand side and those on the right-hand side of the symbol. Thus the information of columns *kl* 1 through *kl* 2 (2-1) is combined in an OR function. The "compressed" column on the left-hand side is indicated by *kcl*.

Similarly, on the right-hand side the information of the columns *kr* (2 1) through *kr* and *kr* (22 1) through kr, respectively, is combined in an OR function.

The "compressed" column on the right-hand side in indicated by *kcr*.

The conditions for classification and checking can now be notated as follows:

intersection the symbol is divided into an upper and a lower part; it is ascertained whether the two intersections merge on the upper right-hand side;

it is ascertained whether the two intersections merge on the upper left-hand side;

the vertical position of the third intersection in the middle column (*km*) is determined;

after this it can be ascertained whether the intersections merge on the lower right-hand side;

id. for the lower left-hand side;

for the symbols "5", "6" and "9" it is ascertained whether there is a connection between the upper and lower part of the symbol;

furthermore, in a number of cases some additional checking conditions should be complied with;

the classification of the symbols follows the above steps.

For a further specification of the recognizing procedure the following notations are introduced:

| Decision step | Specification for positive result |
|---|---|
| dimension correct? | $kr\,1 - kl\,1 \geq 12$ |
| one region with 2 intersections per column? | $kr\,22 - kl\,22 = 0$ |
| merging on left-hand side? | $bs\,1.(kcl) - es\,1.(kl\,2) \leq 0$ and also $bs\,2.(kl\,2) - es\,1.(kcl) \leq 0$ |
| merging on right-hand side? | $bs\,1.(kcr) - es\,1.(kr\,2) \leq 0$ and also $bs\,2.(kr\,2) - es\,1.(kcr) \leq 0$ |
| opening on left-hand side? | $bs\,2.(kl\,2) - es\,1.(kcl) \geq 8$ or $bs\,1.(kcl) - es\,1.(kl\,2) \geq 8$ |
| opening on right-hand side? | $bs\,2.(kr\,2) - es\,1.(kcr) \geq 8$ or $bs\,1.(kcr) - es\,1.(kr\,2) \geq 8$ |
| merging point (right-hand side) at proper level? | $es\,1.(kr\,2) - bs\,1.(kl\,2) < \lvert 6 \rvert$ |
| merging point (left-hand side) at proper level? | $bs\,2.(kr\,2) - bs\,1.(kl\,2) < \lvert 3 \rvert$ |
| vertical extension on right-hand side? | $es\,1.(kcr) - bs\,1.(kcr) < 4$ |
| curve on left-hand side? | $bs\,2.(km\,2) - bs\,2.(kl\,2) \geq bs\,2.(km\,2) - es\,1.(km\,2)/4$ |
| do 2nd intersections form a horizontal line? | $bs\,2.(km\,2) - bs\,2.(kl\,2) < bs\,2.(km\,2) - es\,1.(km\,2)/4$ and $bs\,2.(km\,2) - bs\,2.(kr\,2) < bs\,2.(km\,2) - es\,1.(km\,2)/4$ |
| vertical upward stroke on left-hand side? | $bs\,1.(kl\,2) - bs\,1.(kcl) \geq 12$ |
| vertical downward stroke on right-hand side? | $es\,1.(kcr) - es\,2.(kr\,2) \geq 12$ |
| opening on left-hand side region 2? | $bs\,2.(kl\,22) - es\,1.(kl\,22) \geq 8$ |
| oblique tail? | $bs\,2.(kl\,22) - bs\,2.(kr\,21) \geq 5$ |
| upward stroke on right-hand side? | $bs\,1.(kr\,22) - bs\,1.(kcr) \geq 5$ |

THREE INTERSECTIONS group Z. (FIGS. 32*a* and 32*b*).

The part of the recognizing procedure concerning symbols in which the significant largest number of intersections is three, can be briefly described as follows:

determination of the number of columns by the symbol. A symbol should occupy a minimal number of columns; this is a general checking condition;

the middle column (*km*) is determined of the region having three intersections per column. This column divides the symbol into a right-hand and a left-hand part;

the vertical position of the second intersection in the column km is determined. At the level of this second

*kl* - number of the leftmost column of the symbol;

*kl* 3 - number of the leftmost column showing three intersections;

*kr* 3 - number of the rightmost column showing three intersections;

*km* - number of columns in the middle of the region showing three intersections;

*kr* - number of the rightmost column of the symbol;

*bs* 1 - number of the image element representing the beginning of intersection 1;

*es* 1 - number of the image element representing the end of intersection 1;

*bs* 2, *es* 2 } - id. for beginning and end of intersection 2;

$bs\ 3$, $es\ 3$ - id. for beginning and end of intersection 3.

In this group of symbols the problem may occur that the indication of the succession of the intersections, as it is carried out by means of the encoding device, creates confusion. For example, when considering the symbol, "5" in FIG. 33, it appears that the encodings $s\ 1$, $s\ 2$ and $s\ 3$, respectively, of the intersections cannot be readily used, since in the recognizing procedure the mutual positions of the intersections are used. Depending upon the length of the horizontal stroke at the top of the symbol, the other intersections on the right-hand side of the symbol may obtain different encodings.

This will have to be taken into account in laying down the conditions of the various decision steps; however, it should also be borne in mind that no operations may be carried out that are too complicated or take too much time, as a result of which the arrangement would become too expensive.

The various steps in the recognizing procedure for the symbols of this group will be specified hereinafter. The decision diagram is shown in FIGS. 32a and 32b.

Dimension correct?

This decision step will produce a positive result if the number of columns occupied by the symbol is minimally 12. Consequently, a result is positive when:

$$kr - kl \geq 12.$$

Merging "on upper right-hand side"?

The detection of the merging of the intersections $s\ 1$ and $s\ 2$ in this region can be realized on essentially the same manner as in the case of the symbols having 2 intersections (group Y). However, it will have to be ascertained whether the intersections $s\ 1$ and $s\ 2$ in the "upper right-hand" region. The demarcation between "lower" and "upper" part of a symbol lies at the beginning of the second intersection ($bs\ 2$) in column $km$, which column is in the middle of the region showing 3 intersections per column. Analogous to the notation used in the above, the vertical position of the demarcation between "lower" and "upper" can be indicated by: $bs\ 2.(km)$.

In the detection of the merging of intersections $s\ 1$ and $s\ 2$ in the "upper right-hand" region, it is ascertained, starting with column $kr$, whether the second intersection $s\ 2$, if present, falls within said region. This is the case when:

$$bs\ 2.(kr) \leq bs\ 2.(km).$$

In the case of a negative result the same procedure is carried out for the intersection $s\ 2$ in the column ($kr$ - 1), etc. Suppose that in column $kx$ a positive result is found. In that case the column $kx$ is the rightmost column in which the second intersection lies in the "upper right-hand" region. The intersections $s\ 1$ and $s\ 2$ merge when:

$$bs\ 2.(kx) - es\ 1.(kx + 1) \leq 0$$

and when at the same time:

$$bs\ 1.(kx + 1) - es\ 1.(kx) \leq 0.$$

Merging "on upper left-hand side"?

Also in this detection it should be ascertained that the respective intersections are in the "upper left-hand" region.

To this end it is determined, starting with column $kl$, whether the second intersection $s\ 2$, is present, lies in said region. This is the case when:

$$bs\ 2.(kl) \leq bs\ 2.(km).$$

When the result is negative, the same procedure is carried out for the intersection $s\ 2$ in column ($kl + 1$), etc. Suppose that in column $ku$ the result is positive. Then column $ku$ is the leftmost column in which the second intersection is in the "upper left-hand" region.

The intersections $s\ 1$ and $s\ 2$ merge when:

$$bs\ 2.(ku) - es\ 1.(ku - 1) \leq$$

and when at the same time:

$$bs\ 1.(ku - 1) - es\ 1.(ku) \leq 0.$$

Merging "on lower left-hand side"?

As mentioned above, special measures should be taken in this step (see also FIG. 33). The decision step by means of which it is detected whether the intersections merge "on lower left-hand side" is shown in detail in the diagram of FIG. 34. Consequently, this diagram is a sub-program. The symbol is examined column by column whether the intersections merge "on lower left-hand side." The number of the column under examination is stored in a work register indicated by "column counter K". Initially the contents of the column counter are ($km - 1$), which means that the first column to be examined is the first column on the left-hand side of column $km$. Subsequently it is examined whether the respective column is in the region showing three intersections per column. The result is positive when: $kl\ 3 \leq [K] \leq kr\ 3$.

It would also have been possible to determine whether three intersections are present in the respective column by means of the extract of the succession of the intersections. However, in that case the recognizing system would be highly sensitive to short interruptions in the written symbols, since when in the case of the symbol "5" of FIG. 33 a short interruption is present in the upper horizontal stroke, the encoding of the intersections at that place will show a discontinuity. When the above procedure is used to ascertain that a column belongs to the region showing three intersections, the system is insensitive to such interruptions.

When it has thus been determined that a column belongs to the region showing three intersections, it is ascertained whether the intersection $s\ 2$ of this column lies in the "lower" part of the symbol. The result is positive when:

$$bs\ 2.([K]) \geq bs\ 2.(km).$$

It can now be determined whether intersections $s\ 2$ and $s\ 3$ merge. Merging occurs when:

$$bs\ 3.([K]) - es\ 2.([[K]-1) \leq 0,$$

and when at the same time:

$$bs\ 2.([[K]-1) - es\ 2.([K]) \leq 0.$$

When no merging is detected, the contents of the column counter K are reduced one unit, as a result of which the adjacent column on the left-hand side is examined.

When it appears that the respective column is not present in the region showing three intersections, it is ascertained whether the intersection $s\ 1$ lies within the "lower" part of the symbol. The result is positive when:

$$bs\ 1.([K]) \geq bs\ 2.(km).$$

It can now be determined whether intersections $s$ 1 and $s$ 2 merge. This merging occurs when:

$$bs\ 2.([K]) - es\ 1.([K]-1) \leq 0,$$

and when at the same time:

$$bs\ 1.([K]-1) - es\ 1.([K]) \leq 0.$$

In this manner all columns up to the leftmost column $kl$ of the symbol are examined. Merging "on lower right-hand side"?

For this decision step a diagram can be drawn that is idential to that shown in FIG. 34 for the determination of a merging on lower left-hand side.

Connection between "upper right-hand side" and "lower right-hand side"?

This decision step should be introduced for the classification of the symbols. "9". A symbol having a region showing three intersections per column while the intersections merge "on upper right-hand side" and "on upper left-hand side" and no merging occurs "on lower left-hand side," can be classified as being "9", provided there is a connection between the black image elements "on upper right-hand side" and "on lower right-hand side." To this end it can be assumed that the third intersection will always be in the "lower" part of the symbol (see the examples shown in FIG. 35). The beginnings and ends of the intersections $s$ 1 and $s$ 2 in columns ($kr$ 3 + 1) through kr can be considered to be compressed to a single imaginary intersection. The lowest end of intersection $s$ 1 (END I) and the highest beginning of intersection $s$ 2 (BEGINNING II) are determined. After all said columns have been examined, it is determined whether the compressed imaginary intersection is uninterrupted. This is so when END I and BEGINNING II overlap or touch each other. Consequently, the conditon for the presence of a connection between "upper right-hand side" and "lower right-hand side" is: [END I] − [BEGINNING II] $\leq$ 0.

FIG. 36 schematically shows the required decision step.

Connection between "upper left-hand side" and "lower left-hand side"?

For this decision step a diagram can be drawn idential to that shown in FIG. 36, the only difference being that in this step the columns ($kl$ 3–1) through $kl$ are examined. This decision step is necessary to be able to identify the various shapes of symbols "6".

Columns showing 4 intersection?

It can be easily determined from the extract of the succession of the intersections whether there are columns showing 4 intersections. Such columns should not be present in the case of a symbol "6"

Connection between "upper left-hand side" and "lower part"?

This decision step is introduced for the identification of symbols "5" and "5"

The further specification is realized in accordance with FIGS. 37$a$ and 37$b$ and the diagram shown in FIG. 38. The leftmost column showing 3 intersections ($kl$ 3) is the first column to be examined. The end of intersection $s$ 1, consequently $es$ 1.($kl$ 3), is stored in an auxiliary register "End LB I". Initially the contents of this auxiliary register are zero, corresponding with the highest position possible. The beginning of intersection $s$ 2, consequently $bs$ 2.($kl$ 3), is stored in a second auxiliary register "Beginning LB II".

Initially the contents of this auxiliary register are 32, corresponding with the lowest position possible.

Then it is determined in the first column on the left-hand side of column $kl$ 3 whether the end of intersection 1 is lower than in column $kl$ 3. If this is so, the contents of auxiliary register "End LB I" are replaced by $es$ 1.(kl 3 − 1). Similarly, the contents of "Beginning LB II" are replaced by $bs$ 2.(kl 3 − 1) when the beginning of intersection $s$ 2 in this column is higher than in column $kl$ 3. As appears from FIG. 37$a$, this procedure cannot be readily continued up to the left-hand limit $kl$, since the beginning of intersection $s$ 1 will not always be present on the "upper left-hand side." Therefore it is determined for each column (e.g. K) whether this is the case. Condition:

$$bs\ 1.([K]) < bs\ 2.(km).$$

As appears from FIGS. 37$a$ and 37$b$, the connections between the "upper left-hand side" and the "lower part" may be entirely different. A connection can be considered present when the highest beginning of intersection $s$ 2 in column $kl$ 3 and the columns on the left-hand side of this column, and the lowest end of intersection $s$ 1 in those columns, touch or overlap each other. Condition:

$$[\text{END LB I}] - [\text{BEGINNING LB II}] \leq 0.$$

The number of the column under examination can be temporarily stored in a third auxiliary register.

The procedure terminates when a connection is established, when the left-hand limit (column $kl$) is reached, or when the beginning of an intersection $s$ 1 is not present on the "upper left-hand side."

Variations of the above recognizing procedure are possible, particularly in so far as the checking conditions with which a written symbol should comply are concerned. Depending upon the available processing time and/or storage capacity of the processor, additional conditions may be introduced.

9. THE RECOGNITION APPARATUS

FIG. 39 illustrates the "recognizing program" mentioned in FIG. 9.

The recognizing program can be subdivided into a plurality of sections (P1 through P5, decision diagrams I through III). The program sections P1 and P2 are successively executed for each symbol to be recognized, consequently, for the information of each frame. The program P2 realizes the classification in one of the four possible groups (W, X, Y or Z).

When the significant largest number of intersections is 1, the symbol belongs to group X and only program section P3 is executed after program section P2. In this step the compressed representation of the symbol to be examined is determined. This information is temporarily stored in the work memory. When the significant largest number of intersections is 2, the symbol belongs to group Y and program section P4 is executed after program section P2. In this step the characteristic features of the symbol to be examined are derived from the information stored in the central memory of the processor. The thus obtained values of the characteristic features are temporarily stored in the work memory.

When the significant largest number of intersections is 3, the symbol belongs to group Z and program section P3 is executed after program section P2. Also in this step the characteristic features of the symbol to be examined are derived from the information stored in the central memory. The thus obtained results are temporarily stored in the work memory.

The ultimate recognition is effected by means of the decision diagrams I, II and III corresponding to flow diagrams in FIGS. 30, 31 and 32, for each one of the groups X, Y and Z, respectively.

The symbols 1, 7, 4, 9 and 6 can be classified via different paths. By means of the OR gates 0100 through 0104 it is achieved that one output is present for each one of the symbols, which output is connected to the corresponding input of the punching machine.

FIG. 40 shows the decision diagram for determing the extract (see P1, FIG. 39).

The flow sheet shown in FIG. 40 can be used for determining the extract of the succession of the intersections per square. At the beginning of the program the column counter is set at −1. After this, one unit is added thereto, so that the procedure starts with column number 0 of the respective frame. Then it is checked whether the end of the frame is reached by adding the contents of the column to the number −35. When the sum is 0, the next frame is examined. When the end of a frame has not yet been reached, the information associated with the examined column is fetched from the central memory. After this, the bits 10 and 11 are masked, so that then the number of intersections in this column is known. This result is stored in register: as. The result of the previously examined column in which a change of the number of intersections was established is stored in register 1s.

When again a change is established ([is] + [as] ≠ 0) also this change is stored. By means of an index it is known which frame is under examination. For each frame, registers are present for storing column numbers and for storing the associated number of intersections. The number of memory places varies and depends upon the shape of the examined symbol. The place (the address) at which each datum will be stored is indicated by the couners "index *k*" for the column information and "index *s*" for the information concerning the number of intersections, respectively.

FIG. 41 shows the decision diagram for determining the significant largest number of intersections (see P2, FIG. 39).

The significant largest number of intersections is successively determined for all frames I through XVI. The position of the frame counter constitutes the indication as regards which frame is examined. At the beginning of this program section the frame counter is set at zero. Then the contents of the frame counter are increased one unit. This also takes place after the classification of a symbol.

After this it is checked whether all the frames of the respective information were examined. To this end the contents of the frame counter are added to the number −17. When the sum is 0, the recognizing procedure for that document can be terminated, since all the frames were examined. When the sum differs from zero, still one or more frames must be examined. The index is equalized to the contents of the frame counter. The extract obtained during program section P1 is examined during program section P2 in 4 successive cycles as to the presence of 3 intersections, 2 intersections, 1 intersection, 0 intersections, respectively, per column. Upon each next examination cycle the contents of the examination counter are increased 1 unit. Before initiating the first examination cycle, the examination counter is set in the position −4. When during an examination cycle a significant number of intersections is established (this number of intersections should be present in at least four successive columns), no further examination cycles of this frame are executed.

When no significant number of intersections is established during 3 examination cycles, the respective frame is classified as being blank (group W).

During the first examination cycle the examination counter is in the position −3. The obtained extract of the information is examined as to the presence of three intersections. The extract of the number of intersections is present as a "list" at the successive address places, starting with the known value (index *s*). It is first examined whether information is stored at the memory place having address = (index *s*). When this information is present, this information corresponds with the number indicating the number of intersections. The contents of the examination counter are added to this number. The number in the examination counter is the inverse value of the number of intersections as to the presence of which the extract is to be examined. When the sum is zero, the extract at the respective column contains three intersections during the first examination cycle, two intersections during the second examination cycle, etc.

When the sum differs from zero, also the next address places are examined as to the presence of the number of intersections. To this end index *s* is increased 1 unit and the informtion is fetched at address =(index *s*).

When a number of intersections is found that corresponds with the inverse value in the examination counter, it is ascertained whether the examination counter is in the position −1. In that case no significant number of columns having three and having two intersections is found and the examined symbol is classified in group X. When the examination counter is in position −3 or −2, the associated column number is found so as to ascertain whether the number of columns having this number of intersections is significant. This column number is stored at address =(index *k*) = (index *s*). The information is fetched at address = (index *k* + *l*).

The rules under which the extract is stored show that the address = (index *k* + *l*) constitutes the column number at which a change of the number of intersections occurs.

When the difference of the column numbers at the adresses (index *k*) and (index *k* + *l*) is less than 4, this number is not significant. When the difference is 4 or more, the number of successive columns containing this number of intersections is significant. Depending upon the position of the examination counter, the symbol is classified in group Z or in group Y.

FIG. 42 shows that part of the decision diagram required for obtaining the compressed representation of a symbol, by means of which, inter alia, the symbols of the group X can be recognized individually (see P3, FIG. 39).

The flow sheet for obtaining the compressed representation, by means of which inter alia the symbols of group X can be determined individually, shows in accordance with which program steps the compressed information for the right-hand side of the symbol can be obtained.

The work memory of the processor comprises a memory cell, in which the number of a column to be examined can be temporarily stored; this memory cell is indicated by: column counter. The notation (column counter) means: the information contents of the column counter.

The flow sheet drawn starts from the assumption that the middle column km is known. The number of column km is stored in the column counter. The information pertaining to column km is fetched from the memory for storing the numerical information (see block diagram processor). This information occupies one word, since it relates to symbols showing one intersection is present in bits 0 through 4 of the processor word. By masking, the number can be obtained indicating the beginning of the intersection in column km. This number (*bmr*) is stored in a register.

The highest position of the beginning of an intersection on the right-hand side of a symbol is stored in another register, *brr*. At the beginning of this procedure the contents of register brr are equalized to those of register *bmr*. Thereafter the columns on the right-hand side of the column km must be examined. This is realized by each time increasing the contents of the column counter one unit and thereafter fetching the appurtenant numerical information from the central memory.

The right-hand limit of a symbol is detected when no intersections are present in two successive columns (blank columns). When a blank column is found, the contents of a memory cell indicated by counter *x* are increased one unit. After this it is examined whether two successive columns are blank, which is the case when the contents of counter *x* are 2. When the right-hand limit has been found, the program section detecting the lowest end of an intersection on the right-hand side of the symbol is executed.

Each time an intersection is established in a column, the contents of counter x are set at zero. The position of the beginning of the intersection is obtained by masking bit-positions 0 through 4 in the word containing the information of the respective column. The numerical value indicating this position is compared to the contents of register brr, in which the highest position up to the moment of comparison is stored.

The comparison is effected by subtracting the contents of register brr from the number indicating the position of the beginning of the intersection of the examined column. When the difference is negative, the position in question is higher than that of all previously examined columns. Then the numerical value of the position of the beginning of the intersection of the last column examined is stored in register brr, the information present therein being overwritten. The number of the respective column is still present in the column counter and the contents of the column counter are transferred to register: *kbrr*. Then the next column is examined by increasing the contents of the column counter one unit.

When the right-hand limit of a symbol is detected for the first time, a program section follows that stores the lowest end of an intersection on the right-hand side. At the beginning of this program section the contents of counter *x* are set at zero and the contents of the column counter are again equalized to the number of the column km. The information as regards the end of the intersections is now present at the bit positions 5 through 9 of the respective words, so that now these positions are masked.

After completion of this program section as regards the lowest end of an intersection on the right-hand side of a symbol, an identical compression of the information on the left-hand side of the symbol is realized. The examination of the successive columns can take place by each time reducing the contents of the column counter 1 unit.

FIG. 43 shows the decision diagram for program section 4 (see P4, FIG. 39).

When a symbol is classified in group Y, characteristic values are determined by means of program section P4.

These characteristic values are stored at successive addresses (memory places) *kk*1 through *kk*6 in accordance with the following table:

| | | | |
|---|---|---|---|
| the value | *kl*1 | is stored at | *kk*1 |
| do. | *kl*2 | do. | *kk*2 |
| do. | *kr*2 | do. | *kk*3 |
| do. | *kl*22 | do. | *kk*4 |
| do. | *kr*22 | do. | *kk*5 |
| do. | *kr*1+1 | do. | *kk*6 |

When a symbol comprises only one region showing two intersections, memory places *kk*4 and *kk*5 remain empty. The characteristic values are obtained from the extract of the respective frame.

It is known from program section P2 at which memory place the extract concerning the columns of the respective frame begins, as well as the memory place *z* of the extract concerning the number of intersections. At the beginning of the program index *k* is set at *x* and index *s* is set at *z*.

The memory places kk1 through kk6 can be indicated by *kk* (*nr*), in which the serial number of the respective memory place corresponds with the contents of register *nr*. At the beginning of the program the contents of register *nr* are set at 1.

The first value of the extract concerning the number of intersections is at memory place index $s=z$. At the beginning of the program this information cannot be zero.

It is ascertained whether the number of intersections is 2 or more. This information relates to the number of the leftmost column of the symbol. The number of intersections in this column can be 1, 2 or more than 2. When the number of intersections is less than 2, the respective column number is stored at address *kk*1, since register *nr* is in the position 1. After this storage the values in *nr*, index *k* and index *s* are increased 1 unit. Then the next value is fetched from the extract. When the leftmost column of the symbol contains two intersections, the number of columns is also stored at memory place *kk*1. At the time this same number is stored at the memory place *kk*2, being *kl* 2, the number of the leftmost column showing two intersections. As the extract indicates only transitions from regions having a different number of significant intersections, the memory places *kk*1 through kk5 are successively used. When the end of the extract is reached, the information at the memory place index *s* is zero.

This relates to column ($kr + 1$). This value will be present at memory place index *k* and this value is stored at memory place *kk*6.

After this, the decision diagram II is executed for the final classification of the symbol.

A similar flow sheet can be prepared for program section P5.

10. OPERATING SPEEDS

First an arrangement will be described in which a conventional punching machine is used. The processing rate will be determined fully by this punching machine. It is assumed that 9,000 cards per hour can be processed. The basic structure of the punching machine is shown in FIG. 44.

The lowermost card of a stack 21 of cards to be processed is removed by means of a horizontally reciprocating means 22. The further transport is effected by means of transport rollers 23. The punching means 24 is located in the transporting path. The processed cards are deposited in one of the receptacles 25 or 26, depending upon the results of their reading. The scanning device 27 is mounted below the input magazine or stack 21.

After removing a card from the stack by means 22, the next card will be in the desired position relative to the scanning device 27 for a certain period of time. The scanning is realized during this period of time. FIGS. 45*a* and 45*b* show two successive cards in the positions between which the scanning should be realized. In FIG. 45*a* the card A has been mvoed such that the squares on the next card B are visible. From this moment card B is in the desired scanning position. FIG. 45b shows the mutual position of the cards at the moment of removing card B. The cards are transported through the machine with an interspace $r$. Consequently, the cycle of the machine is defined as the period of time required for a card to traverse the distance $s$. The cycle is subdivided into units or "points." In many machines the division is as follows:

$$s = 18 \text{ units}$$

$$r = 5 \text{ units.}$$

It can be concluded from the positioning of the squares on the giro form (FIG. 3) that the distance $U$ = 11.5 units (see FIG. 45*b*). In a punching machine having a processing rate of 9000 cards per hour the duration of one machine cycle is 0.4 sec. = 4000 msec.

This results in the following table:

$$s \triangleq 18 \text{ units} \triangleq 400 \text{ msec.}$$

$$U \triangleq 11.5 \text{ units} \triangleq 255 \text{ msec.}$$

$$r \triangleq 5 \text{ units} \triangleq 111 \text{ msec.}$$

A period of time of 255 msec is available for reading, i.e. scanning and recognizing, the information of one giro form, which is the transport time over the distance $U$ (see FIG. 45*b*).

It was shown in section 5.5 above that the maximal time required for scanning is 100 msec. (see also FIG. 17). This proves that the scanning can be readily realized by means of a conventional punching machine and a normal television camera.

As regards the time available for completing the recognizing procedure, the following is observed. A conclusion might be that the remaining time of a machine cycle, consequently (255 - 100) msec. = 155 msec., is the available period of time within which the recognition should take place and the control commands should be given. However, from the time diagram shown in FIG. 17 it appears that, prior to the storing time, there will always be an integrating time $t_1 - t_2$, which is 40 msec. Also this time is available. In the most unfavourable case, the point of time $t_0$, which is the point of time at which the card arrives in the desired scanning position, coincides with $t_1$.

During the storing time "interventions" are performed in the running program of the processor. As stated in chapter 8, this only slightly delays the running program. As shown above, the transfer of information is realized within 5 msec. The remaining storing time (20 - 5) msec. = 15 msec. is available for carrying out the program.

Summarizing: the processor time available for completing the recognizing procecure and controlling the punching machine amounts to: (155 + 40 + 15) msec. = 210 msec.

When the average duration of a processor instruction is supposed to be 5 $\mu$sec, a total number of:

$210 \cdot 10^{-3}/5 \cdot 10^{-6} = 42{,}000$ instructions can be carried out.

Although this will not be shown, it is assumed that this number is amply sufficient for completing the procedures described.

When a rapid punching machine is chosen for the punching operation, some special measures should be taken in connection with the properties of the television camera.

If, in the situation shown in FIGS. 44 and 45*a* and 45*b*, it is assumed that the processing rate is 30,000 cards per hour, the available scanning time will be reduced considerably. This leads to the following table (see FIG. 45b): $s \triangleq 18$ units $\triangleq 120$ msec. $U \triangleq 11{,}5$ units $\triangleq 76$ msec. $r \triangleq 5$ units $\triangleq 33$ msec.

The available scanning time (76 msec) is insufficient for using the above scanning method by means of a conventional television camera. However, the following steps can be taken:

A mechanical shutter is provided between the form to be scanned and the television camera. This shutter is mechanically coupled with the drive of the punching machine. During the time that a form is in the desired scanning position, the shutter is opened and an optical image is projected onto the photosensitive layer of the television camera. The electron beam of the camera tube is suppressed during the period that the shutter is open. The form can be transported after closing the shutter. Then the suppression of the electron beam can be cancelled, and the information can be scanned which is still present as a charge image on the photosensitive layer of the camera tube. This is possible due to the electrical inertia of the photosensitive layer of the camera tube. The suppression and the cancellation of the suppression of the electron beam should be synchronized with the field frequency. The signal for suppressing the electron beam is applied between the Wehnelt cylinder and the cathode of the camera tube. Since an even or an odd field may be present when the scanning begins, the time required for scanning the charge image is minimally 20 msec and maximally 40 msec.

The repetition frequency of the deflection of the electron beam can be altered such that the even and the odd image lines coincide. In that case the required scanning time after initiating the electron beam will be 20 msec. Since the television camera is not in synchronism with the punching means, a maximally required scanning time of 40 msec after the shutter has been closed should be reckoned with.

As regards the time available for completing the recognizing procedure the following is observed:

The recognizing and control procedure should be completed within the time of one machine cycle (120 msec), minus the time of one field (20 msec) since the television camera is not in synchronism with the punching machine, and minus the time (about 4.5 msec) required for transferring the quantisized information to the processor through the "intervention" procedure. Consequently, the available processor time is (120−20−4.5) msec = 95.5 msec.

When a more rapid processor is used, in which the average duration of a processor instruction can be supposed to be 3 $\mu$sec, a total number of: $95.5 \cdot 10^{-3}/3 \cdot 10^{-6} \approx 31,800$ instructions can be completed, which is considered an acceptable number.

11. OTHER APPLICATIONS OF THE ARRANGEMENT

The arrangement described is composed of various sections, which need not necessarily be positioned in the immediate vicinity of one another. Therefore it is possible to locate the punching machine with the viewing device mounted thereon (the television camera with image convertor) and the processor with the adaptor circuit in different rooms. In that case, the necessary connections between the viewing device and the processor will consist of a transmission channel through which a television signal (0–5 MHz) can be transmitted, a low frequency signalling circuit through which the signal indicating the desired scanning position can be transmitted, and a low frequency circuit for transferring the punching commands to the punching machine.

It would even be possible to locate the punching machine with the viewing device in an entirely different part of the country then the processor. FIG. 46 schematically shows this situation. The video signal is transmitted via a radio path, for example a beam connection. When a form is in the desired scanning position in the viewing device, the adaptor circuit, which may be positioned behind the receiver at the other end of the connection, is deblocked through a low frequency signalling circuit, e.g., a telephone line. The next desired field of the television signal is then used for the recognizing procedure in accordance with the known method. The signals produced by the processor are converted to serial form in the parallel-series convertor I and transmitted through a low frequency signalling circuit to series-parallel convertor II, which applied the control commands to the punching machine.

It will be clear from the above that a highly flexible organisation is possible.

During the time that the arrangement is not used for reading and punching giro cards, the processors may of course be used for other purposes.

One interesting possibility, which is a direct result of the above, is that the processors can be connected through the adaptor circuits to viewing devices (T.V. cameras) on other kinds of machines. In this connection the attention is drawn to the sorting procedure of envelopes to be sent. When the destination is indicated on the envelopes in encoded form, if desired visible through a window, the sorting of these envelopes can be realized fully automatically. The sorting machines required for this purpose should comprise a viewing device including a television camera. The type-written figures can of course be classified with the above recognizing procedure. In this manner a highly efficient use could be made of the processors.

While there is described above the principles of this invention in connection with a specific apparatus, it is to be clearly understood that this description is made only by way of example, and not as a limitation to the scope of this invention.

1. A system for reading symbols, preferably figures, which may be hand-written on an information carrier (form), an arrangement of rectangles being provided on the information carrier (form), one rectangle for each symbol to be entered, characterized in that the width-to-height ratio per rectangle is equal to the width-to-height ratio of the photosensitive surface of the camera tube used for parallel scanning of the symbols, and the width-to-height ratio of the total surface area to be read on the carrier is converted to the width-to-height ratio of the photosensitive surface of the camera tube by means of an image convertor comprising a plurality of glass fiber bundles, the number and shape of which correspond with the number and shape of the rectangles to be read on the carrier, which glass fiber bundles are bent together such that the end face has a width-to-height ratio corresponding with the width-to-height ratio of the photosensitive surface of the camera tube, and characterized in that the entire surface area of a form to be scanned is scanned in one cycle after the image conversion by means of a television camera producing series pulses, that the image comprising an even plurality of rectangles formed by the image convertor is vertically scanned by p image lines of one field of the selected type while ignoring the other field, that the alternate rectangles are scanned by the alternate fractions of an image line of this one field and the intermediate rectangles are scanned by the intermediate fractions of the next image line of this one field, and that the number of vertical image elements ($q$) (image points) per image line is selected substantially equal to the number of effective image lines ($p/2$) and the information detected by an image line in an effective rectangle is converted into numerical values by means of an encoding device, which numerical values are formed by the encoded values of the numbers of the detected characteristic image elements (image points) in the columns (image lines) and of the characteristic columns, and which numerical values obtained in an effective rectangle are transferred to a transfer device in the period of time immediately following the scanning of that rectangle.

2. A system in accordance with claim 1, characterized in that the rows of squares on the form to be read are converted to four rows of four rectangles each by means of the image convertor.

3. A system in accordance with claim 2, characterized in that the cross-section of the glass fibres in the bundles is a regular hexagon and the hexagons in the end face are stacked such that the parts, into which the hexagons intersected by an image scan line are divided by the line, are equal from fibre face to fibre face, the scanning preferably being realized by means of vertical lines.

4. A system in accordance with claim 3, characterized in that the number of vertical image lines is chosen such that the thinnest vertical line written will always be scanned by at least two successive vertical image scan lines of one field of odd or even lines. l

5. A system in accordance with claim 4, characterized in that means are present for effectively using one of the two possible field types and, after the carrier (form) to be scanned has arrived and lies still in front of the camera tube and after a sync pulse introducing a field of the selected type has appeared, and means for suppressing the storing during at least two field times and for effecting the storing immediately after these two field times during the next field time.

6. A system in accordance with claim 1, characterized in that the period of time in which the information of the information carrier can be stored (the storing time) is determined by a circuit comprising: a first divider (divider-by-two *a*, FIG. 20), controlled by the vertical sync pulses, the polarity at the output of the divider-by-two indicating whether the next field is even or odd; a trigger (Tr1) controlled by a pulse derived from the transport of the form; a second divider (divider *b*) controlled by the cooperation of the first divider and the trigger (Tr1) via a logic circuit (E1), which divider b is switched at the beginning of each even field; a third divider (divider*c*) controlled by the divider*b;* a logic circuit (E2) connected to an output of each one of the three dividers, a pulse determining the end of the storing time appearing at the output of this logic circuit; a clock pulse generator (G) actuated via a second trigger (Tr2) by the cooperation of the line sync pulses and the pulses determining the storing time, the trigger being reset at points of time derived from clock pulse dividing circuits (FIG. 23); a pulse shaper (D1) controlled by the pulses determining the storing time and having its output connected to inputs of the trigger (Tr1), the divider *b* and the divider *c*, which pulse shaper produces reset pulses by means of which the circuit is reset into the initial position.

7. A system in accordance with claim 6, characterized in that for each column (one-fourth image line) of each square it is detected whether the column contains black image elements, the number of intersections being counted and stored in numerical form and the number of the image elements of the beginning and end of each intersection being stored.

8. A system in accordance with claim 7, characterized in that for each column (image line) the data to be stored comprise the number of intersection, the number of the image elements of the beginning and end of intersection 1, intersection 2 and intersection 3, which data are stored in three words having a maximal number of 12 bits each.

9. A system in accordance with claim 8, characterized in that the largest number of intersections per column is stored in two bits, by means of which it can be subsequently expressed:

| | |
|---|---|
| whether the column shows | no intersections (blank column) |
| do. | one intersection |
| do. | two intersections |
| do. | three intersections |

and the numbers of the elements representing the beginning and end, respectively, of an intersection are stored in maximally 5 bits each, the 2 bits and the 2 times 5 bits together forming one word, it being possible to store more than three intersections by means of a supplement to the code for three intersections to be incorporated in one or more remaining bit places of the respective word, while omitting the storage of the beginnings and ends of the intersections.

10. A system in accordance with claim 9, comprising a first counter (counter 1, FIG. 23) controlled by the clock pulse generator (G, FIG. 20) which counter has a number (n) of positions corresponding with the number (*q*) of image elements per one-fourth of the vertical deflection line (column); a first divider (divider-by-two 1) controlled by the pulses of the first counter via a logic circuit (E4), which divider is switched after n pulses have appeared, a second divider (divider-by-two 2) controlled by the line sync pulses, which divider is switched upon each appearance of the line sync pulses; a combination of logic circuits (E5, E6, O1, E7) connected to the outputs of the first and the second divider and connected to the output of the clock pulse generator, groups of *n* pulses (shift pulses *sk*) appearing at the output of this combination during the first and third quarter of the vertical image line for the odd image lines of the odd field and during the second and fourth quarter of the vertical image line for the even image lines of the odd field; a second counter (counter 2) controlled by dividing pulses of the first counter (counter 1); a logic circuit (E8) connected to the outputs of the second counter and to a dividing pulse output of the first counter, pulses (*e*) appearing at the output of this logic circuit and controlling the clock pulse generator (G, FIG. 20).

11. A system in accordance with claim 10, characterized by a circuit for detecting the beginning and end of an intersection (white-black/black-white transitions), the number of intersections, and for counting the intersections in each image line of each square, comprising: a limiter to which the video signal is applied; a shift register (shift register 1) connected to the output of the limiter and controlled by the shift pulses sk; a trigger (Tr3) connected to the output of the limiter and that of the shift register via a plurality of logic circuits (E9, E10); two pulse shapers (PV1, PV2, respectively) each connected to an output of the trigger, a pulse appearing at the respective outputs of these pulse shapers at the beginning (PV2) and end (PV1), respectively, of an intersection; a counter (counter 3) connected to the pulse shaper (PV2) via a logic circuit (E29), the outputs of this counter indicating in binary code the number of intersections detected per group of n shift pulses sk; a separator circuit (US) having its inputs *x*, *y*, directly connected to the outputs of the counter 3 and having its inputs *x'*, *y'* connected to the outputs of counter 3 via inverting amplifiers, one of the outputs (sn3) being connected to the counter (counter 3) via the logic circuit (E29); three registers ($W_1$, $W_2$, $W_3$) connected via logic circuits (E17 – E26, E37 – E46, E47 – E56) to the outputs of the first counter (counter 1) and connected via logic circuits (E11, E12, E13, E14, E15, E16) to the pulse shapers (PV1, PV2) and to the outputs of the separator circuit (US), so as to store the instantaneous counter positions of the counter (counter 1) in the respective register at the beginning and end of an intersection; the register ($W_1$) being further connected to the outputs of the second counter (counter 3) via logic circuits (E27, E28) and to the outputs of the first counter (counter 1) via the logic circuit (E4), so as to store the count of the number of intersections of the counter (counter 3) in the respective register.

12. A system in accordance with claim 1, characterized in that the words containing encoded information as regards the image elements of a column lastly scanned by a vertical deflection line, which information is stored in registers ($W_1$, $W_2$, $W_3$, FIG. 23), are transferred to a processor via a transfer device immediately upon the termination of an effective scanning of a column; which transfer device comprises a trigger (Tr4, FIG. 26) controlled via a logic circuit (E35) by pulses originating from the clock pulse counter (counter 1, FIG. 21) after division, as well as by pulses originating from the line sync oscillator after division, which trigger applies a pulse to a processor so as to initiate an intervention; a first counter (counter 4, FIG. 26) controlled by pulses from the processor appearing upon termination of each intervention by means of which the contents of one register are transferred; a combination of logic circuits (COL, FIG. 26) connected to the outputs of the registers ($W_1$, $W_2$, $W_3$) and to the outputs of the first counter (counter 4), under the control of which logic circuits the outputs of the registers are successively connected to the input channels of the processor (D0 – D11, respectively), while after the transfer of the information from the registers to the processor the trigger (Tr4) is reset by means of pulses originating from the processor and from the first counter (counter 4); a second counter (counter 5) controlled by pulses originating from the processor, by means of which counter the contents of the registers are supplied at the correct addresses in the processor.

13. A system in accordance with claim 12, characterized in that means are provided by means of which first information as regards the number of the columns and the number of intersections occurring per column(per figure) is derived from the total stock of numerical data per square, and that an extract is taken from this information comprising the numbers of those columns showing a change of the number of intersections, by means of which a classification in groups is realized.

14. A system in accordance with claim 13, characterized in that, starting from the classification in groups as to the number of intersections, a further subdivision per groups is effected, starting from specific shapes of specific figures, and the shape is found by a comparison with numerical values of image points of the figure which are characteristic of a specific shape.

15. A system in accordance with claim 14, characterized in that the number of intersections is scanned from column to column of image elements per square (per figure), and 0, 1, 2, 3 and "more than 3" intersections, respectively, are temporarily stored in an encoding device, from which information an extract is derived such that only that column is included in the final extract in which a change of the number of intersections occurs, after which per square (per figure) the "significant" largest number of intersections is stored, by means of which a classification in four groups is realized, the significant largest number of intersections being 0, 1, 2 or 3, the number of intersections $\neq$ 1 being considered significant if this number of intersections is present in at least four successive columns.

16. A system in accordance with claim 15, characterized in that the representation of information as regards the beginnings and ends of the intersections is such that one word contains both the position of the beginning and that of the end, but that by means of "masking" the positions of the beginnings and ends, respectively, can be obtained separately, the numerical value of the ends being shifted a fixed number of positions with respect to the numerical value of the beginnings.

17. A system in accordance with claim 16, characterized in that in the case of a symbol in the group showing one intersection first the middle column is found of the series of columns showing one intersection, the number of this middle column being subsequently determined and stored, while when the series comprises an even number of columns this number is made odd by adding one, and when the middle column found does not show an intersection (number of intersections 1, a local interruption) the adjacent left-hand column showing one intersection is appointed as middle column.

18. A system in accordance with claim 17, characterized in that, column by column, the number and beginning and end is determined of the intersected columns on the right-hand side and on the left-hand side, respectively, of the column appointed as middle column, in such a manner that when a beginning in a column is higher (provides a smaller value) than in the preceding column, the number of this last column with the value pertaining to the beginning of the intersection is stored while removing the storage of the relative data of the preceding column in such a manner that the highest position of the beginning of an intersection on the right-hand side and on the left-hand side, respectively, of the middle column is established, at the same time the number of the respective column being known, and in a similar manner the lowest position, of the end of an intersection on the right-hand side and on the left-hand side, respectively, of the middle column is established, while determining the number of the respective column by means of which the representation of certain information (shapes of figures) is compressed.

19. A system in accordance with claim 18, characterized in that by means of at least the compressed representation a program is formed for classifying a plurality of symbols of the group having one intersection (group X) by means of a decision diagram containing minimal conditions which should be met in order to be read (accepted), the paths in the diagram being determined by measuring the differences and/or ratios of the numerical values as regards the image point of the intersections stored in the representation, and furthermore by measuring the width-to-height ratio of the symbol, each time differences of two numerical values of respective characteristic points being determined.

20. A system in accordance with claim 19, characterized in that data as regards the shape of the figure are derived from the numerical values stored of the image elements of the read figures, which numerical values comprise the numbers of columns and numbers of image elements relating to the read figure, which data are contained in a decision diagram, in which the paths are determined by measuring the characteristic differences of specific numerical values for classifying a number of figures of the group (group Y) of figures having a largest number of intersections equal to two, in which the following situations are determined: whether there is one region or whether there are two regions showing two intersections, whether the merging of "two" intersections to "one" intersection takes place on the left-hand side and/or on the right-hand side, the merging point being stored so as to determine whether the merging takes place at the proper level, whether vertical strokes are present on the left-hand side and on the right-hand side of the symbol, whether the symbol is curved on the left-hand side and/or the second intersection runs horizontally.

21. A system in accordance with claim 20, characterized in that a classification is effected in the group having maximally three intersections (group Z) by means of a decision diagram containing conditions for the minimal number of occupied columns, in which the middle column of the region showing three intersections is found and the position is determined of the second intersection in the middle column, by means of which an upper and a lower part of the symbol is established, and after which it is determined in the thus obtained four quadrants whether and where the two uppermost intersections merge to form one intersection on the upper right-hand side and on the upper left-hand side, respectively, and whether and where the two lowermost intersections merge to form one intersection on the lower left-hand side and on the lower right-hand side, respectively, the number of the respective column and the number of the respective image point being stored.

22. An apparatus for reading symbols written in a plurality of similarly shaped rectangles on an information carrier comprising:

a. a video camera having a photosensitive rectangular screen having the same width-to-height ratio as each of said symbol rectangles, and an electron beam for scanning said screen by one field of parallel image lines to produce a series of impulses, b. bundles of glass fibers for transferring the images of said symbols in said plurality of rectangles simultaneously to said screen, c. means for alternately selecting alternate image lines of said one field for scanning alternate rectangles transferred to said screen, d. means for dividing each image line into elements equal to half the number of image lines per screen, whereby alternate rectangles are scanned by the alternate fractions of an image line of this one field and the intermediate rectangles are scanned by the intermediate fractions of the next image line of this one field, e. encoding means for converting the information detected in each image line into a numerical value corresponding to the element on said screen and in its corresponding rectangle on said screen, and f. means for transferring said numerical values immediately after scanning each rectangle to a transfer device.

23. An apparatus according to claim 22 wherein said screen has transferred thereto four rows of four rectangles in each row.

24. An apparatus according to claim 22 wherein said glass fibers each have equal hexagonal cross-sections which cross-sections are divided by said scan lines.

25. An apparatus according to claim 22 wherein the thinnest written lines are scanned by at least two successive image lines.

26. An apparatus according to claim 22 wherein said means for alternately selecting image lines comprises a divider circuit.

27. An apparatus according to claim 22 wherein said means for dividing said scan lines into elements comprises a clock pulse generator.

28. An apparatus according to claim 22 wherein said means for dividing said scan lines into rectangles comprises counter circuits.

29. An apparatus according to claim 22 including means for quantizing said impulses produced by said scanning lines.

30. A system according to claim 29 wherein said means for quantizing said impulses includes a clock impulse generator means for dividing each scan line into a plurality of bits.

31. A system according to claim 22 wherein said rectangles on said carrier are printed in a different color than said symbols, and wherein said camera comprises a filter for said color printing of said rectangles.

32. A system according to claim 22 wherein said image lines are black and the absence of said image lines is white.

33. A system according to claim 22 wherein said means for encoding includes divider means, counter means, and register means.

34. A system according to claim 22 wherein said means for encoding for said impulses comprises means for forming words of not more than twelve bits for indicating the locations of the beginning and the ending of an intersection of an image line.

35. A system according to claim 34 wherein said words comprise binary numbers corresponding to successive parts of one vertical scan line.

* * * * *

PO-1050
(5/69)

UNITED STATES PATENT OFFICE
CERTIFICATE OF CORRECTION

Patent No. 3,858,180 Dated Dec. 31, 1974

Inventor(s) Arie Adriaan SPANJERSBERG

It is certified that error appears in the above-identified patent and that said Letters Patent are hereby corrected as shown below:

Abstract, line 3, change "squares" to - - rectangles - -. Column 6, line 54, change "enterings on" to - - depositing in - - ; line 64, change "mad" to - - made: - -. Column 9, line 43, change "than" to - - then - -. Column 10, line 2, change "10b" to - - 12b - -. Column 12, line 9, change "16" to - - 16b - -; line 20, change ".The" to - - , and that the - - ; line 43, change "7" to - - 14 - -. Column 13, line 11, after "later" insert - - ) - -; line 66, after "odd" insert - - image - -. Column 14, line 17, change "13" to - - 15 - -; line 44, change "15, 17 and 18" to - - 17, 19, and 20 - -; line 46, change "18" to - - 20 - -. Column 15, line 21, change "thru" to - - three - - line 22, change "at" to - -on - -. Column 18, line 2, change "penutimate" to - - penultimate - -; line 16, change "and" to - - the - -. Column 21, lines 12 thru 23, transfer these lines to the bottom of Column 21. Column 22, line 12 change "fail" to - - fall - -. Column 24, lines 50 and 51 change "numerical value of the five bit positions for the binary" to - - five bit positions for the binary numerical value of the - -.

Column 28, line 64, cancel "1". Column 29, line 1, change "first intersection 1" to - - the first intersection - -.

Column 32, line 12 at the end of the line insert - - 0 - -. Column 33, line 48, change "intersection?" to - - intersections - -. Column 35, line 19 after "column" insert -- counter - -. Column 38, line 46, change "k12" to - - k12 - -. Column 39, line 16, change "mvoed" to - - moved - -. Column 41, line 26, change "then" to - - than - -; line 39 change "applied" to - - applies - -. Column 43, line 32, change "intersection" to - - intersections - -. Column 47, line 17 after the "," insert - - lines 20 through 24. Column 47, lines 20 through 24 cancel.

Signed and sealed this 3rd day of June 1975.

(SEAL)
Attest:

RUTH C. MASON
Attesting Officer

C. MARSHALL DANN
Commissioner of Patents
and Trademarks